(12) United States Patent
Cherian et al.

(10) Patent No.: US 12,126,550 B2
(45) Date of Patent: Oct. 22, 2024

(54) PROTOCOLS FOR MULTI-ACCESS POINT COORDINATED MULTI-USER TRANSMISSIONS

(71) Applicant: QUALCOMM Incorporated, San Diego, CA (US)

(72) Inventors: George Cherian, San Diego, CA (US); Alfred Asterjadhi, San Diego, CA (US); Abhishek Pramod Patil, San Diego, CA (US); Sameer Vermani, San Diego, CA (US); Bin Tian, San Diego, CA (US); Stephen Jay Shellhammer, Ramona, CA (US); Lochan Verma, Danville, CA (US); Lin Yang, San Diego, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/327,216

(22) Filed: Jun. 1, 2023

(65) Prior Publication Data
US 2023/0318763 A1    Oct. 5, 2023

Related U.S. Application Data

(62) Division of application No. 16/559,605, filed on Sep. 3, 2019.
(Continued)

(51) Int. Cl.
*H04L 5/00*    (2006.01)
*H04W 16/14*   (2009.01)
(Continued)

(52) U.S. Cl.
CPC .......... *H04L 5/0035* (2013.01); *H04L 5/0007* (2013.01); *H04L 5/0037* (2013.01);
(Continued)

(58) Field of Classification Search
None
See application file for complete search history.

(56) References Cited

U.S. PATENT DOCUMENTS 9,237,048 B2    1/2016  Lee et al.
9,838,090 B2 *  12/2017 Lee ....................... H04L 1/1685
(Continued)

FOREIGN PATENT DOCUMENTS

CN         107820683 A       3/2018
WO      WO2016011917 A1      1/2016
(Continued)

OTHER PUBLICATIONS

International Search Report and Written Opinion—PCT/US2019/049536—ISA/EPO—Feb. 26, 2020.

*Primary Examiner* — Christopher T Wyllie
(74) *Attorney, Agent, or Firm* — Holland & Hart / Qualcomm

(57) ABSTRACT

Methods, systems, and devices for wireless communications are described. An access point (AP) may transmit, to a second AP and during a first portion of a transmission opportunity (TxOP), a request to participate in a multi-user (MU) transmission. The AP may receive, from the second AP and during the first portion of the TxOP, an indication of intent to participate in the MU transmission during the second portion of the TxOP, the indication of intent including a resource request of the second AP for participation in the MU transmission. The AP may transmit, during an initial period of the second portion of the TxOP, a trigger signal to the second AP indicating a set of one or more resources for
(Continued)

the second AP during the MU transmission. The AP may participate, in conjunction with the second AP and during the second portion of the TxOP, in the MU transmission.

12 Claims, 47 Drawing Sheets

Related U.S. Application Data

(60) Provisional application No. 62/744,626, filed on Oct. 11, 2018, provisional application No. 62/726,968, filed on Sep. 4, 2018, provisional application No. 62/749,041, filed on Oct. 22, 2018.

(51) Int. Cl.
*H04W 72/044* (2023.01)
*H04W 72/27* (2023.01)
*H04W 74/0808* (2024.01)
*H04W 84/12* (2009.01)
*H04W 88/08* (2009.01)

(52) U.S. Cl.
CPC ......... *H04W 16/14* (2013.01); *H04W 72/044* (2013.01); *H04W 72/27* (2023.01); *H04W 74/0808* (2013.01); *H04W 84/12* (2013.01); *H04W 88/08* (2013.01)

(56) References Cited

U.S. PATENT DOCUMENTS

| | | | |
|---|---|---|---|
| 10,034,292 B1* | 7/2018 | Liu | H04W 72/0446 |
| 10,314,066 B2 | 6/2019 | Cherian et al. | |
| 10,454,534 B2* | 10/2019 | Lee | H04L 1/00 |
| 10,516,498 B1* | 12/2019 | Yurkov | H04L 27/266 |
| 11,051,174 B2* | 6/2021 | Huang | H04W 72/0446 |
| 11,245,501 B2 | 2/2022 | Cherian et al. | |
| 2005/0122935 A1* | 6/2005 | Mangin | H04W 74/02 370/329 |
| 2007/0218854 A1* | 9/2007 | Lawrence | H04B 1/28 455/310 |
| 2008/0167075 A1* | 7/2008 | Kurtz | H04L 5/0053 455/561 |
| 2009/0059831 A1* | 3/2009 | Li | H04W 72/30 370/312 |
| 2010/0046464 A1* | 2/2010 | Kwak | H04W 72/23 370/468 |
| 2010/0272000 A1* | 10/2010 | Chen | H04W 72/30 370/312 |
| 2011/0194639 A1* | 8/2011 | Nakao | H04W 56/001 375/267 |
| 2013/0155953 A1 | 6/2013 | Chu et al. | |
| 2013/0229996 A1* | 9/2013 | Wang | H04W 74/06 370/329 |
| 2014/0086201 A1* | 3/2014 | Nagata | H04W 72/23 370/330 |
| 2014/0204891 A1* | 7/2014 | Park | H04L 5/006 370/329 |
| 2014/0307653 A1* | 10/2014 | Liu | H04B 7/2612 370/329 |
| 2014/0328264 A1* | 11/2014 | Merlin | H04W 16/10 370/329 |
| 2014/0328313 A1* | 11/2014 | Merlin | H04L 5/0005 370/328 |
| 2015/0063327 A1 | 3/2015 | Barriac et al. | |
| 2015/0078353 A1 | 3/2015 | Zhang et al. | |
| 2015/0131517 A1* | 5/2015 | Chu | H04W 72/30 370/312 |
| 2015/0139091 A1* | 5/2015 | Azizi | H04L 5/0048 370/329 |
| 2015/0146808 A1* | 5/2015 | Chu | H04L 5/0094 375/260 |
| 2015/0288427 A1* | 10/2015 | Wang | H04W 72/542 370/329 |
| 2015/0319747 A1* | 11/2015 | Chu | H04L 5/0094 370/330 |
| 2015/0365940 A1* | 12/2015 | Chu | H04W 74/02 370/329 |
| 2016/0128057 A1* | 5/2016 | Seok | H04L 5/0053 370/329 |
| 2016/0164652 A1* | 6/2016 | Huang | H04L 5/0007 370/329 |
| 2016/0234834 A1* | 8/2016 | Aboul-Magd | H04L 1/1893 |
| 2016/0255656 A1* | 9/2016 | Lou | H04L 1/1887 370/335 |
| 2016/0285608 A1* | 9/2016 | Kwon | H04L 1/18 |
| 2016/0286545 A1* | 9/2016 | Luo | H04L 1/1812 |
| 2016/0315675 A1* | 10/2016 | Seok | H04B 7/0452 |
| 2016/0330300 A1* | 11/2016 | Josiam | H04L 65/40 |
| 2016/0353485 A1 | 12/2016 | Wentink | |
| 2016/0366666 A1* | 12/2016 | Yang | H04W 72/23 |
| 2017/0034841 A1* | 2/2017 | Bethanabhotla | H04W 28/0864 |
| 2017/0048823 A1 | 2/2017 | Bharadwaj et al. | |
| 2017/0048844 A1* | 2/2017 | Chen | H04W 72/21 |
| 2017/0055290 A1 | 2/2017 | Lv et al. | |
| 2017/0064708 A1* | 3/2017 | Noh | H04L 5/0023 |
| 2017/0064718 A1 | 3/2017 | Bharadwaj et al. | |
| 2017/0126456 A1* | 5/2017 | Lee | H04L 27/2602 |
| 2017/0181136 A1* | 6/2017 | Bharadwaj | H04W 72/12 |
| 2017/0188376 A1* | 6/2017 | Noh | H04W 52/42 |
| 2017/0208625 A1* | 7/2017 | Choi | H04W 74/006 |
| 2017/0273112 A1* | 9/2017 | Lou | H04W 72/121 |
| 2017/0295560 A1* | 10/2017 | Kim | H04L 5/0055 |
| 2017/0311325 A1* | 10/2017 | Cariou | H04B 7/0452 |
| 2017/0338935 A1* | 11/2017 | Ahn | H04W 72/0446 |
| 2017/0359158 A1* | 12/2017 | Lim | H04L 5/0053 |
| 2018/0041917 A1* | 2/2018 | Xi | H04L 5/0091 |
| 2018/0102816 A1* | 4/2018 | Lee | H04B 7/0617 |
| 2018/0123656 A1* | 5/2018 | Alpert | H04B 7/0452 |
| 2018/0131471 A1* | 5/2018 | Ahn | H04L 1/1621 |
| 2018/0132278 A1* | 5/2018 | Oteri | H04W 74/0808 |
| 2018/0184401 A1* | 6/2018 | Ghosh | H04W 72/04 |
| 2018/0212738 A1* | 7/2018 | Chun | H04L 1/1685 |
| 2018/0227917 A1* | 8/2018 | Li | H04W 72/21 |
| 2018/0262936 A1* | 9/2018 | Zhou | H04J 11/0053 |
| 2019/0007130 A1* | 1/2019 | Fang | H04B 7/022 |
| 2019/0007973 A1* | 1/2019 | Lou | H04W 74/006 |
| 2019/0058518 A1* | 2/2019 | Koskela | H04B 7/0617 |
| 2019/0090161 A1* | 3/2019 | Fan | H04W 72/04 |
| 2019/0159220 A1* | 5/2019 | Elsherif | H04W 72/12 |
| 2020/0014427 A1* | 1/2020 | Lee | H04W 48/00 |
| 2020/0037342 A1 | 1/2020 | Seok et al. | |
| 2020/0076519 A1* | 3/2020 | Asterjadhi | H04L 1/0027 |
| 2020/0076551 A1* | 3/2020 | Cherian | H04W 16/14 |
| 2020/0076552 A1* | 3/2020 | Cherian | H04B 7/024 |
| 2020/0106579 A1* | 4/2020 | Cherian | H04B 17/318 |
| 2020/0213160 A1* | 7/2020 | Doostnejad | H04L 25/022 |
| 2020/0260488 A1* | 8/2020 | Cherian | H04W 56/001 |
| 2020/0374870 A1* | 11/2020 | Guo | H04W 72/0446 |
| 2021/0029722 A1* | 1/2021 | Ahn | H04W 56/0005 |
| 2021/0307099 A1* | 9/2021 | Ryu | H04W 76/15 |
| 2022/0338260 A1* | 10/2022 | Cavalcanti | H04W 74/006 |
| 2023/0318763 A1* | 10/2023 | Cherian | H04W 74/0808 370/330 |

FOREIGN PATENT DOCUMENTS

| | | |
|---|---|---|
| WO | WO-2016179276 | 11/2016 |
| WO | 2017027573 | 2/2017 |

* cited by examiner

FIG. 29 — 2900

PROTOCOLS FOR MULTI-ACCESS POINT COORDINATED MULTI-USER TRANSMISSIONS

CROSS REFERENCE

The present application for patent is a Divisional of U.S. patent application Ser. No. 16/559,605 by Cherian et al., entitled "PROTOCOLS FOR MULTI-ACCESS POINT COORDINATED MULTI-USER TRANSMISSIONS" filed Sep. 3, 2019, which claims the benefit of U.S. Provisional Patent Application No. 62/749,041 by Vermani et al., entitled "PROTOCOLS FOR MULTI-ACCESS POINT COORDINATED MULTI-USER TRANSMISSIONS" filed Oct. 22, 2018, and to U.S. Provisional Patent Application No. 62/726,968 by Cherian et al., entitled "MULTI-ACCESS POINT SCHEDULING IN WIRELESS LOCAL AREA NETWORKS," filed Sep. 4, 2018, and to U.S. Provisional Patent Application No. 62/744,626 by Cherian et al., entitled "MULTI-ACCESS POINT SCHEDULING IN WIRELESS LOCAL AREA NETWORKS" filed Oct. 11, 2018, and to and assigned to the assignee hereof, and expressly incorporated herein.

BACKGROUND

The following relates generally to wireless communications, and more specifically to multi-access point scheduling in wireless local area networks and to protocols for multi-access point (AP) coordinated multi-user (MU) transmissions.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via DL and UL. The DL (or forward link) may refer to the communication link from the AP to the station, and the UL (or reverse link) may refer to the communication link from the station to the AP.

SUMMARY

The described techniques relate to improved methods, systems, devices, or apparatuses that support multi-access point scheduling in wireless local area networks (WLANs). Techniques described herein provide for coordination between multiple access points (APs), which may reduce an amount of interference between APs and provide for concurrent communications between multiple APs and associated stations (STAs). According to various aspects of the disclosure, a first AP may gain channel access for a transmission opportunity (TxOP), and may coordinate with at least a second AP to allow both the first AP and the second AP to transmit and receive wireless communications during the TxOP. In some cases, the first AP, upon gaining channel access (e.g., following a successful contention-based channel access procedure), may initiate a scheduling phase with the second AP to schedule of resources within the TxOP for the first and second AP. The first AP may initiate a multi-AP coordinated transmission phase following the scheduling phase, during which both the first AP and second AP may communicate with one or more associated STAs.

A method of wireless communication at a first AP is described. The method may include winning a contention-based procedure for a transmission opportunity of a wireless channel, transmitting to at least a second AP, during a first portion of the transmission opportunity, a first resource assignment for coordinated communications between the second AP and at least a first station during a second portion of the transmission opportunity, transmitting to at least the second AP an indication of a start of the second portion of the transmission opportunity, and initiating, based on the indication, coordinated communications between the first AP and at least a second station associated with the first AP during the second portion of the transmission opportunity.

An apparatus for wireless communication at a first AP is described. The apparatus may include a first interface, a second interface, and a wireless modem, where the wireless modem is configured to sense a wireless channel via the first interface to win a contention-based procedure for a transmission opportunity of a wireless channel, output, via the second interface, for transmission to at least a second AP, during a first portion of the transmission opportunity, a first resource assignment for coordinated communications between the second AP and at least a first station during a second portion of the transmission opportunity, output, via the second interface, for transmission to at least the second AP, an indication of a start of the second portion of the transmission opportunity, and initiate, based on the indication, coordinated communications between the first AP and at least a second station associated with the first AP during the second portion of the transmission opportunity.

Another apparatus for wireless communication at a first AP is described. The apparatus may include means for winning a contention-based procedure for a transmission opportunity of a wireless channel, transmitting to at least a second AP, during a first portion of the transmission opportunity, a first resource assignment for coordinated communications between the second AP and at least a first station during a second portion of the transmission opportunity, transmitting to at least the second AP an indication of a start of the second portion of the transmission opportunity, and initiating, based on the indication, coordinated communications between the first AP and at least a second station associated with the first AP during the second portion of the transmission opportunity.

A non-transitory computer-readable medium storing code for wireless communication at a first AP is described. The code may include instructions executable by a processor to win a contention-based procedure for a transmission opportunity of a wireless channel, transmit to at least a second AP, during a first portion of the transmission opportunity, a first resource assignment for coordinated communications between the second AP and at least a first station during a second portion of the transmission opportunity, transmit to at least the second AP an indication of a start of the second portion of the transmission opportunity, and initiate, based on the indication, coordinated communications between the first AP and at least a second station associated with the first AP during the second portion of the transmission opportunity.

Some examples of the method, apparatuses, and non-transitory computer-readable medium described herein may further include operations, features, means, or instructions for receiving a first scheduling indicator from the second AP based on the first resource assignment and transmitting to a third AP and based on the first scheduling indicator, a second resource assignment for coordinated communications between the third AP and at least a third station during the second portion of the transmission opportunity.

Some examples of the method, apparatuses, and non-transitory computer-readable medium described herein may further include operations, features, means, or instructions for receiving a second scheduling indicator from the third AP based on the second resource assignment. Some examples of the method, apparatuses, and non-transitory computer-readable medium described herein may further include operations, features, means, or instructions for configuring the resource assignment in a single user (SU) physical protocol data unit (PPDU) format. Some examples of the method, apparatuses, and non-transitory computer-readable medium described herein may further include operations, features, means, or instructions for transmitting the resource assignment allocating resources for coordinated communications between the second AP at least a first station, and between a third AP and at least a third station.

Some examples of the method, apparatuses, and non-transitory computer-readable medium described herein may further include operations, features, means, or instructions for configuring the resource assignment to include an AP identifier and corresponding resources of the second portion of the transmission opportunity for at least the second AP. Some examples of the method, apparatuses, and non-transitory computer-readable medium described herein may further include operations, features, means, or instructions for configuring the coordinated communications with at least the second station in a multi-AP PPDU (MAP PPDU) format or in a high efficiency trigger-based PPDU (HE TB PPDU) format.

Some examples of the method, apparatuses, and non-transitory computer-readable medium described herein may further include operations, features, means, or instructions for configuring the coordinated communications with at least the second station to include an AP identifier for the second AP in a station identifier (STAID) field.

Some examples of the method, apparatuses, and non-transitory computer-readable medium described herein may further include operations, features, means, or instructions for configuring the coordinated communications with at least the second station to include a mapping of an AP identifier for the second AP to corresponding resources of the second portion of the transmission opportunity for at least the second AP, where the mapping may be configured to be located in a new field of a HE TB PPDU. Some examples of the method, apparatuses, and non-transitory computer-readable medium described herein may further include operations, features, means, or instructions for configuring the coordinated communications with at least the second station to include a mapping of an AP identifier for the first AP to corresponding resources of the second portion of the transmission opportunity for the at least the first AP, where the mapping may be located in a reserved field of a HE TB PPDU. Some examples of the method, apparatuses, and non-transitory computer-readable medium described herein may further include operations, features, means, or instructions for configuring the coordinated communications with at least the second station in a MAP PPDU format or in a HE TB PPDU format.

A method of wireless communication at a second AP is described. The method may include receiving, during a first portion of a transmission opportunity reserved for communications by a first AP, a resource assignment from the first AP to schedule coordinated communications over a second portion of the transmission opportunity, transmitting a scheduling indicator to at least one station associated with the second access point scheduling a subset of resources of the second portion of the transmission opportunity for the coordinated communications indicated in the resource assignment, receiving an indication of a start of the second portion of the transmission opportunity, and initiating, based on the indication, coordinated communications between the second AP and the at least one station during the second portion of the transmission opportunity.

An apparatus for wireless communication at a second AP is described. The apparatus may include a first interface, a second interface, and a wireless modem, where the wireless modem is configured to obtain, via the first interface, during a first portion of a transmission opportunity reserved for communications by a first AP, a resource assignment from the first AP to schedule coordinated communications over a second portion of the transmission opportunity, output, via the second interface, a scheduling indicator to at least one station associated with the second access point scheduling a subset of resources of the second portion of the transmission opportunity for the coordinated communications indicated in the resource assignment, obtain, via the first interface, an indication of a start of the second portion of the transmission opportunity, and initiate, based on the indication, coordinated communications between the second AP and the at least one station during the second portion of the transmission opportunity.

Another apparatus for wireless communication at a second AP is described. The apparatus may include means for receiving, during a first portion of a transmission opportunity reserved for communications by a first AP, a resource assignment from the first AP to schedule coordinated communications over a second portion of the transmission opportunity, transmitting a scheduling indicator to at least one station associated with the second access point scheduling a subset of resources of the second portion of the transmission opportunity for the coordinated communications indicated in the resource assignment, receiving an indication of a start of the second portion of the transmission opportunity, and initiating, based on the indication, coordinated communications between the second AP and the at least one station during the second portion of the transmission opportunity.

A non-transitory computer-readable medium storing code for wireless communication at a second AP is described. The code may include instructions executable by a processor to receive, during a first portion of a transmission opportunity reserved for communications by a first AP, a resource assignment from the first AP to schedule coordinated communications over a second portion of the transmission opportunity, transmit a scheduling indicator to at least one station associated with the second access point scheduling a subset of resources of the second portion of the transmission opportunity for the coordinated communications indicated in the resource assignment, receive an indication of a start of the second portion of the transmission opportunity, and initiate, based on the indication, coordinated communications between the second AP and the at least one station during the second portion of the transmission opportunity.

Some examples of the method, apparatuses, and non-transitory computer-readable medium described herein may further include operations, features, means, or instructions for configuring the scheduling indicator in a SU PPDU format. Some examples of the method, apparatuses, and non-transitory computer-readable medium described herein may further include operations, features, means, or instructions for configuring the scheduling indicator in a MAP PPDU format. Some examples of the method, apparatuses, and non-transitory computer-readable medium described herein may further include operations, features, means, or instructions for configuring the scheduling indicator to include, in a scheduling indicator preamble, an AP identifier for the second AP and a corresponding subchannel indication for the at least one station to monitor for a scheduling indicator payload.

Some examples of the method, apparatuses, and non-transitory computer-readable medium described herein may further include operations, features, means, or instructions for receiving, in the resource assignment, information indicative of the corresponding subchannel for the second AP and transmitting the scheduling indicator payload over the corresponding subchannel based on the resource assignment.

Some examples of the method, apparatuses, and non-transitory computer-readable medium described herein may further include operations, features, means, or instructions for transmitting the scheduling indicator preamble over a channel simultaneously with at least a third AP, where the scheduling indicator further includes an AP identifier for the third AP and a corresponding subchannel indication for the at least a second station associated with the third AP to monitor for a scheduling indicator payload. In some examples of the method, apparatuses, and non-transitory computer-readable medium described herein, the channel includes a primary channel for the first AP. Some examples of the method, apparatuses, and non-transitory computer-readable medium described herein may further include operations, features, means, or instructions for configuring the scheduling indicator to include an AP identifier for the second AP in a STAID field.

Some examples of the method, apparatuses, and non-transitory computer-readable medium described herein may further include operations, features, means, or instructions for configuring the coordinated communications with the at least one station to include a mapping of an AP identifier for the second AP to corresponding resources of the second portion of the transmission opportunity for at least the second AP where the mapping may be configured to be located in a new field of a HE TB PPDU. Some examples of the method, apparatuses, and non-transitory computer-readable medium described herein may further include operations, features, means, or instructions for configuring the scheduling indicator to include a mapping of an AP identifier for the second AP to corresponding resources of the second portion of the transmission opportunity for at least the second AP, where the mapping may be configured to be located in a reserved field of a HE TB PPDU.

A method of wireless communication at a station is described. The method may include receiving, during a first portion of a transmission opportunity and from an AP, a scheduling indicator configured to schedule a set of resources of a transmission opportunity for coordinated communications, the transmission opportunity reserved for communications by a first AP and initiating coordinated communications with the second AP and over the subset of resources of the transmission opportunity based on the scheduling indicator.

An apparatus for wireless communication at a station is described. The apparatus may include a first interface, a second interface, and a wireless modem, where the wireless modem is configured to obtain, via the first interface, during a first portion of a transmission opportunity and from an AP, a scheduling indicator configured to schedule a set of resources of a transmission opportunity for coordinated communications, the transmission opportunity reserved for communications by a first AP and initiate coordinated communications with the second AP and over the subset of resources of the transmission opportunity based on the scheduling indicator.

Another apparatus for wireless communication at a station is described. The apparatus may include means for receiving, during a first portion of a transmission opportunity and from an AP, a scheduling indicator configured to schedule a set of resources of a transmission opportunity for coordinated communications, the transmission opportunity reserved for communications by a first AP and initiating coordinated communications with the second AP and over the subset of resources of the transmission opportunity based on the scheduling indicator.

A non-transitory computer-readable medium storing code for wireless communication at a station is described. The code may include instructions executable by a processor to receive, during a first portion of a transmission opportunity and from an AP, a scheduling indicator configured to schedule a set of resources of a transmission opportunity for coordinated communications, the transmission opportunity reserved for communications by a first AP and initiate coordinated communications with the second AP and over the subset of resources of the transmission opportunity based on the scheduling indicator.

Some examples of the method, apparatuses, and non-transitory computer-readable medium described herein may further include operations, features, means, or instructions for receiving the scheduling indicator in a SU PPDU format.

Some examples of the method, apparatuses, and non-transitory computer-readable medium described herein may further include operations, features, means, or instructions for receiving the scheduling indicator in a MAP PPDU format. Some examples of the method, apparatuses, and non-transitory computer-readable medium described herein may further include operations, features, means, or instructions for receiving, in a scheduling indicator preamble, an AP identifier for the second AP and a corresponding subchannel indication and monitoring the corresponding subchannel for a scheduling indicator payload based on the scheduling indicator preamble. In some examples of the method, apparatuses, and non-transitory computer-readable medium described herein, the scheduling indicator further includes an AP identifier for the third AP and a corresponding subchannel indication for the at least a second station associated with the third AP to monitor for a scheduling indicator payload. In some examples of the method, apparatuses, and non-transitory computer-readable medium described herein, the channel includes a primary channel for the first AP.

Some examples of the method, apparatuses, and non-transitory computer-readable medium described herein may further include operations, features, means, or instructions for receiving the coordinated communications with the second AP in a MAP PPDU format or in a HE TB PPDU format. In some examples of the method, apparatuses, and non-transitory computer-readable medium described herein, the scheduling indicator includes an AP identifier for the second AP in a STAID field.

In some examples of the method, apparatuses, and non-transitory computer-readable medium described herein, the coordinated communications with the second AP includes a mapping of an AP identifier for the second AP to corresponding resources of the second portion of the transmission opportunity for at least the second AP, where the mapping may be configured to be located in a new field of a HE TB PPDU. In some examples of the method, apparatuses, and non-transitory computer-readable medium described herein, the scheduling indicator includes a mapping of an AP identifier for the second AP to corresponding resources of the second portion of the transmission opportunity for at least the second AP, where the mapping may be configured to be located in a reserved field of a HE TB PPDU.

A method of wireless communication at an AP is described. The method may include configuring a MAP PPDU transmission to schedule coordinated communications with at least one station, transmitting the MAP PPDU transmission upon reception of an indication of a start of a second portion of a transmission opportunity, and communicating with the station based on the MAP PPDU transmission.

An apparatus for wireless communication at an AP is described. The apparatus may include a first interface, a second interface, and a wireless modem, where the wireless modem is configured to configure a MAP PPDU transmission to schedule coordinated communications with at least one station, output, via the second interface, the MAP PPDU transmission upon reception of an indication of a start of a second portion of a transmission opportunity, and communicate with the station based on the MAP PPDU transmission.

Another apparatus for wireless communication at an AP is described. The apparatus may include means for configuring a MAP PPDU transmission to schedule coordinated communications with at least one station, transmitting the MAP PPDU transmission upon reception of an indication of a start of a second portion of a transmission opportunity, and communicating with the station based on the MAP PPDU transmission.

A non-transitory computer-readable medium storing code for wireless communication at an AP is described. The code may include instructions executable by a processor to configure a MAP PPDU transmission to schedule coordinated communications with at least one station, transmit the MAP PPDU transmission upon reception of an indication of a start of a second portion of a transmission opportunity, and communicate with the station based on the MAP PPDU transmission.

A method of wireless communication at a wireless station is described. The method may include receiving a MAP PPDU transmission to schedule coordinated communications with a AP and communicating with the AP based on the MAP PPDU transmission.

An apparatus for wireless communication at a wireless station is described. The apparatus may include a first interface, a second interface, and a wireless modem, where the wireless modem is configured to obtain, via the first interface, a MAP PPDU transmission to schedule coordinated communications with a AP and communicate with the AP based on the MAP PPDU transmission.

Another apparatus for wireless communication at a wireless station is described. The apparatus may include means for receiving a multi-AP physical protocol data unit (MAP PPDU) transmission to schedule coordinated communications with a AP and communicating with the AP based on the MAP PPDU transmission.

A non-transitory computer-readable medium storing code for wireless communication at a wireless station is described. The code may include instructions executable by a processor to receive a MAP PPDU transmission to schedule coordinated communications with a AP and communicate with the AP based on the MAP PPDU transmission.

A method of wireless communication at a first AP is described. The method may include transmitting to at least a second AP an indication of a start of a second portion of a transmission opportunity reserved for communications by the first AP and initiating, based on the indication, coordinated communications between the first AP and at least one station associated with the first AP during the second portion of the transmission opportunity.

An apparatus for wireless communication at a first AP is described. The apparatus may include a first interface, a second interface, and a wireless modem, where the wireless modem is configured to output, via the second interface, for transmission to at least a second AP, an indication of a start of a second portion of a transmission opportunity reserved for communications by the first AP and initiate, based on the indication, coordinated communications between the first AP and at least one station associated with the first AP during the second portion of the transmission opportunity.

Another apparatus for wireless communication at a first AP is described. The apparatus may include means for transmitting to at least a second AP an indication of a start of a second portion of a transmission opportunity reserved for communications by the first AP and initiating, based on the indication, coordinated communications between the first AP and at least one station associated with the first AP during the second portion of the transmission opportunity.

A non-transitory computer-readable medium storing code for wireless communication at a first AP is described. The code may include instructions executable by a processor to transmit to at least a second AP an indication of a start of a second portion of a transmission opportunity reserved for communications by the first AP and initiate, based on the indication, coordinated communications between the first AP and at least one station associated with the first AP during the second portion of the transmission opportunity.

A method of wireless communication at a second AP is described. The method may include receiving an indication of a start of a second portion of a transmission opportunity reserved for communications by a first AP and initiating, based on the indication, coordinated communications between the second AP and at least one station during the second portion of the transmission opportunity.

An apparatus for wireless communication at a second AP is described. The apparatus may include a first interface, a second interface, and a wireless modem, where the wireless modem is configured to obtain, via the second interface, an indication of a start of a second portion of a transmission opportunity reserved for communications by a first AP and initiate, based on the indication, coordinated communications between the second AP and at least one station during the second portion of the transmission opportunity.

Another apparatus for wireless communication at a second AP is described. The apparatus may include means for receiving an indication of a start of a second portion of a transmission opportunity reserved for communications by a first AP and initiating, based on the indication, coordinated communications between the second AP and at least one station during the second portion of the transmission opportunity.

A non-transitory computer-readable medium storing code for wireless communication at a second AP is described. The code may include instructions executable by a processor to receive an indication of a start of a second portion of a transmission opportunity reserved for communications by a first AP and initiate, based on the indication, coordinated communications between the second AP and at least one station during the second portion of the transmission opportunity.

In addition, the described techniques may relate to improved methods, systems, devices, or apparatuses that support protocols for multi-AP coordinated MU transmissions. The described techniques may provide a multi-phase/stage approach that supports a coordinated multi-user (MU) transmission. Broadly, aspects of the described techniques provide a mechanism for a master access point (AP) to dynamically allocate an appropriate amount of resources to slave AP(s) participating in a MU transmission. Broadly, the described techniques for a coordinated a MU transmission may generally be divided into a resource offer and request phase and a triggered transmission phase, with each phase having its own set of stages.

For example, in stage 1 of the resource offer and request phase the master AP may obtain access to a channel during a transmission opportunity (TxOP) that includes more resources that are needed by the master AP. Accordingly, the master AP may transmit or otherwise provide an indication of a request to participate (or invitation to participate) in a coordinated a MU transmission to one or more slave AP(s) (which may also be considered neighboring AP(s) from the perspective of the master's AP).

In stage 2 of the resource offer and request phase, the slave AP(s) that receive the request to participate and have data to communicate during the TxOP may respond by transmitting or otherwise providing an indication of an intent to participate in the MU transmission to the master AP. In some aspects, the indication of intent to participate indication may also carry or convey an indication of a resource request for the corresponding slave AP.

In stage 3 of the triggered transmission phase, the master AP may transmit or otherwise provide an indication of the trigger signal to slave AP(s) that confirms the slave AP(s) participating in the MU transmission and carries or otherwise conveys an indication of a request for resources for the slave AP(s) to use during the MU transmission. An optional stage 3a of the triggered transmission phase may also be included where channel sounding (e.g., power measurements) may be performed between AP(s), between AP(s) and their associated wireless stations, and/or between wireless stations.

In stage 4 of the triggered transmission phase, the coordinated a MU transmission may be performed between the AP(s) and their associated wireless stations. The MU transmission may be uplink and/or downlink transmissions.

A method of wireless communication at a first AP is described. The method may include transmitting, to a second AP and during a first portion of a TxOP, a request to participate in a MU transmission during a second portion of the TxOP, receiving, from the second AP and during the first portion of the TxOP, an indication of intent to participate in the MU transmission during the second portion of the TxOP, the indication of intent including a resource request of the second AP for participation in the MU transmission, transmitting, during an initial period of the second portion of the TxOP, a trigger signal to the second AP indicating a set of one or more resources for the second AP during the MU transmission, and participating, in conjunction with the second AP and during the second portion of the TxOP, in the MU transmission.

An apparatus for wireless communication at a first AP is described. The apparatus may include a first interface, a second interface, and a wireless modem, where the wireless modem is configured to output via the second interface for transmission to a second AP and during a first portion of a TxOP, a request to participate in a MU transmission during a second portion of the TxOP, obtain, via the first interface, from the second AP and during the first portion of the TxOP, an indication of intent to participate in the MU transmission during the second portion of the TxOP, the indication of intent including a resource request of the second AP for participation in the MU transmission, output, via the second interface for transmission during an initial period of the second portion of the TxOP, a trigger signal to the second AP indicating a set of one or more resources for the second AP during the MU transmission, and participate, in conjunction with the second AP and during the second portion of the TxOP, in the MU transmission.

Another apparatus for wireless communication at a first AP is described. The apparatus may include means for transmitting, to a second AP and during a first portion of a TxOP, a request to participate in a MU transmission during a second portion of the TxOP, receiving, from the second AP and during the first portion of the TxOP, an indication of intent to participate in the MU transmission during the second portion of the TxOP, the indication of intent including a resource request of the second AP for participation in the MU transmission, transmitting, during an initial period of the second portion of the TxOP, a trigger signal to the second AP indicating a set of one or more resources for the second AP during the MU transmission, and participating, in conjunction with the second AP and during the second portion of the TxOP, in the MU transmission.

A non-transitory computer-readable medium storing code for wireless communication at a first AP is described. The code may include instructions executable by a processor to transmit, to a second AP and during a first portion of a TxOP, a request to participate in a MU transmission during a second portion of the TxOP, receive, from the second AP and during the first portion of the TxOP, an indication of intent to participate in the MU transmission during the second portion of the TxOP, the indication of intent including a resource request of the second AP for participation in the MU transmission, transmit, during an initial period of the second portion of the TxOP, a trigger signal to the second AP indicating a set of one or more resources for the second AP during the MU transmission, and participate, in conjunction with the second AP and during the second portion of the TxOP, in the MU transmission.

Some examples of the method, apparatuses, wireless device, and non-transitory computer-readable medium described herein may further include operations, features, means, or instructions for configuring the trigger signal to indicate that channel sounding may be to be performed between transmission of the trigger signal and a beginning of the MU transmission, and performing a channel sounding procedure between the first AP and one or more stations associated with the first AP during the channel sounding.

In some examples of the method, apparatuses, wireless device, and non-transitory computer-readable medium described herein, participating in the MU transmission may include operations, features, means, or instructions for transmitting a control channel assignment message to each of one or more stations associated with the first AP that may be associated with the MU transmission that assigns a control channel for each station to use to determine a resource allocation for the MU transmission, and transmitting, in the assigned control channel and before a data transmission during the MU transmission, the resource allocation for each station to use for the MU transmission.

In some examples of the method, apparatuses, wireless device, and non-transitory computer-readable medium described herein, the control channel assignment message may be transmitted in a different physical layer protocol data unit than the data transmission of the MU transmission.

In some examples of the method, apparatuses, wireless device, and non-transitory computer-readable medium described herein, the control channel assignment message may be transmitted in a preamble of a second trigger signal before the data transmission.

In some examples of the method, apparatuses, wireless device, and non-transitory computer-readable medium described herein, the control channel assignment message may be transmitted in a preamble of the data transmission.

Some examples of the method, apparatuses, wireless device, and non-transitory computer-readable medium described herein may further include operations, features, means, or instructions for obtaining access to the channel of the shared radio frequency spectrum band for the TxOP.

In some examples of the method, apparatuses, wireless device, and non-transitory computer-readable medium described herein, a duration of the TxOP, an available bandwidth for the MU transmission, an available spatial dimension for the MU transmissions, a configuration for the second AP to transmit the indication of intent, a scheduling for the second AP to transmit the indication of intent, a transmission direction for the MU transmission, an allowable interference level for the first AP, an identifier of the second AP, an identifier for a group of APs participating in the MU transmission, a transmit power of the first AP, or a combination thereof.

In some examples of the method, apparatuses, wireless device, and non-transitory computer-readable medium described herein, a simultaneous transmission, a scheduled transmission, or a polled transmission from the second AP and one or more additional APs participating in the MU transmission.

In some examples of the method, apparatuses, wireless device, and non-transitory computer-readable medium described herein, the indication of intent further indicates a channel power measurement request for one or more stations to measure a channel power using the trigger signal.

In some examples of the method, apparatuses, wireless device, and non-transitory computer-readable medium described herein, a guard interval duration for the MU transmission, a preamble configuration for the MU transmission, a transmission direction for the MU transmission, an allowable interference level for the first AP, an indication of a channel sounding stage between the trigger signal and a beginning of the MU transmission, or a combination thereof.

In some examples of the method, apparatuses, wireless device, and non-transitory computer-readable medium described herein, a time resource, a frequency resource, a spatial dimension resource, an orthogonal resource, or a combination thereof.

A method of wireless communication at a second AP is described. The method may include receiving, from a first AP and during a first portion of a TxOP, a request to participate in a MU transmission during a second portion of the TxOP, transmitting, to the first AP and during the first portion of the TxOP, an indication of intent to participate in the MU transmission during the second portion of the TxOP, the indication of intent including a resource request of the second AP for participation in the MU transmission, receiving, during an initial period of the second portion of the TxOP, a trigger signal from the first AP indicating a set of one or more resources for the second AP during the MU transmission, and participating, in conjunction with the first AP and during the second portion of the TxOP, in the MU transmission.

An apparatus for wireless communication at a second AP is described. The apparatus may include a first interface, a second interface, and a wireless modem, where the wireless modem is configured to output via the second interface for transmission to a first AP and during a first portion of a TxOP, a request to participate in a MU transmission during a second portion of the TxOP, output, via the second interface for transmission to the first AP and during the first portion of the TxOP, an indication of intent to participate in the MU transmission during the second portion of the TxOP, the indication of intent including a resource request of the second AP for participation in the MU transmission, obtain, via the first interface, during an initial period of the second portion of the TxOP, a trigger signal from the first AP indicating a set of one or more resources for the second AP during the MU transmission, and participate, in conjunction with the first AP and during the second portion of the TxOP, in the MU transmission.

Another apparatus for wireless communication at a second AP is described. The apparatus may include means for receiving, from a first AP and during a first portion of a TxOP, a request to participate in a MU transmission during a second portion of the TxOP, transmitting, to the first AP and during the first portion of the TxOP, an indication of intent to participate in the MU transmission during the second portion of the TxOP, the indication of intent including a resource request of the second AP for participation in the MU transmission, receiving, during an initial period of the second portion of the TxOP, a trigger signal from the first AP indicating a set of one or more resources for the second AP during the MU transmission, and participating, in conjunction with the first AP and during the second portion of the TxOP, in the MU transmission.

A non-transitory computer-readable medium storing code for wireless communication at a second AP is described. The code may include instructions executable by a processor to receive, from a first AP and during a first portion of a TxOP, a request to participate in a MU transmission during a second portion of the TxOP, transmit, to the first AP and during the first portion of the TxOP, an indication of intent to participate in the MU transmission during the second portion of the TxOP, the indication of intent including a resource request of the second AP for participation in the MU transmission, receive, during an initial period of the second portion of the TxOP, a trigger signal from the first AP indicating a set of one or more resources for the second AP during the MU transmission, and participate, in conjunction with the first AP and during the second portion of the TxOP, in the MU transmission.

Some examples of the method, apparatuses, wireless device, and non-transitory computer-readable medium described herein may further include operations, features, means, or instructions for transmitting, in a single protocol data unit, the indication of intent to participate to the first AP and each of one or more stations associated with the second AP that may be participating in the MU transmission.

In some examples of the method, apparatuses, wireless device, and non-transitory computer-readable medium described herein, the single protocol data unit indicates an identifier for each of the one or more stations.

In some examples of the method, apparatuses, wireless device, and non-transitory computer-readable medium described herein, the single protocol data unit indicates a channel power measurement request for one or more stations to measure a channel power using the trigger signal.

Some examples of the method, apparatuses, wireless device, and non-transitory computer-readable medium described herein may further include operations, features, means, or instructions for transmitting, in a first protocol data unit, the indication of intent to participate to the first AP, and transmitting, in a second protocol data unit, the indication of intent to participate to each of one or more stations associated with the second AP that may be participating in the MU transmission.

In some examples of the method, apparatuses, wireless device, and non-transitory computer-readable medium described herein, the second protocol data unit indicates an identifier for each of the one or more stations.

In some examples of the method, apparatuses, wireless device, and non-transitory computer-readable medium described herein, the second protocol data unit indicates a channel power measurement request for one or more stations to measure a channel power using the trigger signal.

In some examples of the method, apparatuses, wireless device, and non-transitory computer-readable medium described herein, the control channel assignment message may be transmitted in a preamble of a second trigger signal before the data transmission.

In some examples of the method, apparatuses, wireless device, and non-transitory computer-readable medium described herein, the control channel assignment message may be transmitted in a preamble of the data transmission.

Some examples of the method, apparatuses, wireless device, and non-transitory computer-readable medium described herein may further include operations, features, means, or instructions for decoding the trigger signal to determine that channel sounding may be to be performed between reception of the trigger signal and a beginning of the MU transmission, and performing a channel sounding procedure between the second AP and one or more stations associated with the second AP during the channel sounding.

In some examples of the method, apparatuses, wireless device, and non-transitory computer-readable medium described herein, participating in the MU transmission may include operations, features, means, or instructions for transmitting a control channel assignment message to each of one or more stations associated with the second AP that may be associated with the MU transmission that assigns a control channel for each station to use to determine a resource allocation for the MU transmission, and transmitting, in the assigned control channel and before a data transmission during the MU transmission, the resource allocation for each station to use for the MU transmission.

In some examples of the method, apparatuses, wireless device, and non-transitory computer-readable medium described herein, the control channel assignment message may be transmitted in a different physical layer protocol data unit than the data transmission of the MU transmission.

In some examples of the method, apparatuses, wireless device, and non-transitory computer-readable medium described herein, a duration of the TxOP, an available bandwidth for the MU transmission, an available spatial dimension for the MU transmissions, a configuration for the second AP to transmit the indication of intent, a scheduling for the second AP to transmit the indication of intent, a transmission direction for the MU transmission, an allowable interference level for the first AP, an identifier of the second AP, an identifier for a group of APs participating in the MU transmission, a transmit power of the first AP, or a combination thereof.

In some examples of the method, apparatuses, wireless device, and non-transitory computer-readable medium described herein, a simultaneous transmission, a scheduled transmission, or a polled transmission from the second AP and one or more additional APs participating in the MU transmission.

In some examples of the method, apparatuses, wireless device, and non-transitory computer-readable medium described herein, the indication of intent further indicates a station channel power measurement request for one or more stations to measure a channel receive power using the trigger signal.

In some examples of the method, apparatuses, wireless device, and non-transitory computer-readable medium described herein, a guard interval duration for the MU transmission, a preamble configuration for the MU transmission, a transmission direction for the MU transmission, an allowable interference level for the first AP, an indication of a channel sounding stage between the trigger signal and a beginning of the MU transmission, or a combination thereof.

In some examples of the method, apparatuses, wireless device, and non-transitory computer-readable medium described herein, a time resource, a frequency resource, a spatial dimension resource, an orthogonal resource, or a combination thereof.

A method of wireless communications at a wireless station is described. The method may include receiving, from an AP, a control channel assignment message that assigns a control channel for the wireless station to use to determine a resource allocation for a MU transmission during a TxOP, receiving, in the assigned control channel and before a data transmission of the MU transmission, a resource allocation for the wireless station to use for the MU transmission, and participating, using the resource allocation, in the MU transmission with the AP.

An apparatus for wireless communications at a wireless station is described. The apparatus may include a first interface, a second interface, and a wireless modem, where the wireless modem is configured to obtain, via the first interface, from an AP, a control channel assignment message that assigns a control channel for the wireless station to use to determine a resource allocation for a MU transmission during a TxOP, obtain, via the first interface, in the assigned control channel and before a data transmission of the MU transmission, a resource allocation for the wireless station to use for the MU transmission, and participate, using the resource allocation, in the MU transmission with the AP.

Another apparatus for wireless communications at a wireless station is described. The apparatus may include means for receiving, from an AP, a control channel assignment message that assigns a control channel for the wireless station to use to determine a resource allocation for a MU transmission during a TxOP, receiving, in the assigned control channel and before a data transmission of the MU transmission, a resource allocation for the wireless station to use for the MU transmission, and participating, using the resource allocation, in the MU transmission with the AP.

A non-transitory computer-readable medium storing code for wireless communications at a wireless station is described. The code may include instructions executable by a processor to receive, from an AP, a control channel assignment message that assigns a control channel for the wireless station to use to determine a resource allocation for a MU transmission during a TxOP, receive, in the assigned control channel and before a data transmission of the MU transmission, a resource allocation for the wireless station to use for the MU transmission, and participate, using the resource allocation, in the MU transmission with the AP.

In some examples of the method, apparatuses, and non-transitory computer-readable medium described herein, the control channel assignment message may be received in a different physical layer protocol data unit than the data transmission.

In some examples of the method, apparatuses, and non-transitory computer-readable medium described herein, the control channel assignment message may be received in a preamble of a per-AP trigger signal before the data transmission.

In some examples of the method, apparatuses, and non-transitory computer-readable medium described herein, the control channel assignment message may be received in a preamble of the data transmission.

DETAILED DESCRIPTION

Figure 1:
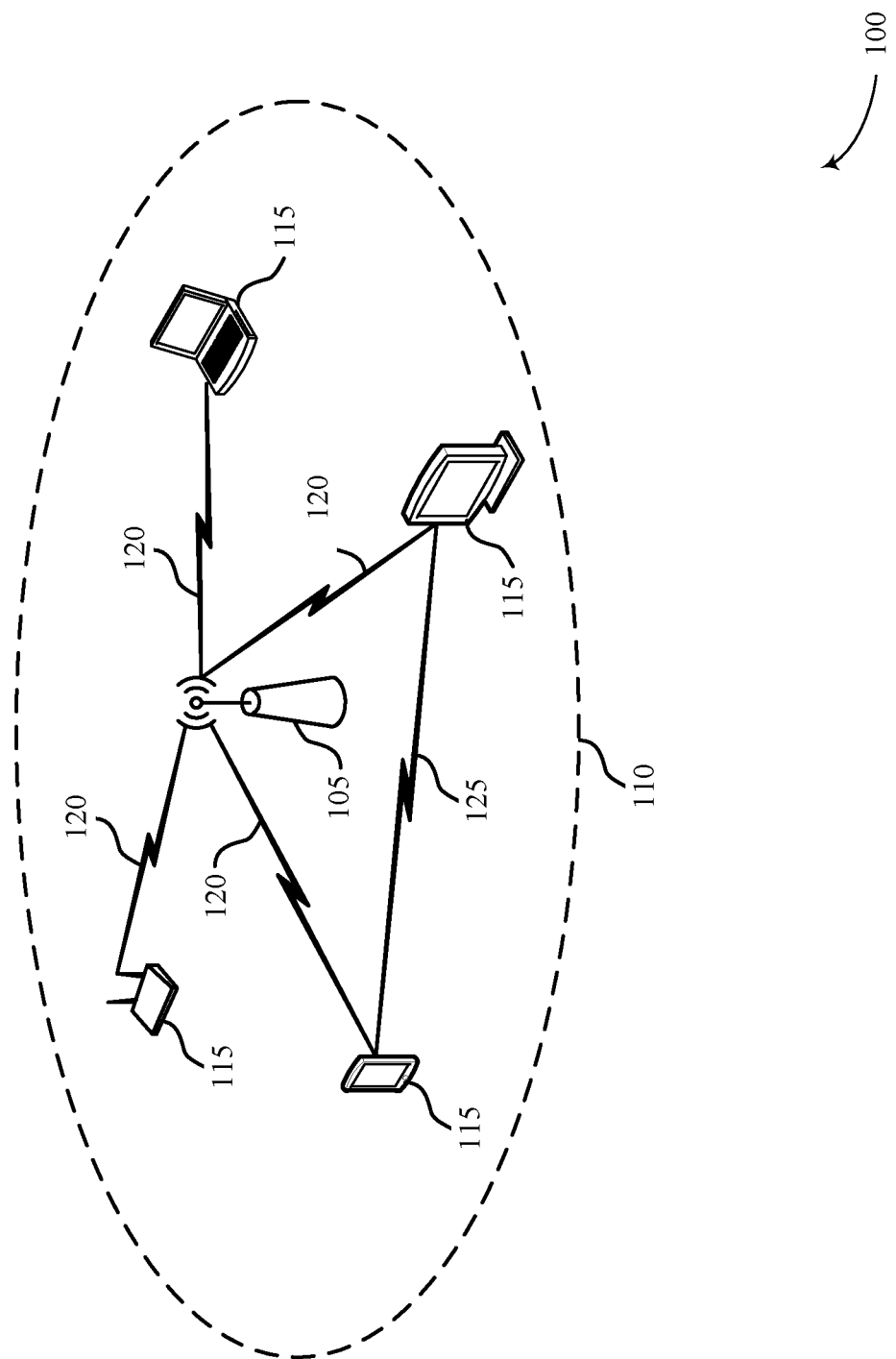
FIG. 1 illustrates an example of a system for wireless communications that supports multi-access point scheduling in wireless local area networks in accordance with aspects of the present disclosure.

Various aspects of the present disclosure provide techniques for multi-access point (AP) scheduling and coordination in wireless local area networks (WLANs). In some aspects of the disclosure, a scheme for multi-AP scheduling is provided, in which a first AP may gain channel access for a transmission opportunity (TxOP), and may coordinate with at least a second AP to allow both the first AP and the second AP to transmit and receive wireless communications during the TxOP. In further aspects of the disclosure, a physical protocol data unit (PPDU) for multi-AP coordination is provided, which may carry information related to scheduling and transmission resources for coordination of concurrent transmissions by multiple APs. In still further aspects of the disclosure, techniques for orthogonal frequency division multiple access (OFDMA) are provided in which multiple APs may concurrently communicate with one or more associated STAs using one or more wireless channels.

In some cases, a first AP may gain channel access for a transmission opportunity (TxOP), and may coordinate with at least a second AP to allow both the first AP and the second AP to transmit and receive wireless communications during the TxOP. The first AP may be referred to as a TxOP owner, or leader AP, in accordance with various aspects of the disclosure. In some cases, the first AP, upon gaining channel access (e.g., following a successful contention-based channel access procedure), may initiate a scheduling phase with the second AP to schedule of resources within the TxOP for the first and second AP. The first AP may initiate a multi-AP coordinated transmission phase following the scheduling phase, during which both the first AP and second AP may communicate with one or more associated STAs.

The scheduling phase may be initiated by the first AP transmitting, during a first portion of the TxOP, a first resource assignment (e.g., using a multi-AP physical protocol data unit (MAP PPDU) or a high efficiency trigger-based physical protocol data unit (HE TB PPDU)) for coordinated communications between the second AP one or more STAs of the second AP during a second portion of the transmission opportunity. The second AP may transmit a scheduling indicator, which may be received at the first AP and by the one or more STAs of the second AP. The first AP may, in some cases, then transmit an indication of a start of the second portion of the transmission opportunity (e.g., via a MAP PPDU or a HE TB PPDU), and both the first AP and the second AP may communicate with one or more associated STAs during the second portion of the TxOP. The communications during the second portion of the TxOP may include OFDMA communications in which multiple APs concurrently communicate with multiple STAs.

In various aspects of the present disclosure, multi-AP coordination for concurrent transmissions within a portion of a TxOP may be used in an unmanaged network (e.g., a network without backhaul links between APs, without a central controller or schedule, and without long term synchronization), such that a TxOP owner AP may schedule one or more neighboring APs, and the multiple APs may participate in multi-AP coordinated communications. Coordinated communications may include, for example, coordinated multi-AP OFDMA, where subchannels of a wireless bandwidth used by each AP are orthogonal to each other, or coordinated reuse, where multiple APs may participate in simultaneous uplink and downlink transmissions with relatively low interference to each other.

Techniques such as discussed herein may provide a TxOP owner AP, for example, with an ability to obtain a longer TxOP, an increased access priority, or combinations thereof. Such TxOP duration and access priority, for example, may be based on a number of overlapping basic service set (OBSS) APs participating in the coordinated transmissions. Further, such techniques may improve system throughput, increase spectral efficiency by more fully using one or more available subchannels within a wireless bandwidth, enhanced interference management by allowing coordinated concurrent transmissions in orthogonalized wireless resources, and efficient implementation without a need for backhaul coordination among APs.

Additional aspects of the disclosure are initially described in the context of a wireless communications system. Various examples of multi-AP communications and related PPDUs are then described in accordance with some multi-AP communications techniques. Aspects of the disclosure are further illustrated by and described with reference to apparatus diagrams, system diagrams, and flowcharts that relate to multi-access point scheduling in wireless local area networks.

In some aspects, wireless communication systems may be configured to support multi-user (MU) transmissions where multiple access points (AP(s)) perform wireless communications with their associated wireless stations during a transmission opportunity (TxOP). For example, a first AP (e.g., a master AP) may obtain or otherwise secure access to a channel for the TxOP. The channel/TxOP may have available resources beyond what the master AP needs to perform its wireless communications. Accordingly, the master AP may generally transmit or otherwise signal an indication to second AP(s) (e.g., slave or neighboring AP(s)) that the resources are available for use during the TxOP. The second AP(s) may generally perform wireless communications using the unused resources during the TxOP. However, conventional techniques that support a MU transmission are rudimentary at best. For example, sharing of the unused resources is typically limited to AP(s) within a basic service set (BSS) and/or may not provide for effective utilization of the available resources, e.g., may not provide an efficient mechanism for the master AP to dynamically allocate the available resources between the slave AP(s).

Aspects of the disclosure are initially described in the context of a wireless communication system. In some aspects, the described techniques introduce a phase approach to allow AP(s) (within a basic service set (BSS) and/or associated with different BSSs) to perform a coordinated a MU transmission using dynamically allocated resources. For example, a master AP (e.g., the first AP) may obtain or otherwise secure access to a shared or unlicensed radio frequency spectrum band for a TxOP. For example, the master AP may perform a listen-before-talk (LBT) procedure to obtain access to the channel for the TxOP. In some aspects, the channel may be a wideband channel and/or the TxOP may have a duration such that the available resources for use during the TxOP are more than the master AP needs.

Accordingly, in a first stage (or stage 1) the master AP may transmit or otherwise provide an indication of a request to participate (or invitation to participate) in the MU transmission during the TxOP to its neighboring AP(s). In a second stage (or stage 2), one or more of the neighboring AP(s) (e.g., one or more second AP(s), which may also be referred to as slave AP(s)) may receive the request to participate and determine that they have communications to exchange with their associated wireless station(s). Each of the one or more neighboring AP(s) may determine that, based on the data being available for communication, what resources are needed for them to communicate the data during the TxOP. Accordingly, each of the one or more neighboring AP(s) may respond by transmitting or otherwise providing an indication of an intent to participate in the MU transmission to the master AP. Generally, the indication of intent to participate may also carry or otherwise convey an indication of the resources that the neighboring AP is requesting for the MU transmission. In a third stage (or stage 3), the master AP may transmit or otherwise provide an indication of a trigger signal that carries or otherwise conveys an indication resources for the neighboring AP(s) to use during the MU transmission (e.g., a resource grant or allocation). During a fourth stage (or stage 4), the master AP and the neighboring AP(s) may participate in the MU transmission with their respective wireless stations.

Aspects of the disclosure are further illustrated by and described with reference to apparatus diagrams, system diagrams, and flowcharts that relate to protocols for multi-AP coordinated MU transmissions FIG. 1 illustrates a wireless local area network (WLAN) 100 (also known as a Wi-Fi network) configured in accordance with various aspects of the present disclosure. The WLAN 100 may include an AP 105 and multiple associated STAs 115 that may communicate via wireless links 120. STAs 115 may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basis service set (BSS) or an extended service set (ESS). The various STAs 115 in the network are able to communicate with one another through the AP 105. Also shown is a coverage area 110 of the AP 105, which may represent a BSA of the WLAN 100. An extended network station (not shown) associated with the WLAN 100 may be connected to a wired or wireless distribution system that may allow multiple APs 105 to be connected in an ESS. In some aspects as discussed herein, AP 105 may coordinate with one or more neighboring APs to provide coordinated communications during a TxOP.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

Some types of STAs 115 may provide for automated communication. Automated wireless devices may include those implementing internet-of-things (IoT) communication, Machine-to-Machine (M2M) communication, or machine type communication (MTC). IoT, M2M or MTC may refer to data communication technologies that allow devices to communicate without human intervention. For example, IoT, M2M or MTC may refer to communications from STAs 115 that integrate sensors or meters to measure or capture information and relay that information to a central server or application program that can make use of the information or present the information to humans interacting with the program or application.

Some of STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

WLAN 100 may support beamformed transmissions. As an example, AP 105 may use multiple antennas or antenna arrays to conduct beamforming operations for directional communications with a STA 115. Beamforming (which may also be referred to as spatial filtering or directional transmission) is a signal processing technique that may be used at a transmitter (for example, AP 105) to shape or steer an overall antenna beam in the direction of a target receiver (for example, a STA 115). Beamforming may be achieved by combining elements in an antenna array in such a way that transmitted signals at particular angles experience constructive interference while others experience destructive interference. In some cases, the ways in which the elements of the antenna array are combined at the transmitter may depend on channel state information (CSI) associated with the channels over which the AP 105 may communicate with the STA 115. That is, based on this CSI, the AP 105 may appropriately weight the transmissions from each antenna (for example, or antenna port) such that the desired beamforming effects are achieved. In some cases, these weights may be determined before beamforming can be employed. For example, the transmitter (for example, the AP 105) may transmit one or more sounding packets to the receiver in order to determine CSI.

WLAN 100 may further support multiple-input, multiple-output (MIMO) wireless systems. Such systems may use a transmission scheme between a transmitter (for example, AP 105) and a receiver (for example, a STA 115), where both transmitter and receiver are equipped with multiple antennas. For example, AP 105 may have an antenna array with a number of rows and columns of antenna ports that the AP 105 may use for beamforming in its communication with a STA 115. Signals may be transmitted multiple times in different directions (for example, each transmission may be beamformed differently). The receiver (for example, STA 115) may try multiple beams (for example, antenna subarrays) while receiving the signals.

WLAN protocol data units (PDUs) may be transmitted over a radio frequency spectrum band, which in some examples may include multiple sub-bands or frequency channels. In some cases, the radio frequency spectrum band may have a bandwidth of 80 MHz, and each of the sub-bands or channels may have a bandwidth of 20 MHz. Transmissions to and from STAs 115 and APs 105 typically include control information within a header that is transmitted prior to data transmissions. The information provided in a header is used by a receiving device to decode the subsequent data. A legacy WLAN preamble may include legacy short training field (STF) (L-STF) information, legacy LTF (L-LTF) information, and legacy signaling (L-SIG) information. The legacy preamble may be used for packet detection, automatic gain control and channel estimation, among other uses. The legacy preamble may also be used to maintain compatibility with legacy devices.

In some cases, AP 105 may coordinate one or more transmissions with one or more neighboring APs. In some cases, the AP 105 may gain channel access for a TxOP, and may coordinate with at least a second AP to allow both the AP 105 and the second AP to transmit and receive wireless communications during the TxOP. In some cases, PPDU for multi-AP coordination is transmitted by the AP 105 to the one or more other APs, which may carry information related to scheduling and transmission resources for coordination of concurrent transmissions by multiple APs. Additionally, or alternatively, OFDMA techniques may be used by AP 105 and one or more other APs for concurrent communicate with one or more associated STAs 115 using one or more wireless channels.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

In some aspects, an AP 105 (e.g., a first AP) may transmit, to a second AP 105 and during a first portion of a TxOP, a request to participate in a multi-user transmission during a second portion of the TxOP. The AP 105 may receive, from the second AP 105 and during the first portion of the TxOP, an indication of intent to participate in the multi-user transmission during the second portion of the TxOP, the indication of intent including a resource request of the second AP 105 for participation in the multi-user transmission. The AP 105 may transmit, during an initial period of the second portion of the TxOP, a trigger signal to the second AP 105 indicating a set of one or more resources for the second AP 105 during the multi-user transmission. The AP 105 may participate, in conjunction with the second AP 105 and during the second portion of the TxOP, in the multi-user transmission.

In some aspects, an AP 105 (e.g., a second AP) may receive, from a first AP 105 and during a first portion of a TxOP, a request to participate in a multi-user transmission during a second portion of the TxOP. The AP 105 may transmit, to the first AP 105 and during the first portion of the TxOP, an indication of intent to participate in the multi-user transmission during the second portion of the TxOP, the indication of intent including a resource request of the second AP 105 for participation in the multi-user transmission. The AP 105 may receive, during an initial period of the second portion of the TxOP, a trigger signal from the first AP 105 indicating a set of one or more resources for the second AP 105 during the multi-user transmission. The AP 105 may participate, in conjunction with the first AP 105 and during the second portion of the TxOP, in the multi-user transmission.

Figure 2:
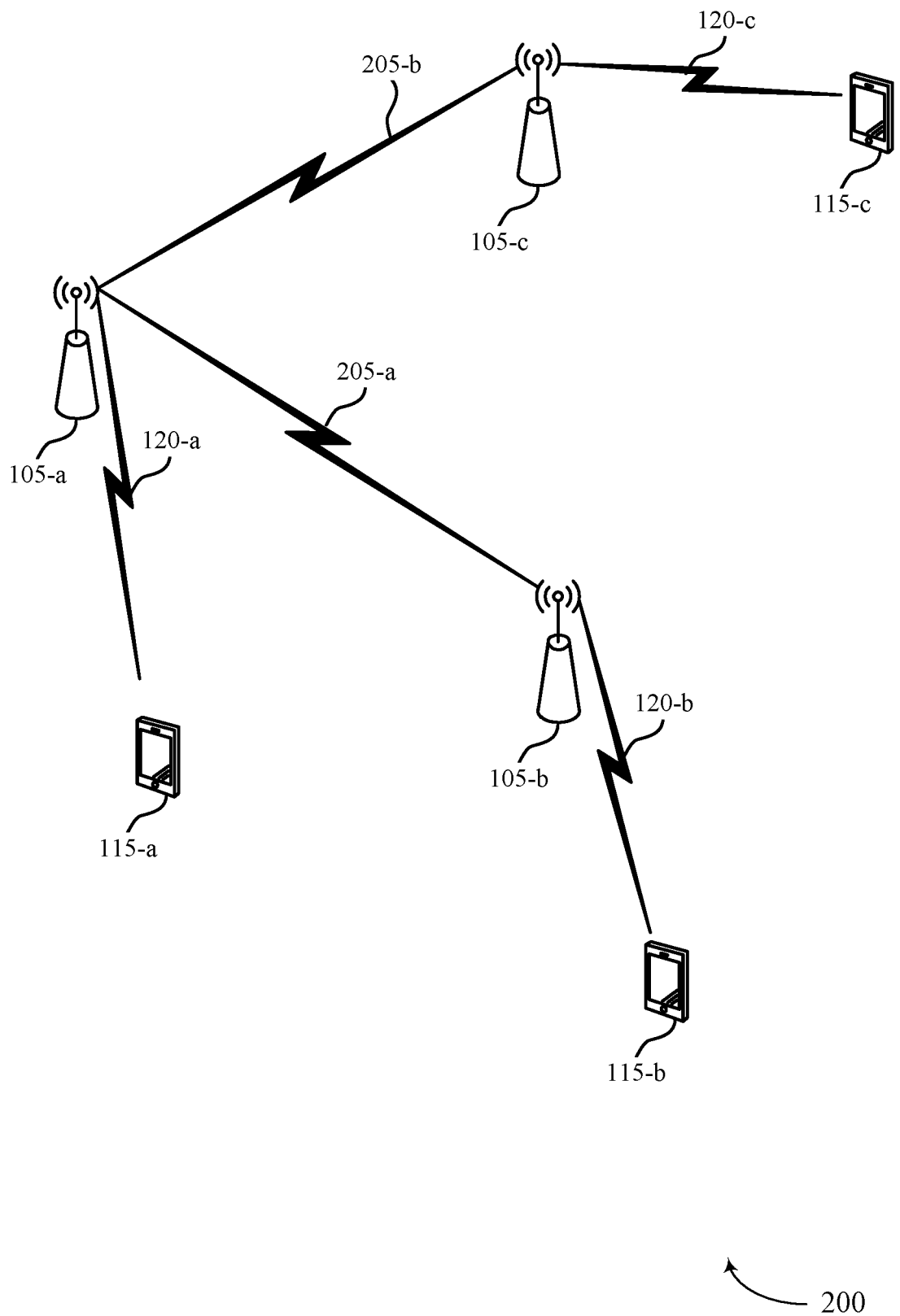
FIG. 2 illustrates an example of a portion of a WLAN that supports multi-access point scheduling in wireless local area networks in accordance with aspects of the present disclosure.

FIG. 2 illustrates an example of a WLAN 200 that supports multi-access point scheduling in wireless local area networks in accordance with aspects of the present disclosure. In some examples, WLAN 200 may implement aspects of wireless communication system 100. In this example, a first AP 105-a may have multiple neighboring APs 105, including a second AP 105-b and a third AP 105-c. Further, a number of STAs 115 may be present, including a first STA 115-a that may be associated with the first AP 105-a via wireless link 120-a, a second STA 115-b that may be associated with the second AP 105-b via wireless link 120-b, and a third STA 115-c that may be associated with the third STA 115-c via wireless link 120-c.

In this example, the first AP 105-a may also have a wireless link 205-a with the second AP 105-b, and a wireless link 205-b with the third AP 105-c. In some cases, the first AP 105-a may gain channel access for a TxOP, and may coordinate with the second AP 105-b and the third AP 105-c to allow the first AP 105-a, the second AP 105-b, and the third AP 105-c to transmit and receive wireless communications during the TxOP. The first AP 105-a, upon gaining channel access (e.g., following a successful contention-based channel access procedure), may initiate a scheduling phase with the second AP 105-b and the third AP 105-c to schedule of resources within the TxOP for communications by each AP 105.

In some cases, the first AP 105-a may transmit, during a first portion of the TxOP, a first resource assignment (e.g., using a MAP PPDU or a HE TB PPDU) for coordinated communications between the second AP 105-b and third AP 105-c one or more associated STAs 115 during a second portion of the TxOP. The second AP 105-b and third AP 105-c may transmit a scheduling indicator to their associated STAs 115, which may be received at the first AP 105-a. The first AP 105-a may, in some cases, then transmit an indication of a start of the second portion of the TxOP (e.g., via a MAP PPDU or a HE TB PPDU), and the first AP 105-a, the second AP 105-b, and the third AP 105-c may communicate with the STAs 115 during the second portion of the TxOP. Such a technique, and communications between the different APs 105, is discussed in further detail with reference to the examples of FIGS. 3 through 5.

Figure 3:
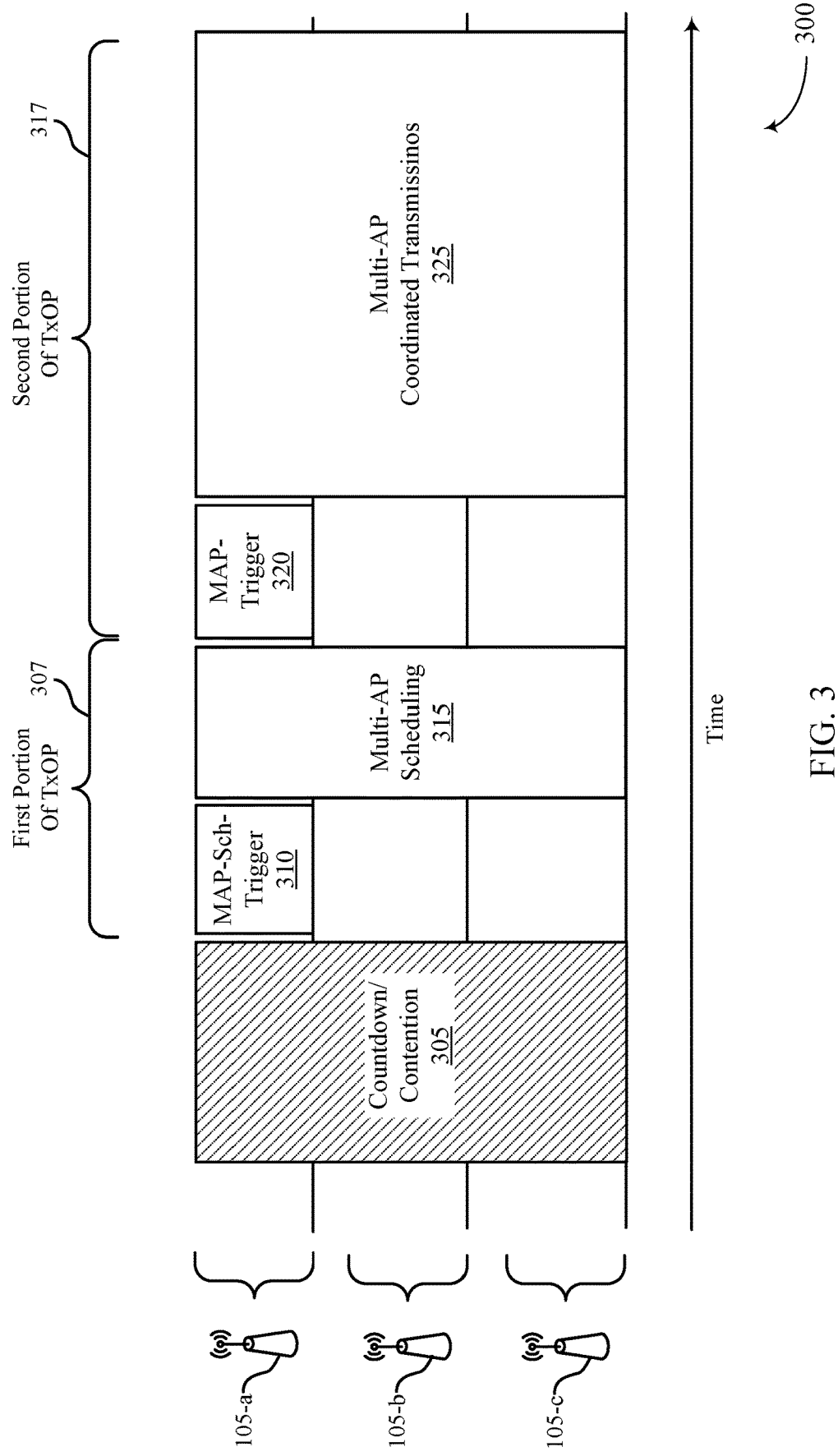
FIG. 3 illustrates an example of a multi-AP coordination technique that supports multi-access point scheduling in wireless local area networks in accordance with aspects of the present disclosure.

FIG. 3 illustrates an example of multi-AP coordination 300 that supports multi-access point scheduling in wireless local area networks in accordance with aspects of the present disclosure. In some examples, multi-AP coordination 300 may implement aspects of wireless communication system 100 or 200. In this example, first AP 105-*a*, second AP 105-*b*, and third AP 105-*c* may perform coordinated transmissions.

Initially, each of the APs 105 may contend for access to a wireless channel during a contention/countdown window 305. In some cases, the first AP 105-*a* may be the first to contend for channel access (e.g., according to an EDCA contention-based channel access procedure), and may win the medium. In some cases, one or more of the other APs 105 may attempt to access the channel before the first AP 105-*a* wins contention, but may not win contention, such as due to sending that another transmitter is using the wireless channel.

Upon winning the contention-based channel access procedure, the first AP 105-*a* may initiate a multi-AP scheduling phase during a first portion of the TxOP 307. In the example of FIG. 3, the first AP 105-*a* may transmit a scheduling trigger such as a MAP-Sch-Trigger 310, which may be received by each of the second AP 105-*b* and the third AP 105-*c*. The MAP-Sch-Trigger 310 may be a MAP PPDU that the first AP 105-*a* transmits to initiate scheduling multi-AP communications. The second AP 105-*b* and the third AP 105-*c* may transmit one or more multi-AP scheduling 315 communications that may be received by one or more associated STAs, and that are also received by the first AP 105-*a*. The first AP 105-*a*, based on transmissions of the second AP 105-*b* and the third AP 105-*c*, may determine wireless resources (e.g., frequency resources, time resources, or combinations thereof) that will be used for multi-AP communications in a second portion of the TxOP 317. The first AP 105-*a* may then transmit a MAP-trigger 320 in the second portion of the TxOP 317, which may indicate to each of the other APs 105 that multi-AP coordinated transmission 325 may commence. In some cases, multi-AP coordinated transmission 325 may include transmissions from all participating BSSs simultaneously within the second portion of the TxOP 317. Resources within the multi-AP coordinated transmission 325 may be allocated, as indicated above, based on time resources, frequency resources, or using coordinated OFDMA using orthogonal channels.

Figure 4:
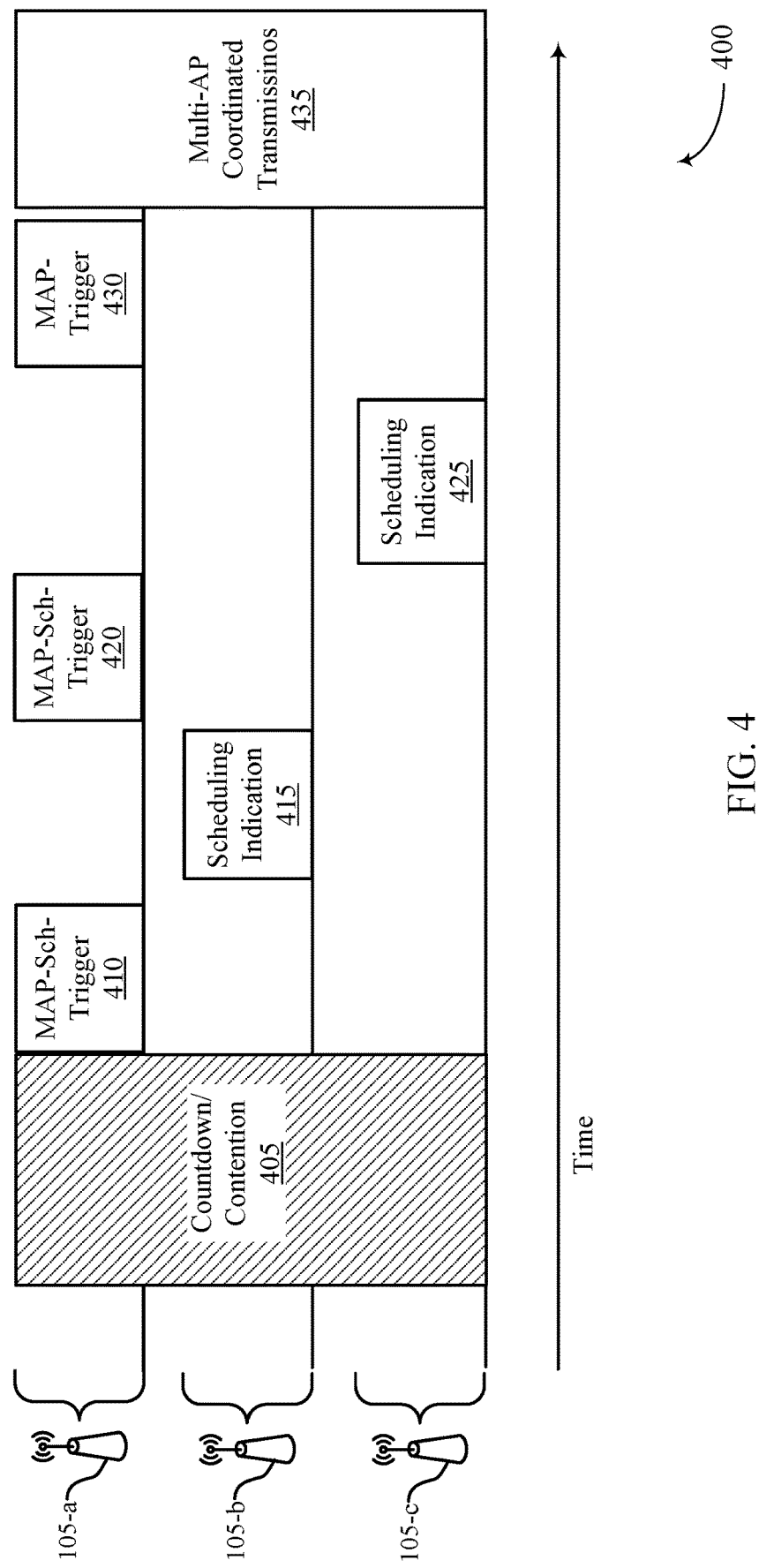
FIG. 4 illustrates an example of a multi-AP coordination technique that supports multi-access point scheduling in wireless local area networks in accordance with aspects of the present disclosure.

FIG. 4 illustrates an example of a multi-AP scheduling technique 400 that supports multi-access point scheduling in wireless local area networks in accordance with aspects of the present disclosure. In some examples, multi-AP scheduling technique 400 may implement aspects of wireless communication system 100 or 200. In this example, first AP 105-*a*, second AP 105-*b*, and third AP 105-*c* may perform coordinated transmissions.

Initially, each of the APs 105 may contend for access to a wireless channel during a contention/countdown window 405. In some cases, the first AP 105-*a* may be the first to contend for channel access and may win the medium. In some cases, similarly as discussed above, one or more of the other APs 105 may attempt to access the channel before the first AP 105-*a* wins contention, but may not win contention. Upon winning the contention-based channel access procedure, the first AP 105-*a* may transmit a scheduling trigger such as a MAP-Sch-Trigger 410, which may be received by the second AP 105-*b*. The MAP-Sch-Trigger 410 may be a MAP PPDU that the first AP 105-*a* transmits to each neighboring AP 105, one at a time, to initiate scheduling of multi-AP communications. The second AP 105-*b*, in this case, may transmit a scheduling indication 415 to its associated STAs, that may also be received by the first AP 105-*a*. The first AP 105-*a* may then send a second MAP-Sch-Trigger 420, which may be received by the third AP 105-*c*. The third AP 105-*c*, in this case, may transmit a scheduling indication 425 to its associated STAs, that may also be received by the first AP 105-*a*. The first AP 105-*a*, based on the scheduling indications 415 and 425, may determine resources for transmissions of each AP 105, and may transmit a MAP-Trigger 430 to initiate the multi-AP coordinated transmissions 435.

In this example, because only one AP 105 is targeted at any time by the MAP-Sch-trigger 410 or 420, the scheduling indications 415 and 425 will not interfere with each other. In some cases, the scheduling indications 415 and 425 may include a scheduling indication (SI) frame transmission that is sent by each AP 105 to its associated STAs (e.g., in a SU PPDU format). The first AP 105-1, as the TXOP Owner AP, monitors SI frames and may determine when to poll the next-in-line AP. Such a technique provides relatively simple scheduling for multi-AP communications, although time resources associated with multiple APs are consumed.

Figure 5:
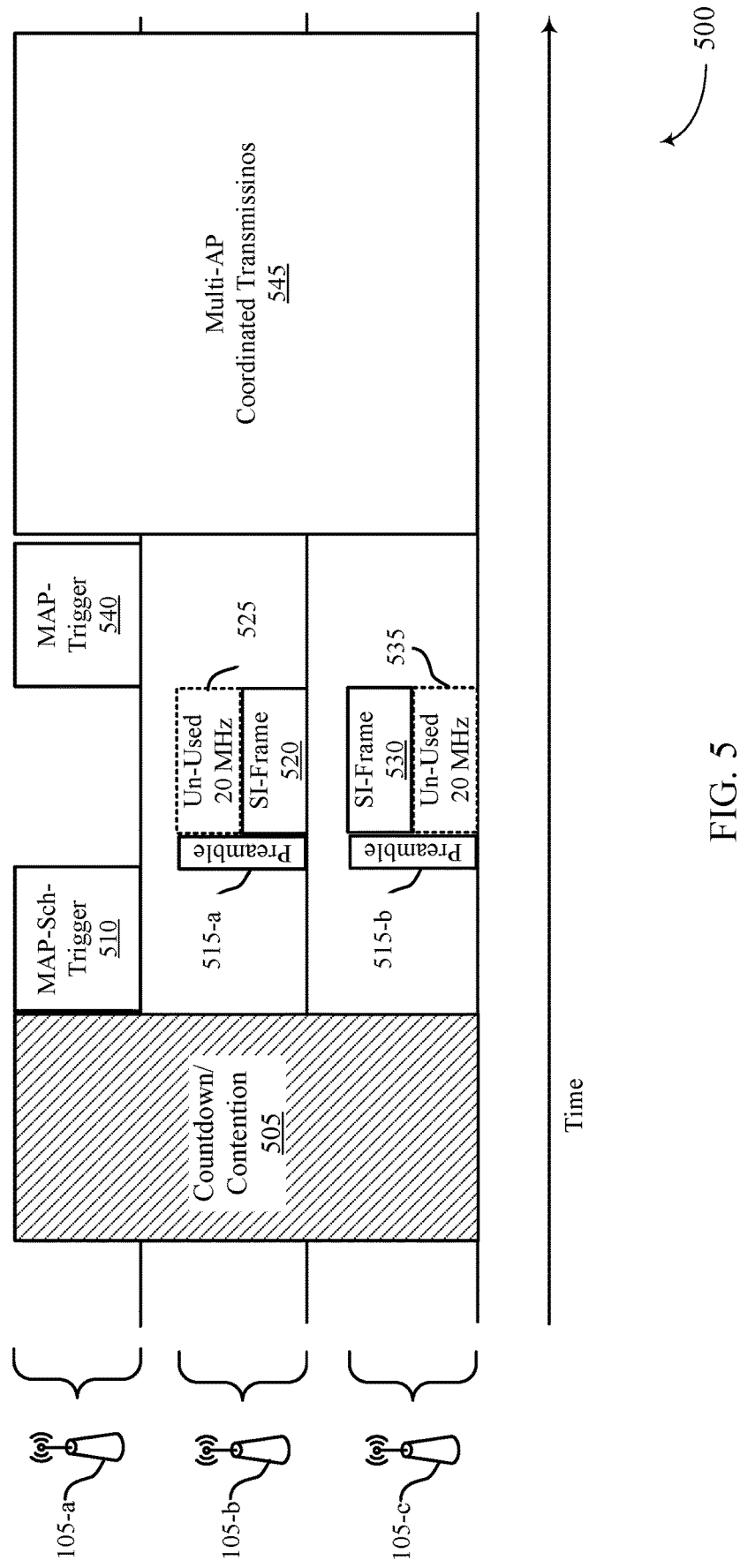
FIG. 5 illustrates an example of concurrent scheduling for multiple APs that supports multi-access point scheduling in wireless local area networks in accordance with aspects of the present disclosure.

FIG. 5 illustrates an example of a concurrent scheduling for multiple APs 500 that supports multi-access point scheduling in wireless local area networks in accordance with aspects of the present disclosure. In some examples, concurrent scheduling for multiple APs 500 may implement aspects of wireless communication system 100 or 200. In this example, first AP 105-*a*, second AP 105-*b*, and third AP 105-*c* may perform coordinated transmissions in which concurrent scheduling of multiple APs 105 may be implemented.

Similarly as discussed above, in the example of FIG. 5, each of the APs 105 may contend for access to a wireless channel during a contention/countdown window 505. In some cases, the first AP 105-*a* may be the first to contend for channel access and may win the medium. In some cases, similarly as discussed above, one or more of the other APs 105 may attempt to access the channel before the first AP 105-*a* wins contention, but may not win contention. Upon winning the contention-based channel access procedure, the first AP 105-*a* may transmit a scheduling trigger such as a MAP-Sch-Trigger 510, which may be received by the second AP 105-*b* and the third AP 105-*b*. The MAP-Sch-Trigger 510 may be a MAP PPDU that the first AP 105-*a* transmits to each neighboring AP 105 to initiate scheduling of multi-AP communications. The second AP 105-*b* and the third AP 105-*c*, in this case, may concurrently transmit a scheduling indication. In some cases, the scheduling indication may be provided in a MAP-PPDU from each of the second AP 105-*b* and third AP 105-*c* in which a subchannel used for transmission of a SI frame may be derived from the MAP-Sch-Trigger 510. In the example of FIG. 5, the second AP 105-*b* may transmit a scheduling indication that includes a preamble 515-*a*, and a SI-frame 520 that occupies a first sub-channel of multiple available subchannels (e.g., a first 20 MHz channel of multiple available 20 MHz channels). In this example, two subchannels are illustrated, and the second AP 105-*b* has an unused second subchannel 525. Similarly, the third AP 105-*c* may transmit a scheduling indication that includes a preamble 515-*b*, and a SI-frame 530 that occupies the second subchannel, leaving the first subchannel as an unused subchannel 535. Thus, the different SI frames 520 and 530 will not interfere with each other, and can be concurrently transmitted, which may more efficiently use time and frequency resources.

In some cases, the MAP-Sch-Trigger 510 may be transmitted by the first AP 105-*a*, as the TxOP owner AP, to each of the other neighboring APs 105, and may trigger the other APs 105 to transmit the SI Frames 520 and 530. In some cases, the preambles 515 transmitted by each AP 105 include and AP identifier (e.g., expressed using short BSSID or Color code, or special associated ID (AID)) and an indication of a subchannel of the SI frame. In some cases, the preamble 515 and SI frames 520 and 530 may be formatted in a MAP-PPDU. Associated STAs of the different APs 105 may, in some cases, determine the subchannel used by its AP 105 by decoding the preamble 515, and each STA in the associated BSS may tune to the subchannel assigned for that AP 105, and all per-STA information may be carried within the SI frame (e.g., MAC information).

The first AP 105-a, based on the SI frames 520 and 530, may determine resources for transmissions of each AP 105, and may transmit a MAP-Trigger 540 to initiate the multi-AP coordinated transmissions 545.

As indicated above, in some cases a MAP PPDU may be defined that provides multi-AP coordination and scheduling information. Various different formats may be used for the MAP-PPDU. In some cases, multiple APs 105 may respond with the MAP PPDU after the reception of a Trigger frame sent by the TXOP Owner, namely the first AP 105-a in the above examples. The response from the other APs 105 may have frequency/time correction as in HE trigger-based (TB) PPDUs. The preambles 515 sent by all of the responding APs 150 may be the same to provide that there is no collision, and the preambles 515 may be transmitted using the entire bandwidth of the PPDU. STAs that are associated with each of the APs 105 may derive the sub-channel in which its associated AP sends its PSDUs, and in some cases the preamble 515 of the MAP PPDU may carry a BSS identifier, and a corresponding mapping to the subchannel. Further, STAs associated to all responding APs 105 may be expected to be on the TXOP Owner's primary channel. In such cases, the MAP-Sch-Trigger 510 may indicate the subchannel for each neighboring AP 105, and may ensure that the common portions of the preamble 515 generated by the APs 105 are identical. In some cases, the common preamble 515 may be signaled explicitly, or derived implicitly from the MAP-Sch-Trigger 510.

Figure 6A:
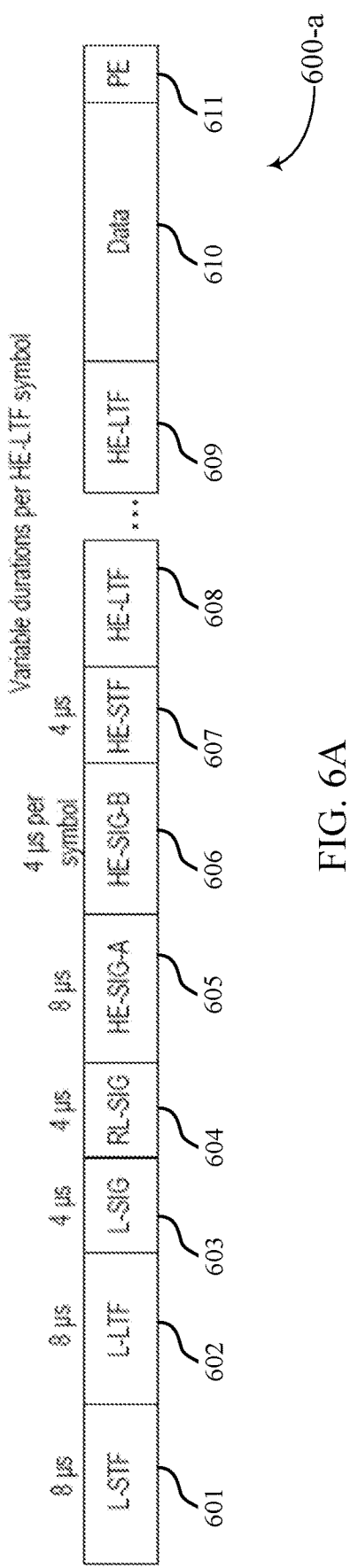
FIGS. 6A-6G illustrate examples of various multi-AP physical protocol data units that support multi-access point scheduling in wireless local area networks in accordance with aspects of the present disclosure.

FIG. 6A illustrates one example of a MAP PPDU 600-a that supports multi-access point scheduling in wireless local area networks in accordance with aspects of the present disclosure. In some examples, multi-AP physical protocol data unit 600-a may implement aspects of wireless communication system 100 or 200. In this example, the MAP PPDU 600 may reuse a format of the defined HE MU PPDU, which may include a L-STF field 601, a L-LTF field 602, a L-SIG field 603, a RL-SIG field 604, a HE-SIG-A field 605, a HE-SIG-B field 606, HE-STF field 607, one or more HE-LTF fields 608 through 609, a data portion 610, and packet extension (PE) field 611. In this example, the MAP PPDU 600-a may use the STAID fields of HE-SIG-B field 606 to carry an identifier of each neighboring AP (e.g., as determined from a short BSSID, a color-code, or a special AID value of the APs).

In some cases, STA-ID field of HE-SIG B 606 may carry the AID of a STA. In some cases, for the purpose of coordinated re-use, the STA-ID may be overloaded to carry a BSS identifier of the AP, such that STAs associated with that BSS decode the corresponding resource unit. In some cases, one or more fields in the HE-SIG-A 605 may indicate if HE-SIG-B field 606 has an alternate interpretation. For example, by setting the BSS Color field in SIG-A to a special value (e.g., color=63). In other examples, UL Flag in SIG-A may be used (which in legacy system may be set to 1 when STA UL to AP, set to 0 when AP DL to STA, and in both cases the STA-ID may be set to the AID of intended STA, thus a transmitting AP will not set UL to 1), and for the purpose coordinated re-use, APs may set UL to 1 in the MU PPDU to indicates that STA-ID carries BSS identifiers. The BSS identifier may be set to, for example, a random AID value picked by each AP and advertised in the AP's beacon to inform associated STAs, derived based on the BSSID of the AP (e.g., STAs derive by applying a hash function to the BSSID), or a BSS color indication.

Figure 6B:
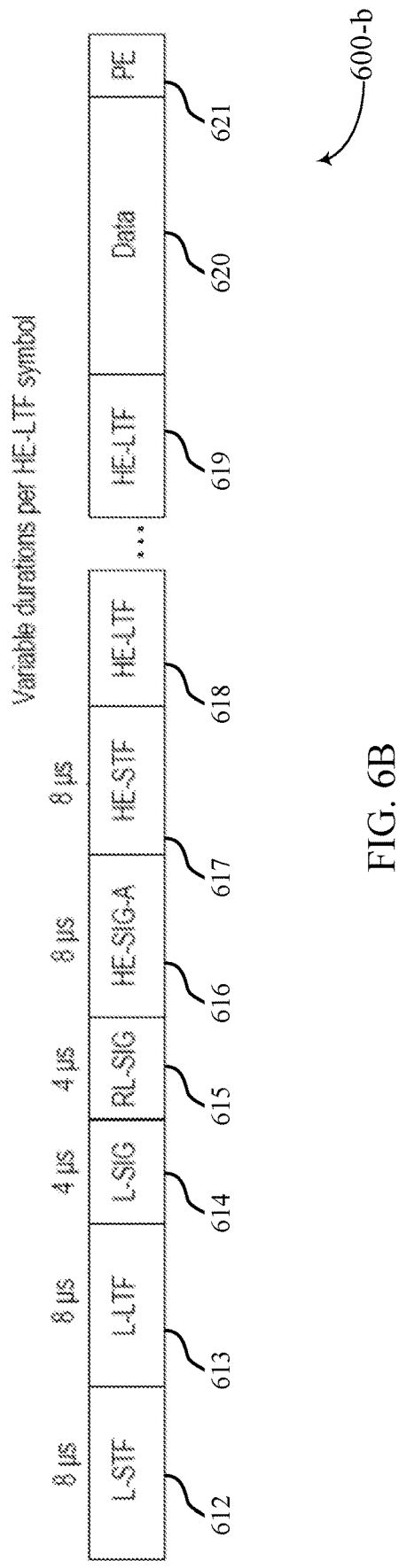

FIG. 6B illustrates another example of a MAP PPDU 600-b that supports multi-access point scheduling in wireless local area networks in accordance with aspects of the present disclosure. In some examples, multi-AP physical protocol data unit 600-b may implement aspects of wireless communication system 100 or 200. In this example, the MAP PPDU 600-b may modify a format of the defined HE TB PPDU, which may include a L-STF field 612, a L-LTF field 613, a L-SIG field 614, a RL-SIG field 615, a HE-SIG-A field 616, a HE-STF field 617, one or more HE-LTF fields 618 through 619, a data portion 620, and packet extension (PE) field 621. In this example, the MAP PPDU 600-b may have a new field defined (e.g., HE-SIG-C) to the preamble to carry the mapping of AP identifier to the subchannel. In other examples, the MAP PPDU 600-b may reuse the HE TB PPDU by reusing certain reserved/unused fields. For example, Spatial Reuse fields of the HE-SIG-A may be used for carrying the AP identifier and subchannel mapping. In further examples, a new EHT PPDU format may be defined to that provides information as discussed for MAP PPDUs. For example, SR bits in the HE-SIG-A field 616 may be used to provide coordinated transmission information. In such cases, 25+1 of 25+1 bits are available, and may be used to carry information such as an indication of a special interpretation of SIG-A (1-bit) (e.g., bit 23) BSS Color (e.g., 6-bits per BSS), or sub-channels available for re-use (16-bits, with 1 bit for each 20 MHz of a 320 MHz BW).

In some cases, to ensure that HE-SIG-A and HE-SIG-B fields sent by all APs are the same, the TXOP Owner AP may sends the contents of the HE SIG-A, HE-SIG-BA to the neighboring APs implicitly or explicitly, and may set the BSS color in HE-SIG-A to a single value (color 0, for example).

Figure 6C:
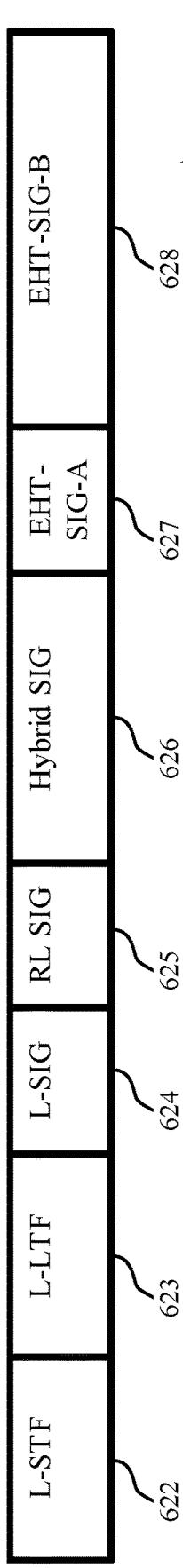

FIG. 6C illustrates an example of a MAP PPDU 600-c that supports multi-access point scheduling in wireless local area networks in accordance with aspects of the present disclosure. In some cases, various MAP OFDMA processes such as those implementing MAP PPDU 600-c may use a pre-setup packet. A pre-setup packet may be used to direct STAs to a content channel (e.g., a primary 20 MHz (P20) channel) associated with a serving AP. A MAP PPDU such as MAP PPDU 600-c may be transmitted after the pre-setup packet. In some examples, multi-AP physical protocol data unit 600-c may be transmitted after the pre-setup packet. In some examples, MAP PPDU 600-c may be similar to preamble puncturing, with additional aspects or differences related to tone plan. In one implementation, if a MAP PPDU 600-c crosses a channel boundary (e.g., a 20 MHz channel), boundary RUs may be voided. In another implementation, such boundary RUs may be used for data (e.g., the RUs may not be punctured). Such coordination for using boundary RUs for data may in some cases minimize signaling interference.

In some examples, all APs may transmit the same content using MAP PPDU format, and since all fields may be duplicated according to a given interval (e.g., a frequency interval, such as every 20 MHz), a preamble may be drawn for the given interval (e.g., a preamble is included for 20 MHz). In some cases, a channel used to signal a preamble associated with one AP may be different than a channel used to transmit data. For example, signaling of one AP in a preamble may be located in a different 20 MHz channel than data transmitted.

In this example, MAP PPDU format 600-c may include a L-STF field 622, a L-LTF field 623, a L-SIG field 624, a RL-SIG field 625, a Hybrid SIG field 626, an EHT-SIG-A field 627, and an EHT-SIG-B field. In MAP PPDU format 600-c, EHT-SIG-A and EHT-SIG-B common may be separately encoded for the MAP PPDU 600-c (e.g., EHT-SIG-A field 627 is a separate field from EHT-SIG-B field 628). Hybrid SIG in some cases may also be referred to as Pre-SIG or a Pre-SIG field. Hybrid SIG or Pre-SIG may carry information to interpret EHT PPDUs, which may include version independent fields and version dependent fields. In some cases Hybrid SIG field 626 may use a unified BSS color to identify a group of APs participating in MAP OFDMA. For example, Hybrid SIG field 626 may set the BSS color to a single value. In addition, the Hybrid SIG field 626 or EHT-SIG-A field 627 may include an indicator (e.g., a one bit indicator) that may indicate a MAP OFDMA pre-setup packet. In some cases, the indicator included in Hybrid SIG field 626 or EHT-SIG-A field 627 may enable a per-AP information field.

The per-AP information field may in some examples repurpose certain reserved or unused fields. For example, common RU allocation table for STAs may be repurposed for a sub-band allocation table for APs in the HE-SIG-B. The RU allocation table may in some cases be used for APs to indicate which multiples of a certain frequency within a channel (e.g., 20 MHz) may be occupied by each corresponding AP. In some other cases, the SIG-B per-user field for STAs is repurposed as a per-AP field for APs. In some of the described fields, a STA ID may be repurposed for various other parameters, including AP ID or BSS color.

In some cases, to ensure that EHT-SIG-A and EHT-SIG-B fields sent by all APs are the same, the TXOP Owner AP may send the contents of the HE SIG-A and HE-SIG-B to the neighboring APs implicitly or explicitly, and may set the BSS color in HE-SIG-A to a single value.

As discussed herein, different channels may be used for signaling of one AP using a preamble and for transmitting data. Accordingly, in some cases, MAP OFDMA information may be indicated prior to EHT-SIG-B user field 628. In one example, a new field may indicate the MAP OFDMA data PPDU. In another example, a compression field associated with EHT-SIG-B may be expanded (e.g., to two bits), where at least one bit may be used to indicate MAP OFDMA. In addition to the indication of MAP OFDMA, an allocation table for RUs (e.g., associated with puncturing) may be used for MAP OFDMA. A given RU allocation scheme be associated with a common value, and the RU allocation may include RUs which had crossed a channel boundary (e.g., RUs which would have otherwise been voided, for example, in a puncturing scenario).

Figure 6D:
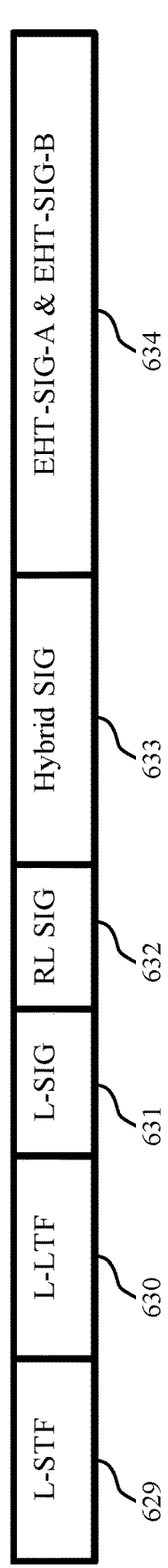

FIG. 6D illustrates an example of a MAP PPDU 600-d that supports multi-access point scheduling in wireless local area networks in accordance with aspects of the present disclosure. In some cases, various MAP OFDMA processes such as those implementing MAP PPDU 600-d may use a pre-setup packet. A pre-setup packet may be used to direct STAs to a content channel (e.g., a primary 20 MHz (P20) channel) associated with a serving AP. A MAP PPDU such as MAP PPDU 600-d may be transmitted after the pre-setup packet. In some examples, multi-AP physical protocol data unit 600-d may be transmitted after the pre-setup packet, and may implement aspects of wireless communication system 100 or 200. In some examples, MAP PPDU 600-c may be similar to preamble puncturing, with additional aspects or differences related to tone plan. In one implementation, if a MAP PPDU 600-c crosses a channel boundary (e.g., a 20 MHz channel), boundary RUs may be voided. In another implementation, such boundary RUs may be used for data (e.g., the RUs may not be punctured). Such coordination for using boundary RUs for data may in some cases minimize signaling interference.

In further examples, all APs may transmit the same content using MAP PPDU format, and since all fields may be duplicated according to a given interval (e.g., a frequency interval, such as every 20 MHz), a preamble may be drawn for the given interval (e.g., a preamble is included for 20 MHz). In some cases, a channel used to signal a preamble associated with one AP may be different than a channel used to transmit data. For example, signaling of one AP in a preamble may be located in a different 20 MHz channel than data transmitted.

In this example, MAP PPDU format 600-d may include a L-STF field 629, a L-LTF field 630, a L-SIG field 631, a RL-SIG field 632, a Hybrid SIG field 633, and a combination EHT-SIG-A and EHT-SIG-B field 634. In this example, EHT-SIG-A and EHT-SIG-B common may be jointly encoded for the MAP PPDU 600-d (e.g., EHT-SIG-A field EHT-SIG-B are part of one common field 634). Hybrid SIG in some cases may also be referred to as Pre-SIG or a Pre-SIG field. Hybrid SIG or Pre-SIG may carry information to interpret EHT PPDUs, which may include version independent fields and version dependent fields. In some cases, Hybrid SIG may use a unified BSS color to identify a group of APs participating in MAP OFDMA. For example, Hybrid SIG field 633 may set the BSS color to a single value. In addition, the Hybrid SIG field 633 or combination EHT-SIG-A and EHT-SIG-B field 634 may include an indicator (e.g., a one bit indicator) that may indicate a MAP OFDMA pre-setup packet. In some cases, the indicator included Hybrid SIG field 633 or combination EHT-SIG-A and EHT-SIG-B field 634 may enable a per-AP information field.

The per-AP information field may in some examples repurpose certain reserved/unused fields. For example, common RU allocation table for STAs may be repurposed for a sub-band allocation table for APs in the HE-SIG-B. The RU allocation table may in some cases be used for APs to indicate which multiples of a certain frequency within a channel (e.g., 20 MHz) may be occupied by each corresponding AP. In some other cases, the SIG-B per-user field for STAs is repurposed as a per-AP field for APs. In some of the described fields, a STA ID may be repurposed for various other parameters, including AP ID or BSS color.

In some cases, to ensure that EHT-SIG-A and EHT-SIG-B field sent by all APs are the same, the TXOP Owner AP may sends the contents of the HE SIG-A and HE-SIG-B to the neighboring APs implicitly or explicitly, and may set the BSS color to a single value.

As discussed herein, different channels may be used for signaling of one AP using a preamble and for transmitting data. Accordingly, in some cases, MAP OFDMA information may be indicated prior to EHT-SIG-A and EHT-SIG-B user field 634. In one example, a new field may indicate the MAP OFDMA data PPDU. In another example, a compression field associated with EHT-SIG-A and EHT-SIG-B may be expanded (e.g., to two bits), where at least one bit may be used to indicate MAP OFDMA. In addition to the indication of MAP OFDMA, an allocation table for RUs (e.g., associated with puncturing) may be used for MAP OFDMA. A given RU allocation scheme be associated with a common value, and the RU allocation may include RUs which had crossed a channel boundary (e.g., RUs which would have otherwise been voided, for example, in a puncturing scenario).

Figure 6E:
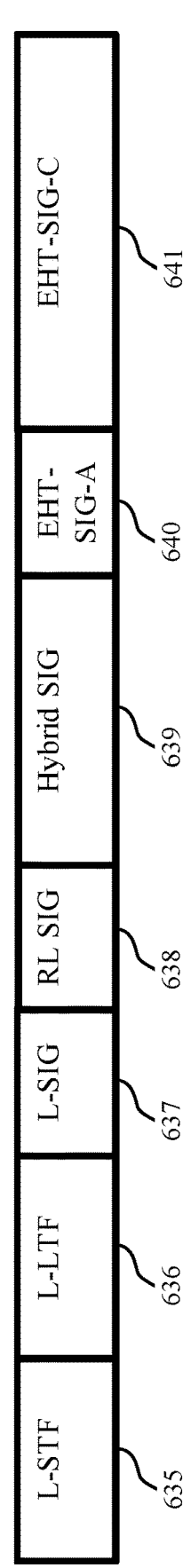

FIG. 6E illustrates an example of a MAP PPDU 600-e that supports multi-access point scheduling in wireless local area networks in accordance with aspects of the present disclosure. In some cases, various MAP OFDMA processes such as those implementing MAP PPDU 600-e may use a pre-setup packet. A pre-setup packet may be used to direct STAs to a content channel (e.g., a primary 20 MHz (P20) channel) associated with a serving AP. A MAP PPDU such as MAP PPDU 600-e may be transmitted after the pre-setup packet. In some examples, MAP PPDU 600-e may implement aspects of wireless communication system 100 or 200. In further examples, all APs may transmit the same content using MAP PPDU format, and since all fields may be duplicated according to a given interval (e.g., a frequency interval, such as every 20 MHz), a preamble may be drawn for the given interval (e.g., a preamble is included for 20 MHz).

In this example, MAP PPDU format 600-e may include a L-STF field 635, a L-LTF field 636, a L-SIG field 637, a RL-SIG field 638, a Hybrid SIG field 639, EHT-SIG-A field 640 and a EHT-SIG-C field 641. MAP PPDU format 600-e may in some cases not include an EHT-SIG-B field. In MAP PPDU format 600-e, the EHT-SIG-C field 641 may include per-AP fields to indicate information such an AP ID and a unified BSS color (e.g., to identify a group of APs participating in MAP OFDMA). In some cases, SIG C field 641 may set the BSS color to a single value. In addition, the EHT-SIG-C field 641 may include an indications of which multiples of a certain frequency within a channel (e.g., 20 MHz) may be occupied by each corresponding AP.

Figure 6F:
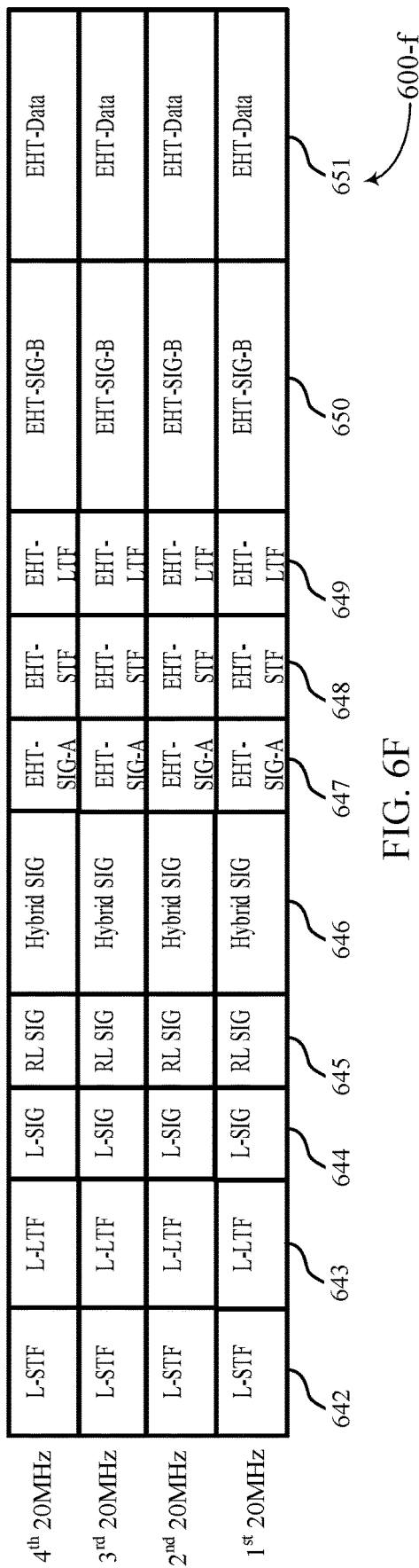

FIG. 6F illustrates an example of a MAP PPDU 600-f that supports multi-access point scheduling in wireless local area networks in accordance with aspects of the present disclosure. In some cases, various MAP OFDMA processes such as those implementing MAP PPDU 600-f may use a preamble section which may indicate, to a STA, content channels associated with a serving AP. MAP PPDU format 600-f may include a L-STF field 642, a L-LTF field 643, a L-SIG field 644, a RL-SIG field 645, a Hybrid SIG field 646, EHT-SIG-A field 647, EHT-STF field 648, EHT-LTF field 649, EHT-SIG-B field 650, and EHT Data field 651.

In the example of MAP PPDU 600-f, a preamble may include L-STF field 642, a L-LTF field 643, a L-SIG field 644, a RL-SIG field 645, a Hybrid SIG field 646, EHT-SIG-A field 647, EHT-STF field 648, EHT-LTF field 649 (e.g., components positioned before EHT-SIG-B field 650). Accordingly, each AP may transmit the same content in the preamble for MAP PPDU 600-f. In some examples, all APs may transmit the same content using MAP PPDU format 600-f, and all fields before EHT-SIG-B field 650 may be duplicated according to a given interval (e.g., a frequency interval, such as every 20 MHz). For example, fields may be duplicated as a 1st 20 MHz, a 2nd 20 MHz, a 3rd 20 MHz, and a 4th 20 MHz. In addition, Hybrid SIG field 646 may use a unified BSS color to identify a group of APs participating in MAP OFDMA. For example, Hybrid SIG field 646 may set the BSS color to a single value. In some cases, an indicator included Hybrid SIG field 646 or EHT-SIG-A field 647 may be used to indicate MAP OFDMA.

In addition, a per-AP information field may be used to identify sub-band allocation. In some cases, the per-AP information field may be duplicated according to a set frequency interval, for example, every 20 MHz. In the example of MAP PPDU structure 600-f, the per-AP information field may be included within a different field, such as EHT-SIG-A field 647. In addition, the modulation and coding scheme (MCS) and/or dual carrier modulation (DCM) of EHT-SIG-A field 647 may be indicated in an earlier field, such as in Hybrid SIG field 646.

The per-AP information field may in some cases include and AP ID or BSS color to identify the BSS/AP. In addition, the per-AP information field may include a N-bit channel bitmap associated with the total bandwidth of the PPDU (e.g., bandwidth N-times-B, 20 MHz). In some cases, the bitmap may be used to identify the sub-bands occupied by a BSS or AP. Further, the per-AP information field may include a bit field of one or two bits, which may indicate sub-band granularity among various sub-band frequency values (e.g., 20 MHz, 40 MHz, 80 MHz, 160 MHz, etc.).

EHT-SIG-B field 650 and EHT Data field 651 may follow the preamble portions of MAP PPDU 600-f. Beginning at EHT-SIG-B field 650, each AP may occupy sub-bands for transmission, where each sub-band may be a repetition of a given frequency. For example, each sub-band may be a multiple of 20 MHz. Signaling and data of each AP may be carried in such sub-bands as well (e.g., similar to a preamble puncturing scenario, where multiple 20 MHz channels are punctured, while other than an APs occupied sub-bands). An AP may use a number of different content channels (e.g., [1,2,1,2], or [1,2,3,4] of full bandwidth, or separate content channels for every 160 MHz). In addition, the AP may utilize an RU allocation table related to preamble puncturing.

EHT-STF field 648 and EHT-LTF field 649 may be located before EHT-SIG-B 650. In some cases, EHT-STF field 648 and EHT-LTF field 649 may include automatic gain control (AGC) settings in addition to channel estimate information that an AP may use before demodulating EHT-SIG-B field 650 and EHT-Data field 651.

Figure 6G:
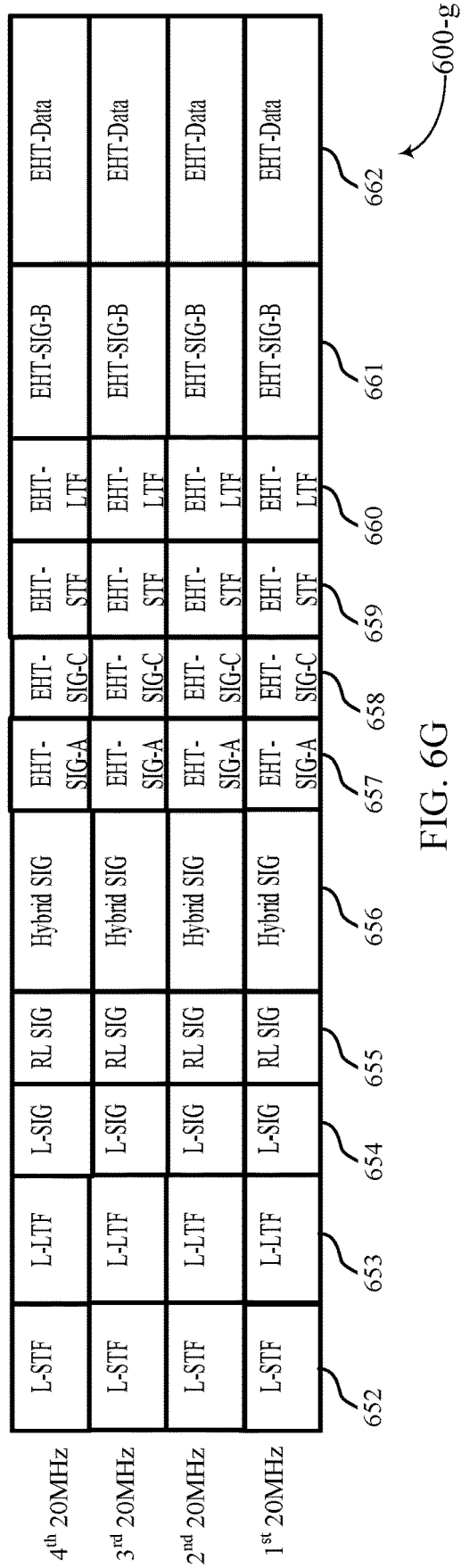

FIG. 6G illustrates an example of a MAP PPDU 600-g that supports multi-access point scheduling in wireless local area networks in accordance with aspects of the present disclosure. In some cases, various MAP OFDMA processes such as those implementing MAP PPDU 600-g may use a preamble section which may indicate, to a STA, content channels associated with a serving AP. MAP PPDU format 600-g may include a L-STF field 652, a L-LTF field 653, a L-SIG field 654, a RL-SIG field 655, a Hybrid SIG field 656, EHT-SIG-A field 657, EHT-SIG-C field 658, EHT-STF field 659, EHT-LTF field 660, EHT-SIG-B field 661, and EHT Data field 662.

In the example of MAP PPDU 600-g, a preamble may include L-STF field 652, a L-LTF field 653, a L-SIG field 654, a RL-SIG field 655, a Hybrid SIG field 656, EHT-SIG-A field 657, EHT-SIG-C field 658, EHT-STF field 659, EHT-LTF field 660 (e.g., components positioned before EHT-SIG-B field 661). Accordingly, each AP may transmit the same content in the preamble for MAP PPDU 600-g. In some examples, all APs may transmit the same content using MAP PPDU format 600-g, and all fields before EHT-SIG-B field 661 may be duplicated according to a given interval (e.g., a frequency interval, such as every 20 MHz). For example, fields may be duplicated as a 1st 20 MHz, a 2nd 20 MHz, a 3rd 20 MHz, and a 4th 20 MHz. In addition, Hybrid SIG field 656 may use a unified BSS color to identify a group of APs participating in MAP OFDMA. For example, Hybrid SIG field 656 may set the BSS color to a single value. In some cases, an indicator included Hybrid SIG field 656 or EHT-SIG-A field 657 may be used to indicate MAP OFDMA.

In addition, a per-AP information field may be used to identify sub-band allocation. In some cases, the per-AP information field may be duplicated according to a set frequency interval, for example, every 20 MHz. In the example of MAP PPDU structure 600-*f*, the per-AP information field may be included within a different field, such as EHT-SIG-A field 657. Additionally, or alternatively, the per-AP information field may be included in the EHT-SIG-C field 658, which may be located between EHT-SIG-A field 657 and EHT-SIG-B field 661. In addition, the modulation and coding scheme (MCS) and/or dual carrier modulation (DCM) of EHT-SIG-C field 658 may be indicated in an earlier field, such as in Hybrid SIG field 656 or EHT-SIG-A field 657.

The per-AP information field may in some cases include and AP ID or BSS color to identify the BSS/AP. In addition, the per-AP information field may include a N-bit channel bitmap associated with the total bandwidth of the PPDU (e.g., bandwidth N-times-B, 20 MHz). In some cases, the bitmap may be used to identify the sub-bands occupied by a BSS or AP. Further, the per-AP information field may include a bit field of one or two bits, which may indicate sub-band granularity among various sub-band frequency values (e.g., 20 MHz, 40 MHz, 80 MHz, 160 MHz, etc.).

EHT-SIG-B field 661 and EHT Data field 662 may follow the preamble portions of MAP PPDU 600-*g*. Beginning at EHT-SIG-B field 661, each AP may occupy sub-bands for transmission, where each sub-band may be a repetition of a given frequency. For example, each sub-band may be a multiple of 20 MHz. Signaling and data of each AP may be carried in such sub-bands as well (e.g., similar to a preamble puncturing scenario, where multiple 20 MHz channels are punctured, while other than an APs occupied sub-bands). An AP may use a number of different content channels (e.g., [1,2,1,2], or [1,2,3,4] of full bandwidth, or separate content channels for every 160 MHz). In addition, the AP may utilize an RU allocation table related to preamble puncturing.

EHT-STF field 659 and EHT-LTF field 660 may be located before EHT-SIG-B field 661. In some cases, EHT-STF field 659 and EHT-LTF field 660 may include automatic gain control (AGC) settings in addition to channel estimate information that an AP may use before demodulating EHT-SIG-B field 661 and EHT-Data field 662.

Figure 7A:
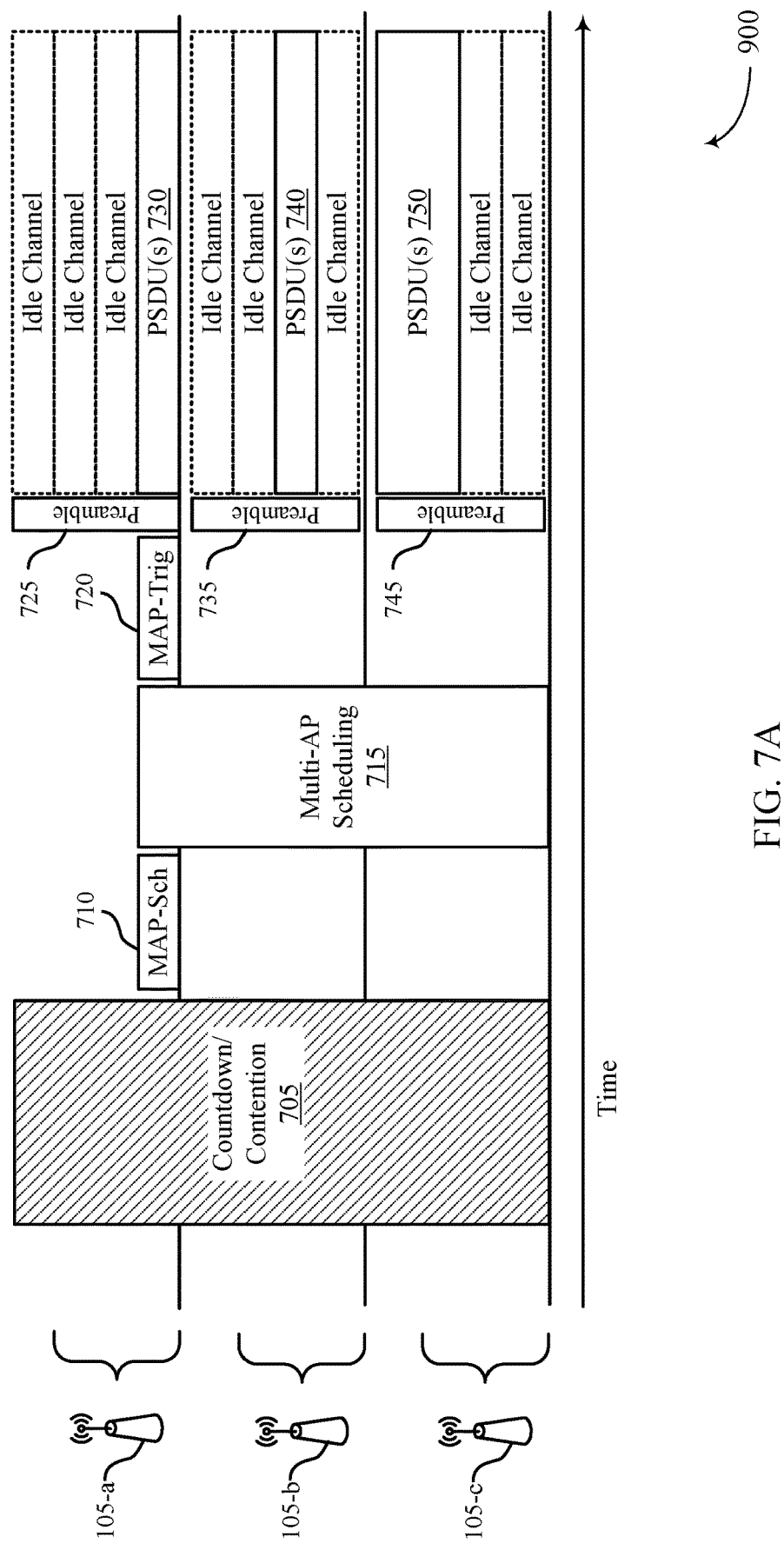
FIG. 7A illustrates an example of a protocol sequence for downlink orthogonal frequency division multiple access (OFDMA) that supports multi-access point scheduling in wireless local area networks in accordance with aspects of the present disclosure.

FIG. 7A illustrates an example of a protocol sequence for downlink orthogonal frequency division multiple access (OFDMA) 700 that supports multi-access point scheduling in wireless local area networks in accordance with aspects of the present disclosure. In some examples, protocol sequence for downlink orthogonal frequency division multiple access (OFDMA) 700 may implement aspects of wireless communication system 100 or 200. In this example, first AP 105-*a*, second AP 105-*b*, and third AP 105-*c* may perform coordinated transmissions in which concurrent scheduling of multiple APs 105 may be implemented.

Similarly as discussed above, in the example of FIG. 7A, each of the APs 105 may contend for access to a wireless channel during a contention/countdown window 705. In some cases, the first AP 105-*a* may be the first to contend for channel access and may win the medium. In some cases, similarly as discussed above, one or more of the other APs 105 may attempt to access the channel before the first AP 105-*a* wins contention, but may not win contention. Upon winning the contention-based channel access procedure, the first AP 105-*a* may transmit a scheduling trigger such as a MAP-Sch-Trigger 710, which may be received by the second AP 105-*b* and the third AP 105-*b*. The MAP-Sch-Trigger 710 may be a MAP PPDU that the first AP 105-*a* transmits to each neighboring AP 105 to initiate scheduling of multi-AP communications. The second AP 105-*b* and the third AP 105-*c*, in this case, may perform multi-AP scheduling 715, such as according to any one of the examples discussed herein. The first AP 105-*a*, based on the multi-AP scheduling 715 may, may determine resources for transmissions of each AP 105, and may transmit a MAP-Trigger 720 to initiate the multi-AP coordinated transmissions.

In this example, multi-AP coordinated transmission may use OFDMA to provide concurrent transmissions of multiple APs 105 and STAs. In this example, the first AP 105-*a* may transmit preamble 725 that spans a number of subchannels, and PSDU(s) 730 using a first subchannel (e.g., a primary 20 MHz channel), while remaining subchannels are idle. The second AP 105-*b* may transmit preamble 735 that spans a number of subchannels, and PSDU(s) 740 using a second subchannel (e.g., a secondary 20 MHz channel), while remaining subchannels are idle. Likewise, the third AP 105-*c* may transmit preamble 745 that spans a number of subchannels, and PSDU(s) 750 using a third subchannel (e.g., a secondary 40 MHz channel), while remaining subchannels are idle.

In this example, the first AP 105-*a*, as the TXOP owner, may indicate the sub-channel for each neighboring AP 105. Such an indication may be provided in MAP-Sch-Trigger 710, and the second AP 105-*b* and third AP 105-*c* may use the allocated subchannel to serve their STAs. In some cases, the subchannel used for data communications may be different from a subchannel that is assigned to send an SI frame during Multi-AP scheduling phase in examples that provide concurrent transmissions of SI frames. In some cases, each neighboring AP may select the STAs that will be served during a coordinated OFDMA phase, and may provide an indication of the selected STAs using an SI frame (the first AP 105-*a* may not be aware of the list of selected STAs). In some examples, as part of multi-AP scheduling 715, the second AP 105-*b* and third AP 105-*c* may transmit SI frames to STAs that are selected to be served during coordinated OFDMA, and the assigned RU within the sub-channel that the AP is assigned by the first AP 105-*a* as the TxOP owner. In some cases, the first AP 105-*a* may assign the subchannel for coordinated OFDMA transmissions using MAP-Sch-Trigger 710 frame.

In this example, coordinated OFDMA transmissions are initiated in response to the MAP-trigger 720. In some cases, coordinated OFDMA may be indicated in the MAP-PPDU format or in the HE TB PPDU format in which case the information on scheduled STAs may be communicated during Multi-AP scheduling 715 phase. The MAP-Trigger 720 may provide scheduling information for coordinated OFDMA, which may include sub-channel assignment for each of the participating APs 105 for use in transmitting coordinated OFDMA communications. In some cases, sub-channel assignments may be provided in the MAP-scheduling-trigger 710, and the assignments may carry over to the coordinated OFDMA communications. In other cases, the first AP 105-*a* may assign the sub-channel at the time of scheduling so that resources can be allocated more efficiently.

Figure 7B:
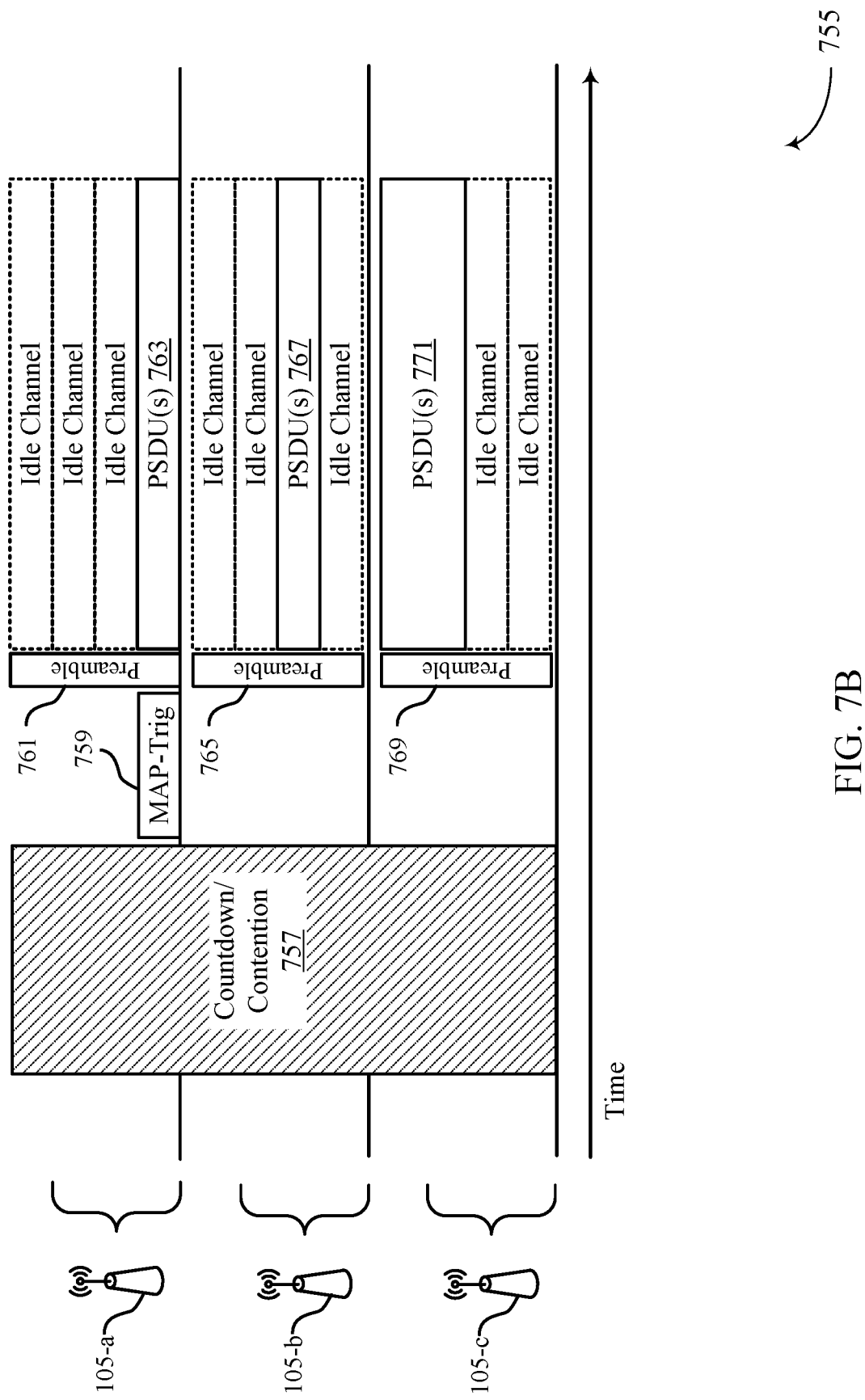
FIG. 7B illustrates another example of a protocol sequence for downlink OFDMA that supports multi-access point scheduling in wireless local area networks in accordance with aspects of the present disclosure.

FIG. 7B illustrates another example of a protocol sequence for downlink OFDMA 755 that supports multi-access point scheduling in wireless local area networks in accordance with aspects of the present disclosure. In some examples, protocol sequence for downlink OFDMA 755 may implement aspects of wireless communication system 100 or 200. In this example, similarly as with the example of FIG. 7A, first AP 105-a, second AP 105-b, and third AP 105-c may perform coordinated transmissions in which concurrent scheduling of multiple APs 105 may be implemented.

In the example of FIG. 7B, each of the APs 105 may contend for access to a wireless channel during a contention/countdown window 757. In some cases, the first AP 105-a may be the first to contend for channel access and may win the medium. In some cases, similarly as discussed above, one or more of the other APs 105 may attempt to access the channel before the first AP 105-a wins contention, but may not win contention. Upon winning the contention-based channel access procedure, in this example, the multi-AP scheduling step may be skipped, and the first AP 105-a may transmit a MAP-Trigger 759 directly following contention, which may indicate the mapping of AP identifiers to corresponding subchannel. For example, the MAP-Trigger 759 may provide scheduling information for coordinated OFDMA, which may include sub-channel assignment for each of the participating APs 105 for use in transmitting coordinated OFDMA communications.

In the example of FIG. 7B, following MAP-Trigger 759, the first AP 105-a may initiate transmission of a MAP PPDUs following a SIFS after the MAP-Trigger 759, which may include a preamble 761 and PSDU(s) 763. Similarly, the second AP 105-b and third AP 105-c may transmit respective preambles 765 and 769 followed by corresponding PSDU(s) 767 and 771. Preambles 761-769 and PSDU(s) 763-771 may be transmitted from each AP 105 simultaneously, and such transmissions may start following a SIFS after MAP-Trigger 759. In this example, the first AP 105-a may transmit preamble 761 that spans a number of subchannels, and PSDU(s) 763 using a first subchannel (e.g., a primary 20 MHz channel), while remaining subchannels are idle. The second AP 105-b may transmit preamble 765 that spans a number of subchannels, and PSDU(s) 767 using a second subchannel (e.g., a secondary 20 MHz channel), while remaining subchannels are idle. Likewise, the third AP 105-c may transmit preamble 769 that spans a number of subchannels, and PSDU(s) 771 using a third subchannel (e.g., a secondary 40 MHz channel), while remaining subchannels are idle. The preambles 761, 765, and 769 may include, in some cases, a common part and a per-AP part, as will be discussed in more detail with respect to FIG. 7C.

Figure 7C:
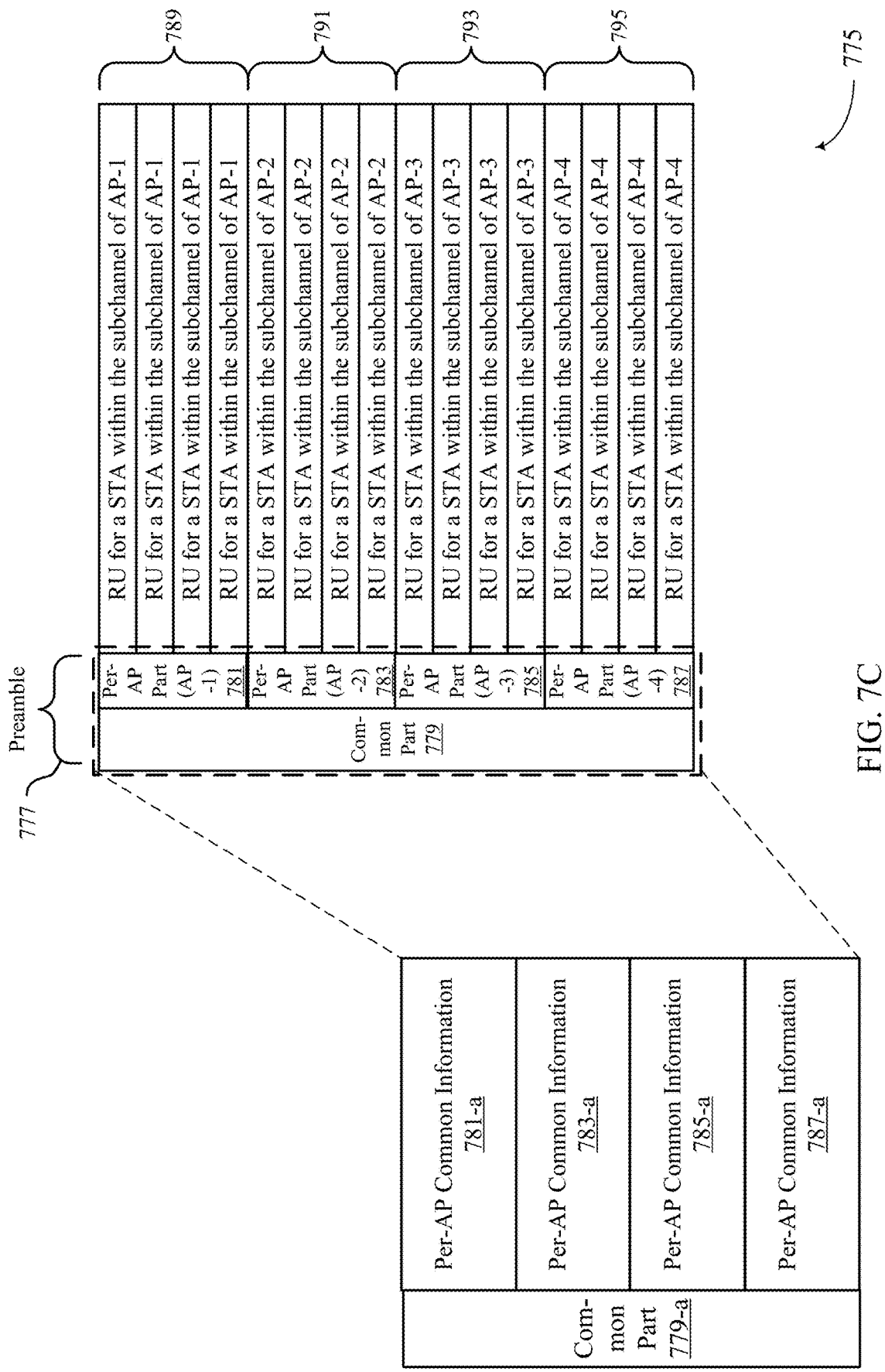
FIG. 7C illustrates an example of a multi-AP PPDU configuration that supports multi-access point scheduling in wireless local area networks in accordance with aspects of the present disclosure.

FIG. 7C illustrates an example of MAP PPDUs 775 that support multi-access point scheduling in wireless local area networks in accordance with aspects of the present disclosure. In some examples, MAP PPDUs 775 may implement aspects of wireless communication system 100 or 200. In this example, a preamble 777 of each AP may include a common part 779 and a per-AP part 781-787. MAP PPDUs 775, in some cases, may be used for multiple purposes, which may include allowing a non-TxOP-owning AP (e.g., AP-2, AP-3, and AP-4) to respond to the TxOP owning AP (e.g., AP-1) and provide information such as common information for one or more STAs of an AP. MAP PPDUs may also allow APs 105 to send coordinated downlink multi-user data to associated STAs within resource units (RUs) 789-795 within one or more sub-channels of the particular AP 105.

The common part 779 of preamble 777 may provide information that indicates a mapping of AP identifier to an associated subchannel, and may also indicate whether a per-AP part 781-787 is present or absent. In some cases, the per-AP part 781-787 need not be present. The per-AP part 781-785 of preamble 777, when present, may include information for STAs associated with the AP. For example, the per-AP part 781-785 may include one or more of a mapping of STA identifiers to particular RUs with in the sub-channel of the AP. In some cases, the per-AP part 781-785 may also carry information meant for the TXOP-owner AP.

The STAs associated with each AP, in such cases, may decode the common-part 779 of the MAP-PPDU preamble 777 to determine its sub-channel, and tune to the sub-channel, then decode the corresponding per-AP part 781-787 of the preamble 777 that is sent within the allocated sub-channel, and determine a STA-ID to RU mapping or a mapping of broadcast RUs (or both). A receiving STA may then tune to the RU that maps to its STA-ID. If a STA is not included in a mapping of RUs, that STA may be allowed to go to doze state in some cases. In some examples, the indication of resource units for individual STAs or for a broadcast by an AP 105 may be in a signaling portion of the preamble 777, such as a new SIG-C portion that provides a RU mapping per STA-ID. Accordingly, the preamble 777 may indicate an allocation or assignment of resource units to each STA that will be receiving PSDU(s) from the AP during the multi-AP coordinated transmission, and in some cases, may indicate resource units associated with one or more PSDU(s) to be broadcast from the AP 105 to each STA associated with the AP 105 during the multi-AP coordinated transmission.

Figure 8:
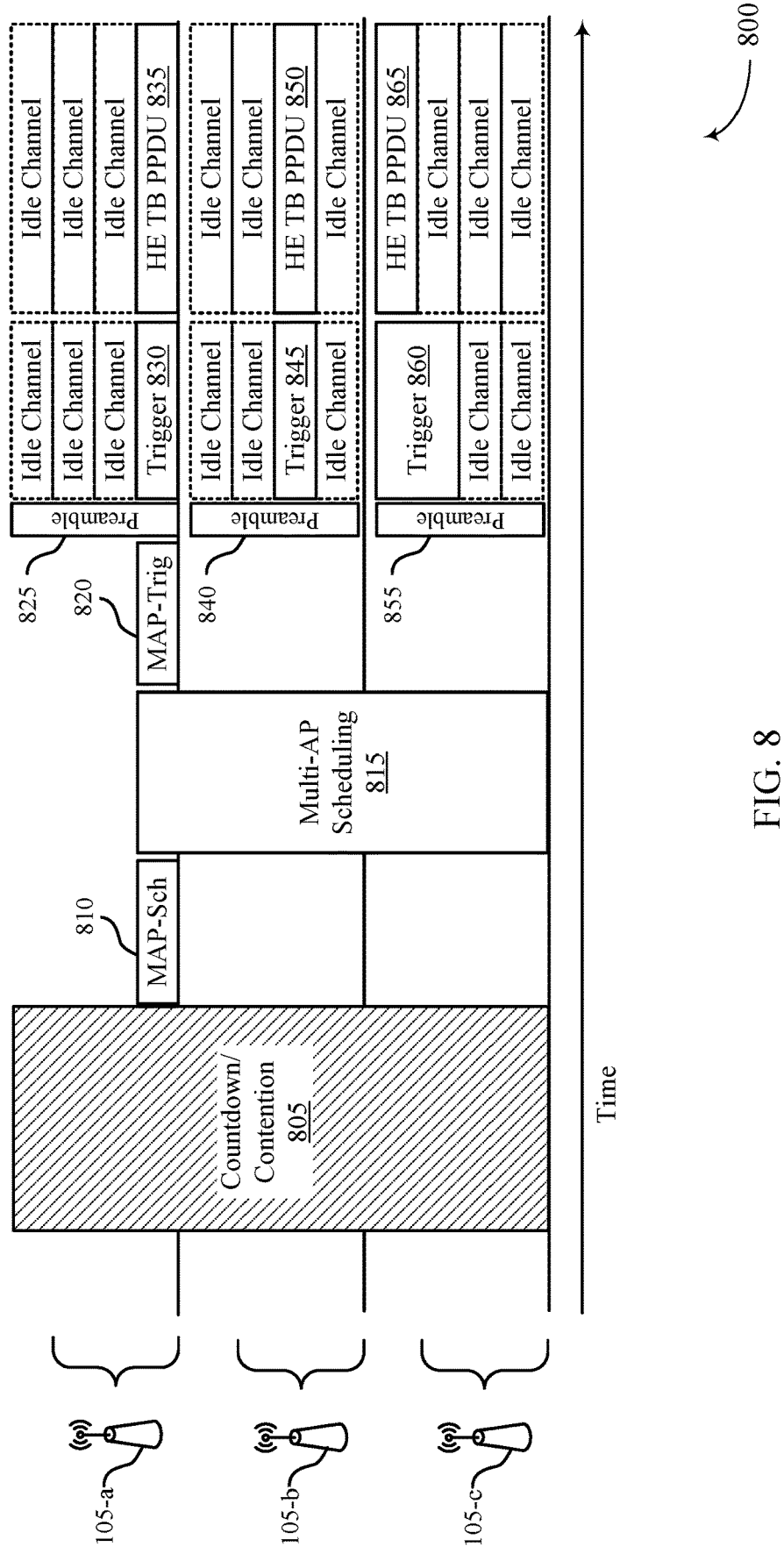
FIG. 8 illustrates an example of a protocol sequence for uplink OFDMA that supports multi-access point scheduling in wireless local area networks in accordance with aspects of the present disclosure.

FIG. 8 illustrates an example of a protocol sequence for uplink orthogonal frequency division multiple access (OFDMA) 800 that supports multi-access point scheduling in wireless local area networks in accordance with aspects of the present disclosure. In some examples, protocol sequence for uplink OFDMA 800 may implement aspects of wireless communication system 100 or 200. In this example, first AP 105-a, second AP 105-b, and third AP 105-c may perform coordinated transmissions in which concurrent scheduling of multiple APs 105 may be implemented.

Similarly as discussed above, in the example of FIG. 7, each of the APs 105 may contend for access to a wireless channel during a contention/countdown window 805. In some cases, the first AP 105-a may be the first to contend for channel access and may win the medium. In some cases, similarly as discussed above, one or more of the other APs 105 may attempt to access the channel before the first AP 105-a wins contention, but may not win contention. Upon winning the contention-based channel access procedure, the first AP 105-a may transmit a scheduling trigger such as a MAP-Sch-Trigger 810, which may be received by the second AP 105-b and the third AP 105-b. The MAP-Sch-Trigger 810 may be a MAP PPDU that the first AP 105-a transmits to each neighboring AP 105 to initiate scheduling of multi-AP communications. The second AP 105-b and the third AP 105-c, in this case, may perform multi-AP scheduling 815, such as according to any one of the examples discussed herein. The first AP 105-a, based on the multi-AP scheduling 815 may, may determine resources for transmissions of each AP 105, and may transmit a MAP-Trigger 820 to initiate the multi-AP coordinated transmissions.

In this example, multi-AP coordinated transmission may use OFDMA to provide concurrent transmissions of multiple APs 105 and STAs, and uplink transmissions of the STAs may be triggered by a corresponding downlink transmission from an AP. In this example, the first AP 105-a may transmit preamble 825 that spans a number of subchannels, and trigger 830 using a first subchannel (e.g., a primary 20 MHz channel), while remaining subchannels are idle. The trigger 830 may trigger the corresponding STA(s) to transmit a HE TB PPDU 835 in the first subchannel, while remaining subchannels are idle. The second AP 105-b may transmit preamble 840 that spans a number of subchannels, and trigger 845 using a second subchannel (e.g., a secondary 20 MHz channel), while remaining subchannels are idle. The trigger 845 may trigger the corresponding STA(s) to transmit a HE TB PPDU 850 in the second subchannel, while remaining subchannels are idle. The third AP 105-*c* may transmit preamble 855 that spans a number of subchannels, and trigger 860 using a third subchannel (e.g., a secondary 40 MHz channel), while remaining subchannels are idle. The trigger 860 may trigger the corresponding STA(s) to transmit a HE TB PPDU 865 in all or a portion of the third subchannel, while remaining subchannels are idle. In some examples, the HE TB PPDUs on different subchannels may end at different times. In this example, the first AP 105-*a*, as the TXOP owner, may indicate the sub-channel for each neighboring AP 105 in a similar manner as discussed above with respect to FIG. 7.

Figure 9:
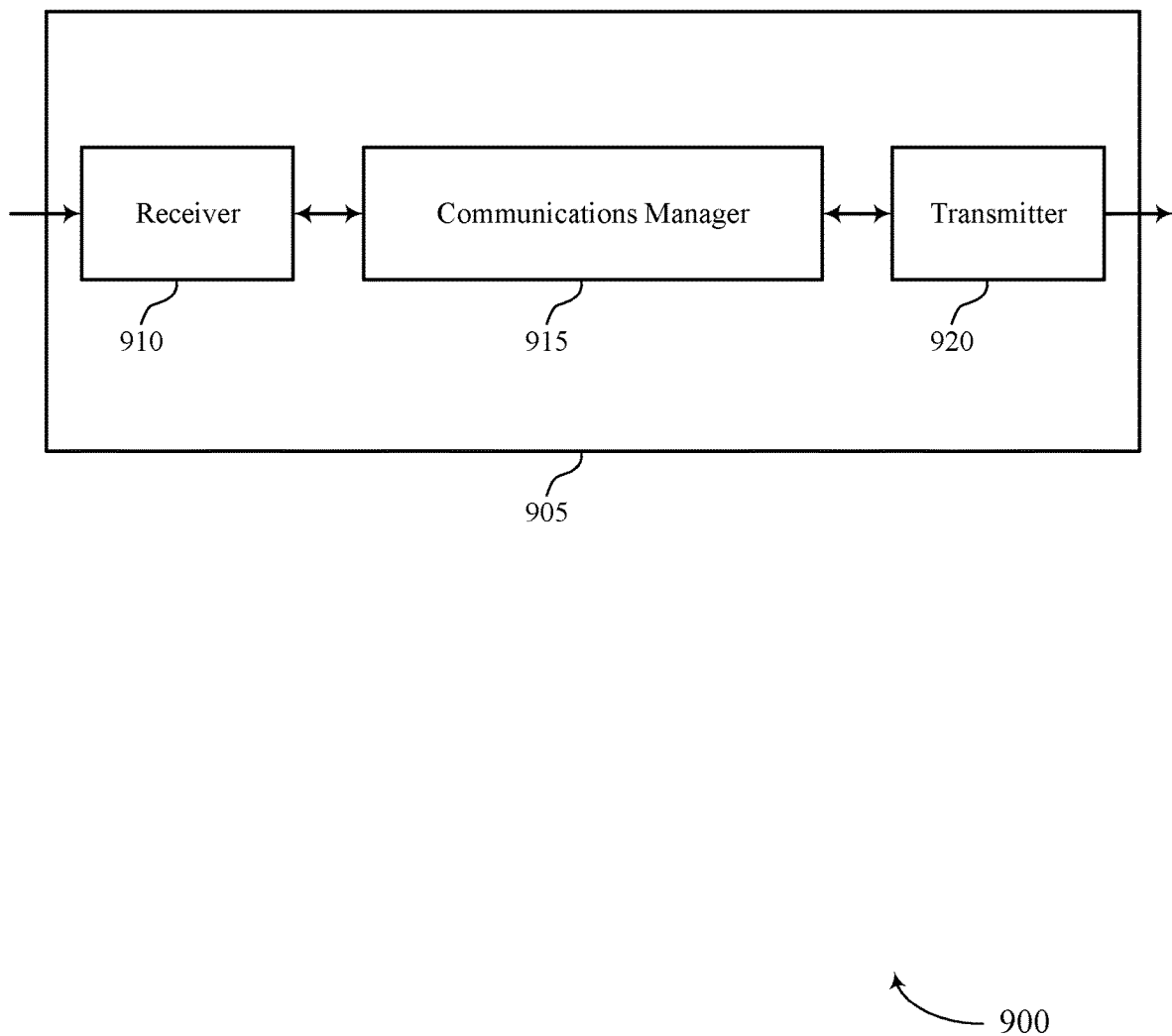
FIGS. 9 and 10 show block diagrams of devices that support multi-access point scheduling in wireless local area networks in accordance with aspects of the present disclosure.

FIG. 9 shows a block diagram 900 of a device 905 that supports multi-access point scheduling in wireless local area networks in accordance with aspects of the present disclosure. The device 905 may be an example of aspects of a AP as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to multi-access point scheduling in wireless local area networks, etc.). Information may be passed on to other components of the device. The receiver 910 may be an example of aspects of the transceiver 1220 described with reference to FIG. 12. The receiver 910 may utilize a single antenna or a set of antennas.

The communications manager 915 may win a contention-based procedure for a transmission opportunity of a wireless channel, transmit to at least a second AP, during a first portion of the transmission opportunity, a first resource assignment for coordinated communications between the second AP and at least a first station during a second portion of the transmission opportunity, transmit to at least the second AP an indication of a start of the second portion of the transmission opportunity, and initiate, based on the indication, coordinated communications between the first AP and at least a second station associated with the first AP during the second portion of the transmission opportunity.

In some cases, the communications manager 915 may also receive, during a first portion of a transmission opportunity reserved for communications by a first AP, a resource assignment from the first AP to schedule coordinated communications over a second portion of the transmission opportunity, transmit a scheduling indicator to at least one station associated with the second access point scheduling a subset of resources of the second portion of the transmission opportunity for the coordinated communications indicated in the resource assignment, receive an indication of a start of the second portion of the transmission opportunity, and initiate, based on the indication, coordinated communications between the second AP and the at least one station during the second portion of the transmission opportunity.

In some cases, the communications manager 915 may also configure a multi-AP physical protocol data unit (MAP PPDU) transmission to schedule coordinated communications with at least one station, transmit the MAP PPDU transmission upon reception of an indication of a start of a second portion of a transmission opportunity, communicate with the station based on the MAP PPDU transmission, transmit to at least a second AP an indication of a start of a second portion of a transmission opportunity reserved for communications by the first AP, initiate, based on the indication, coordinated communications between the first AP and at least one station associated with the first AP during the second portion of the transmission opportunity, receive an indication of a start of a second portion of a transmission opportunity reserved for communications by a first AP, and initiate, based on the indication, coordinated communications between the second AP and at least one station during the second portion of the transmission opportunity.

The communications manager 915 may be an example of aspects of the communications manager 1210 described herein. The communications manager 1015, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the communications manager 915 may be an example of a wireless modem implemented as a separate chipset or as a component of a system on chip (SoC), and the receiver 910 and transmitter 920 may include analog components (e.g., amplifiers, filters, phase shifters, antennas, etc.) to facilitate the receipt and transmission of wireless signals. The communications manager 915 may obtain and decode signals received wirelessly from the receiver 910 via a receive interface. The communications manager 915 also may output signals for wireless transmission by the transmitter 920 over a transmit interface.

Figure 10:
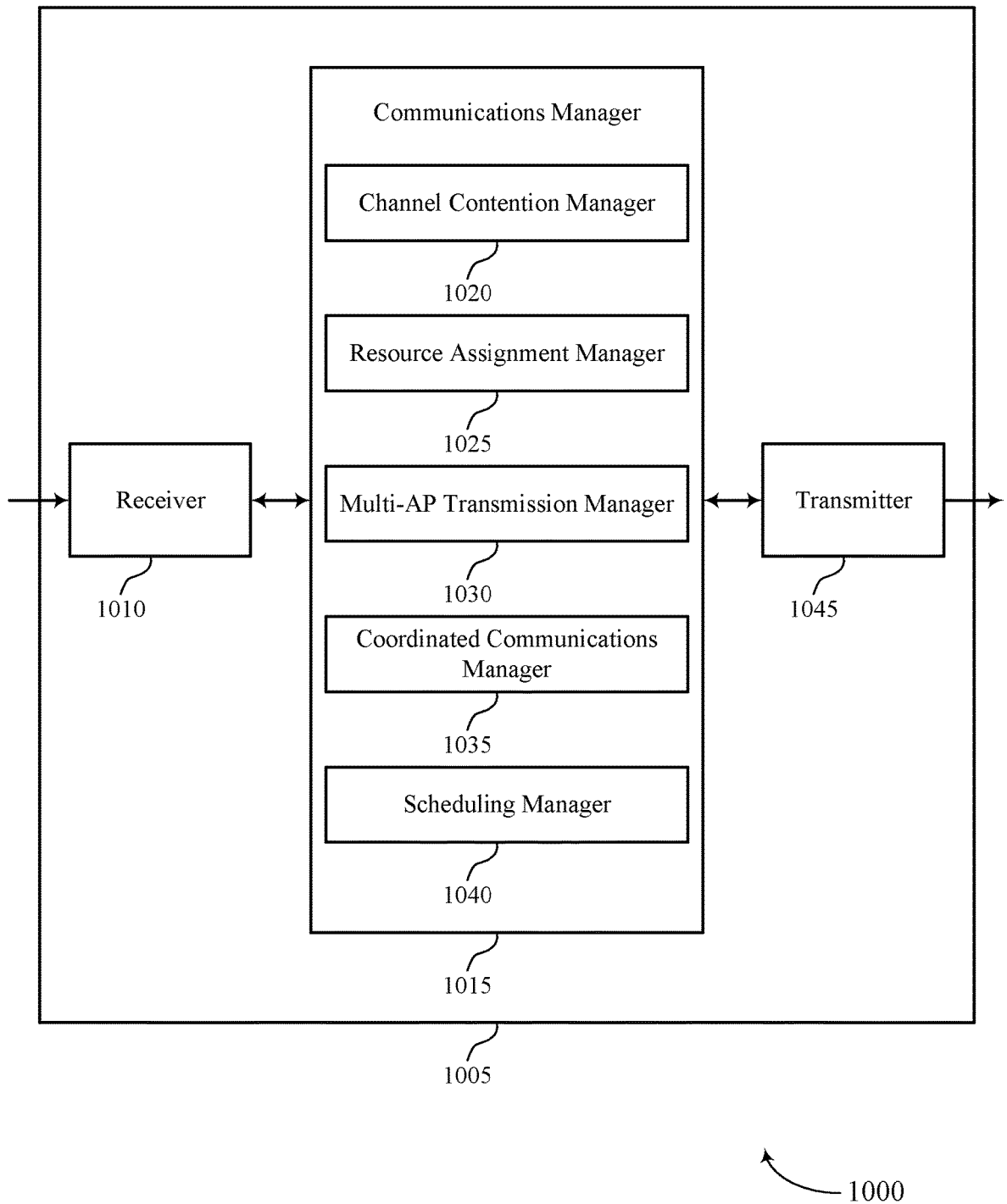

FIG. 10 shows a block diagram 1000 of a device 1005 that supports multi-access point scheduling in wireless local area networks in accordance with aspects of the present disclosure. The device 1005 may be an example of aspects of a device 905 or an AP 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to multi-access point scheduling in wireless local area networks, etc.). Information may be passed on to other components of the device. The receiver 1010 may be an example of aspects of the transceiver 1220 described with reference to FIG. 12. The receiver 1010 may utilize a single antenna or a set of antennas.

The communications manager 1015 may be an example of aspects of the communications manager 1015 as described herein. The communications manager 1015 may include a channel contention manager 1020, a resource assignment manager 1025, a multi-AP transmission manager 1030, a coordinated communications manager 1035, and a scheduling manager 1040. The communications manager 1015 may be an example of aspects of the communications manager 1210 described herein.

The channel contention manager 1020 may win a contention-based procedure for a transmission opportunity of a wireless channel. As discussed herein, such a contention-based procedure may be, for example, an EDCA contention procedure.

The resource assignment manager 1025 may transmit to at least a second AP, during a first portion of the transmission opportunity, a first resource assignment for coordinated communications between the second AP and at least a first station during a second portion of the transmission opportunity. In some cases, the resource assignment manager 1025 may receive, during the first portion of a transmission opportunity reserved for communications by a first AP, a resource assignment from the first AP to schedule coordinated communications over a second portion of the transmission opportunity.

In some cases, the resource assignment manager 1025 may transmit to at least a second AP an indication of a start of a second portion of a transmission opportunity reserved for communications by the first AP. In some cases, the resource assignment manager 1025 may receive an indication of a start of a second portion of a transmission opportunity reserved for communications by a first AP.

The multi-AP transmission manager 1030 may transmit to at least the second AP an indication of a start of the second portion of the transmission opportunity. In some cases, the multi-AP transmission manager 1030 may receive an indication of a start of the second portion of the transmission opportunity.

The coordinated communications manager 1035 may initiate, based on the received indication, coordinated communications between the first AP and at least a second station associated with the first AP during the second portion of the transmission opportunity. In some cases, the coordinated communications manager 1035 may initiate, based on the indication, coordinated communications between the second AP and the at least one station during the second portion of the transmission opportunity. In some cases, the coordinated communications manager 1035 may transmit the MAP PPDU transmission upon reception of an indication of a start of a second portion of a transmission opportunity and communicate with the station based on the MAP PPDU transmission.

The scheduling manager 1040 may transmit a scheduling indicator to at least one station associated with the second access point scheduling a subset of resources of the second portion of the transmission opportunity for the coordinated communications indicated in the resource assignment. In some cases, the scheduling manager 1040 may configure a MAP PPDU transmission to schedule coordinated communications with at least one station.

The transmitter 1045 may transmit signals generated by other components of the device. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
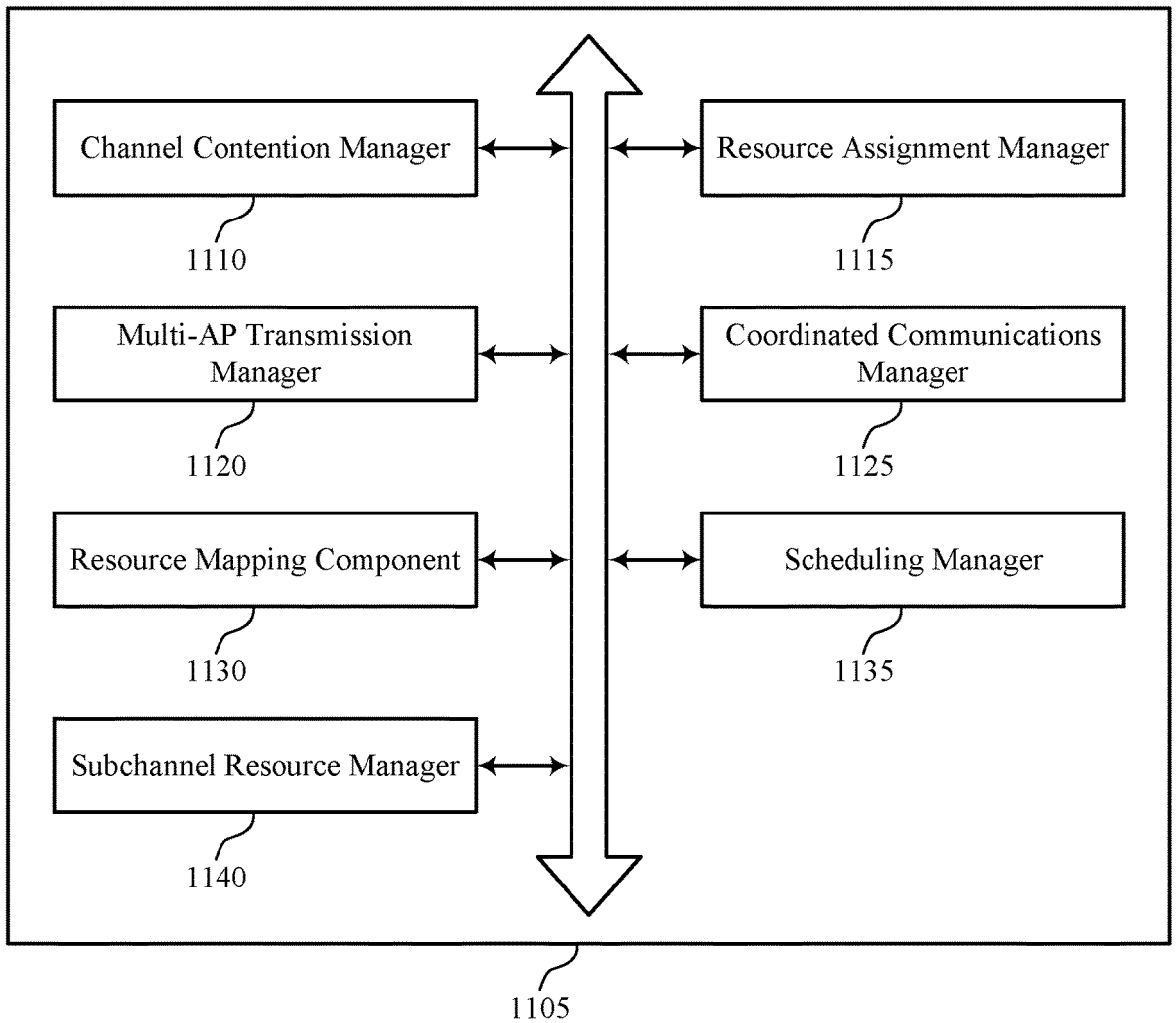
FIG. 11 shows a block diagram of a communications manager that supports multi-access point scheduling in wireless local area networks in accordance with aspects of the present disclosure.

FIG. 11 shows a block diagram 1100 of a communications manager 1105 that supports multi-access point scheduling in wireless local area networks in accordance with aspects of the present disclosure. The communications manager 1105 may be an example of aspects of a communications manager 915, a communications manager 1015, or a communications manager 1210 described herein. The communications manager 1105 may include a channel contention manager 1110, a resource assignment manager 1115, a multi-AP transmission manager 1120, a coordinated communications manager 1125, a resource mapping component 1130, a scheduling manager 1135, and a subchannel resource manager 1140. Each of these modules may communicate, directly or indirectly, with one another (e.g., via one or more buses).

The channel contention manager 1110 may win a contention-based procedure for a transmission opportunity of a wireless channel. As discussed herein, such a contention-based procedure may be, for example, an EDCA contention procedure.

The resource assignment manager 1115 may transmit to at least a second AP, during a first portion of the transmission opportunity, a first resource assignment for coordinated communications between the second AP and at least a first station during a second portion of the transmission opportunity. In some examples, the resource assignment manager 1115 may transmit to at least a second AP an indication of a start of a second portion of a transmission opportunity reserved for communications by the first AP. In some examples, the resource assignment manager 1115 may transmit to a third AP and based on the first scheduling indicator, a second resource assignment for coordinated communications between the third AP and at least a third station during the second portion of the transmission opportunity.

In some examples, the resource assignment manager 1115 may configure the resource assignment in a single user physical protocol data unit (SU PPDU) format. In some examples, the resource assignment manager 1115 may transmit the resource assignment allocating resources for coordinated communications between the second AP at least a first station, and between a third AP and at least a third station. In some examples, the resource assignment manager 1115 may configure the resource assignment to include an AP identifier and corresponding resources of the second portion of the transmission opportunity for at least the second AP. The multi-AP transmission manager 1120 may transmit to at least the second AP an indication of a start of the second portion of the transmission opportunity.

In some examples, the resource assignment manager 1115 may receive, during a first portion of a transmission opportunity reserved for communications by a first AP, a resource assignment from the first AP to schedule coordinated communications over a second portion of the transmission opportunity. In some examples, the resource assignment manager 1115 may receive an indication of a start of a second portion of a transmission opportunity reserved for communications by a first AP, and may receive an indication of a start of the second portion of the transmission opportunity.

In some examples, the multi-AP transmission manager 1120 may receive a first scheduling indicator from the second AP based on the first resource assignment. In some examples, the multi-AP transmission manager 1120 may receive a second scheduling indicator from the third AP based on the second resource assignment.

The coordinated communications manager 1125 may initiate, based on the indication, coordinated communications between the first AP and at least a second station associated with the first AP during the second portion of the transmission opportunity. In some examples, the coordinated communications manager 1125 may initiate, based on the indication, coordinated communications between the second AP and the at least one station during the second portion of the transmission opportunity. In some examples, the coordinated communications manager 1125 may transmit the MAP PPDU transmission upon reception of an indication of a start of a second portion of a transmission opportunity. In some examples, the coordinated communications manager 1125 may communicate with the station based on the MAP PPDU transmission.

In some examples, the coordinated communications manager 1125 may configure the coordinated communications with at least the second station in a multi-AP physical protocol data unit (MAP PPDU) format or in a high efficiency trigger-based physical protocol data unit (HE TB PPDU) format. In some examples, the coordinated communications manager 1125 may configure the coordinated communications with at least the second station to include an AP identifier for the second AP in a station identifier (STAID) field.

The resource mapping component 1130 may configure the coordinated communications with at least the second station to include a mapping of an AP identifier for the second AP to corresponding resources of the second portion of the transmission opportunity for at least the second AP, where the mapping is configured to be located in a new field of a high efficiency trigger-based physical protocol data unit (HE TB PPDU).

The scheduling manager 1135 may transmit a scheduling indicator to at least one station associated with the second access point scheduling a subset of resources of the second portion of the transmission opportunity for the coordinated communications indicated in the resource assignment. In some examples, the scheduling manager 1135 may configure a multi-AP physical protocol data unit (MAP PPDU) transmission to schedule coordinated communications with at least one station. In some examples, the scheduling manager 1135 may configure the scheduling indicator in a single user physical protocol data unit (SU PPDU) format. In some examples, the scheduling manager 1135 may configure the scheduling indicator in a multi-AP physical protocol data unit (MAP PPDU) format. In some examples, the scheduling manager 1135 may configure the scheduling indicator to include, in a scheduling indicator preamble, an AP identifier for the second AP and a corresponding subchannel indication for the at least one station to monitor for a scheduling indicator payload.

In some examples, the scheduling manager 1135 may configure the scheduling indicator to include an AP identifier for the second AP in a station identifier (STAID) field. The subchannel resource manager 1140 may receive, in the resource assignment, information indicative of the corresponding subchannel for the second AP. In some examples, the subchannel resource manager 1140 may transmit the scheduling indicator payload over the corresponding subchannel based on the resource assignment.

In some examples, the subchannel resource manager 1140 may transmit the scheduling indicator preamble over a channel simultaneously with at least a third AP, where the scheduling indicator further includes an AP identifier for the third AP and a corresponding subchannel indication for the at least a second station associated with the third AP to monitor for a scheduling indicator payload. In some cases, the channel includes a primary channel for the first AP.

Figure 12:
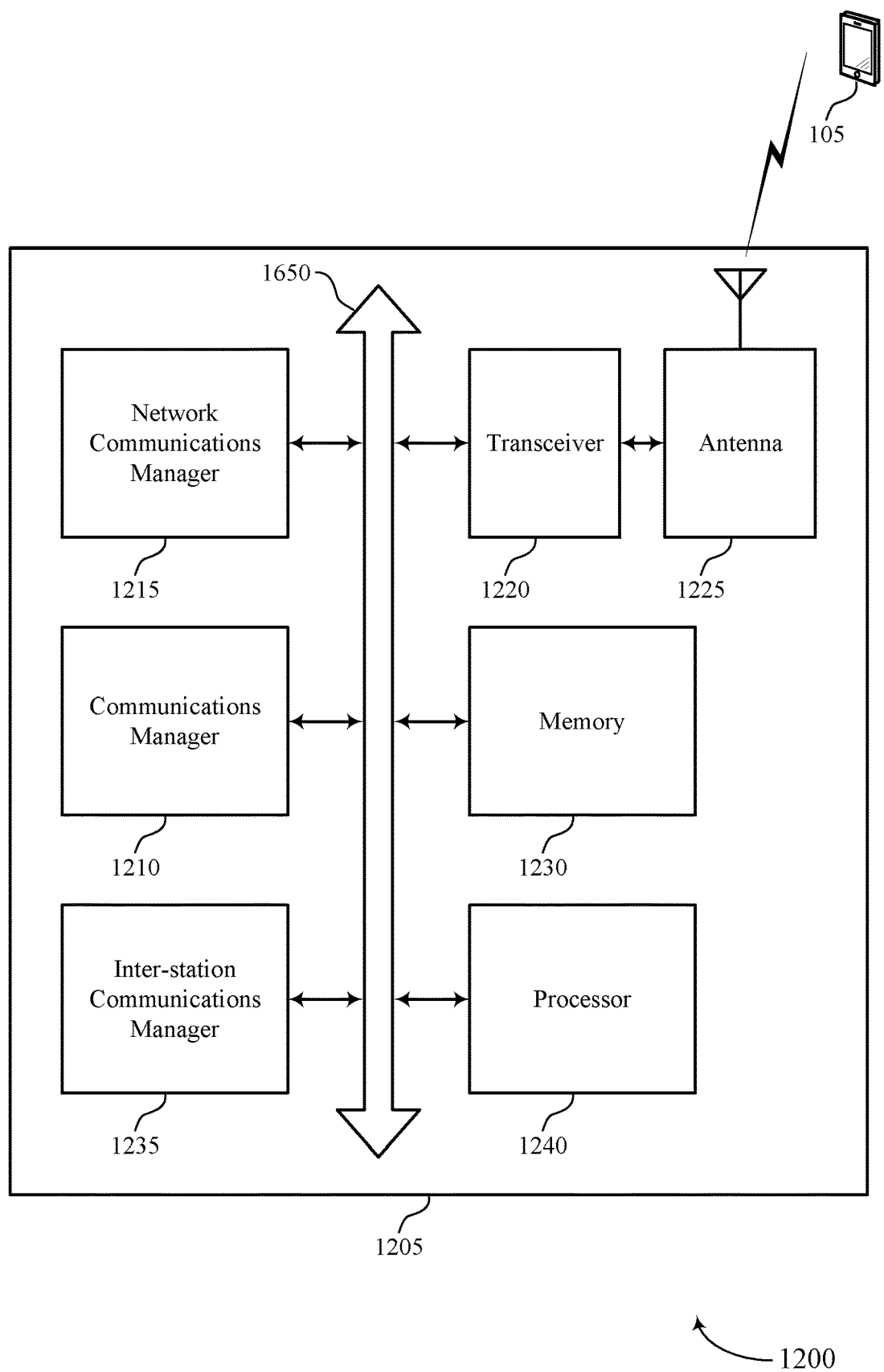
FIG. 12 shows a diagram of a system including a device that supports multi-access point scheduling in wireless local area networks in accordance with aspects of the present disclosure.

FIG. 12 shows a diagram of a system 1200 including a device 1205 that supports multi-access point scheduling in wireless local area networks in accordance with aspects of the present disclosure. The device 1205 may be an example of or include the components of device 905, device 1005, device 3705, device 3805, device 4005, or an AP as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may be an example of the communications manager 915 or the communications manager 1005, or the communications manager 3705, or the communications manager 3815, or the communications manager 3905, or the communications manager 4010 described herein. The communications manager 1210 may win a contention-based procedure for a transmission opportunity of a wireless channel, transmit to at least a second AP, during a first portion of the transmission opportunity, a first resource assignment for coordinated communications between the second AP and at least a first station during a second portion of the transmission opportunity, transmit to at least the second AP an indication of a start of the second portion of the transmission opportunity, and initiate, based on the indication, coordinated communications between the first AP and at least a second station associated with the first AP during the second portion of the transmission opportunity.

In some cases, the communications manager 1210 may also receive, during a first portion of a transmission opportunity reserved for communications by a first AP, a resource assignment from the first AP to schedule coordinated communications over a second portion of the transmission opportunity, transmit a scheduling indicator to at least one station associated with the second access point scheduling a subset of resources of the second portion of the transmission opportunity for the coordinated communications indicated in the resource assignment, receive an indication of a start of the second portion of the transmission opportunity, and initiate, based on the indication, coordinated communications between the second AP and the at least one station during the second portion of the transmission opportunity.

In some cases, the communications manager 1210 may also configure a multi-AP physical protocol data unit (MAP PPDU) transmission to schedule coordinated communications with at least one station, transmit the MAP PPDU transmission upon reception of an indication of a start of a second portion of a transmission opportunity, communicate with the station based on the MAP PPDU transmission, transmit to at least a second AP an indication of a start of a second portion of a transmission opportunity reserved for communications by the first AP, initiate, based on the indication, coordinated communications between the first AP and at least one station associated with the first AP during the second portion of the transmission opportunity, receive an indication of a start of a second portion of a transmission opportunity reserved for communications by a first AP, and initiate, based on the indication, coordinated communications between the second AP and at least one station during the second portion of the transmission opportunity.

The network communications manager 1215 may manage communications with a network (e.g., via one or more wired backhaul links). For example, the network communications manager 1215 may manage the transfer of data communications for client devices, such as one or more STAs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into processor 1240. The processor 1240 may be configured to execute computer-readable instructions stored in a memory to perform various functions (e.g., functions or tasks supporting multi-access point scheduling in wireless local area networks).

Figure 13:
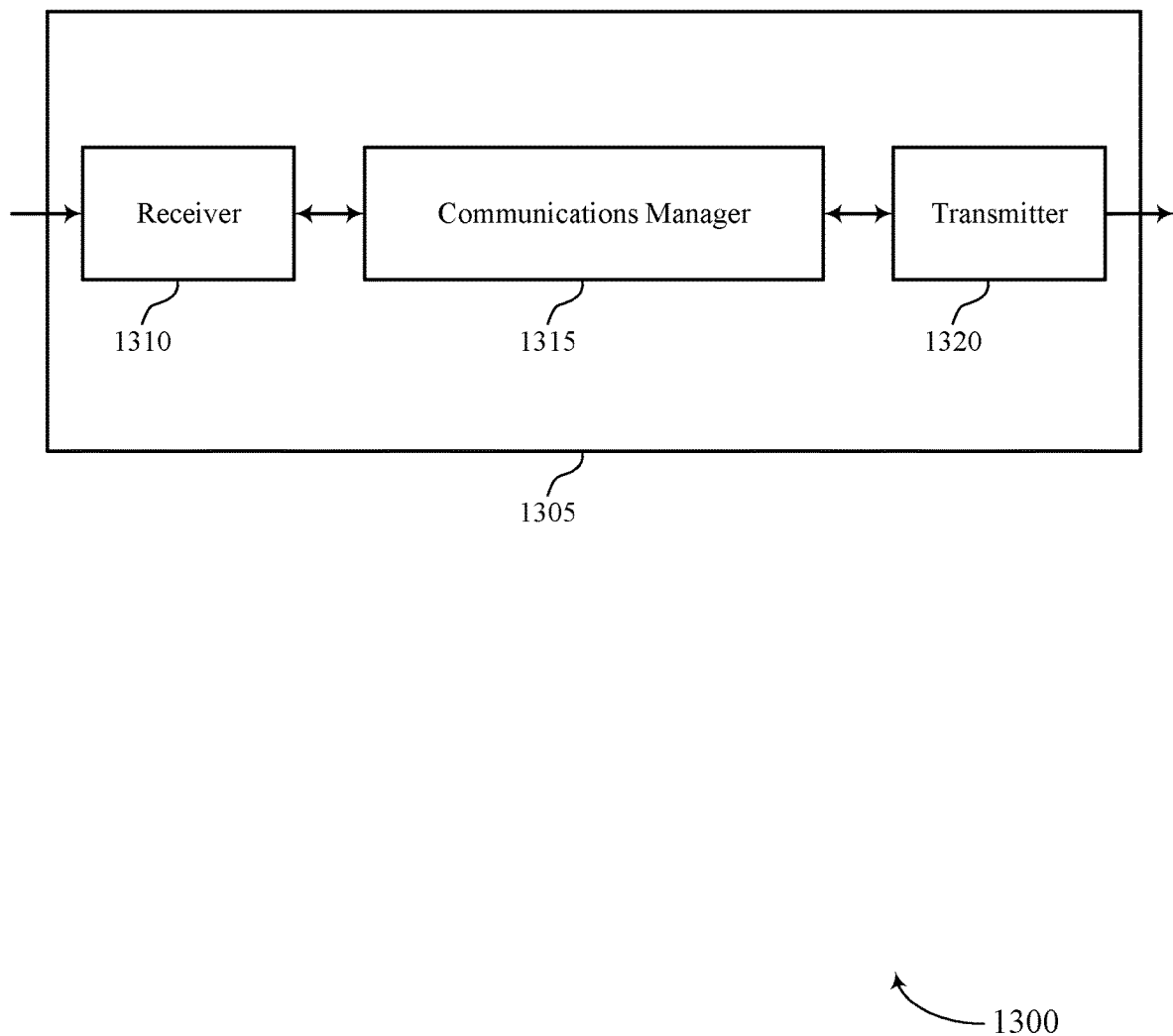
FIGS. 13 and 14 show block diagrams of devices that support multi-access point scheduling in wireless local area networks in accordance with aspects of the present disclosure.

FIG. 13 shows a block diagram 1300 of a device 1305 that supports multi-access point scheduling in wireless local area networks in accordance with aspects of the present disclosure. The device 1305 may be an example of aspects of a STA as described herein. The device 1305 may include a receiver 1310, a communications manager 1315, and a transmitter 1320. The device 1305 may also include a processor. Each of these components may be in communication with one another (e.g., via one or more buses).

Receiver 1310 may receive information such as packets, user data, or control information associated with various information channels (e.g., control channels, data channels, and information related to multi-access point scheduling in wireless local area networks, etc.). Information may be passed on to other components of the device. The receiver 1310 may be an example of aspects of the transceiver 1620 described with reference to FIG. 16. The receiver 1310 may utilize a single antenna or a set of antennas.

The communications manager 1315 may receive, during a first portion of a transmission opportunity and from an AP, a scheduling indicator configured to schedule a set of resources of a transmission opportunity for coordinated communications, the transmission opportunity reserved for communications by a first AP and initiate coordinated communications with the second AP and over the subset of resources of the transmission opportunity based on the scheduling indicator.

In some cases, the communications manager 1315 may also receive a multi-AP physical protocol data unit (MAP PPDU) transmission to schedule coordinated communications with a AP and communicate with the AP based on the MAP PPDU transmission. The communications manager 1315 may be an example of aspects of the communications manager 1610 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1620 described with reference to FIG. 16. The transmitter 1220 may utilize a single antenna or a set of antennas.

In some examples, the communications manager 1315 may be an example of a wireless modem implemented as a separate chipset or as a component of a system on chip (SoC), and the receiver 1310 and transmitter 1320 may include analog components (e.g., amplifiers, filters, phase shifters, antennas, etc.) to facilitate the receipt and transmission of wireless signals. The communications manager 1315 may obtain and decode signals received wirelessly from the receiver 1310 via a receive interface. The communications manager 1315 also may output signals for wireless transmission by the transmitter 1320 over a transmit interface.

Figure 14:
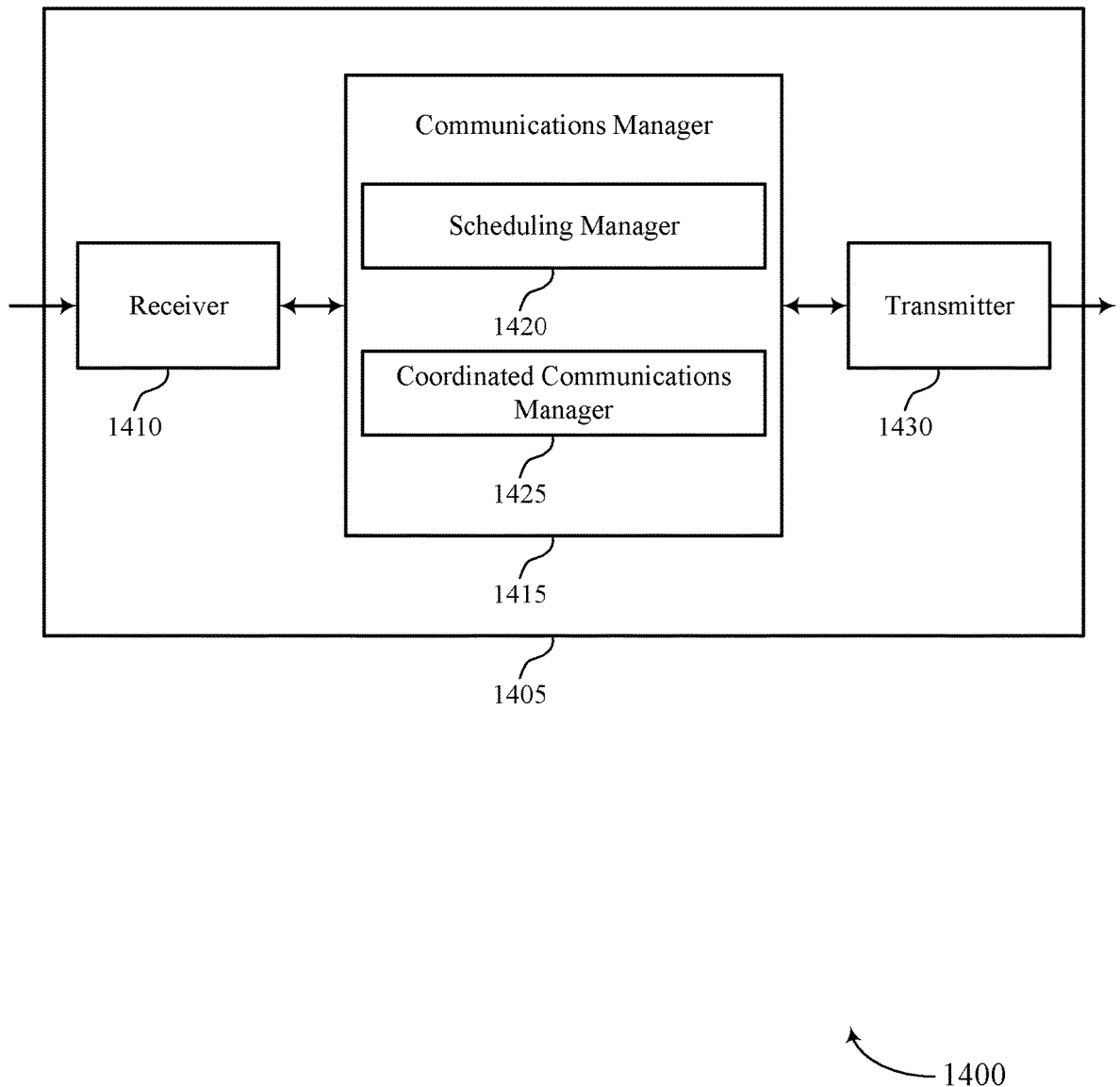

FIG. 14 shows a block diagram 1400 of a device 1405 that supports multi-access point scheduling in wireless local area networks in accordance with aspects of the present disclosure. The device 1405 may be an example of aspects of a device 1405 or a STA 115 as described herein. The device 1405 may include a receiver 1410, a communications manager 1415, and a transmitter 1430. The device 1405 may also include a processor. Each of these components may be in communication with one another (e.g., via one or more buses).

Receiver 1410 may receive information such as packets, user data, or control information associated with various information channels (e.g., control channels, data channels, and information related to multi-access point scheduling in wireless local area networks, etc.). Information may be passed on to other components of the device. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a scheduling manager 1420 and a coordinated communications manager 1425. The communications manager 1415 may be an example of aspects of the communications manager 1710 described herein.

The scheduling manager 1420 may receive, during a first portion of a transmission opportunity and from an AP, a scheduling indicator configured to schedule a set of resources of a transmission opportunity for coordinated communications, the transmission opportunity reserved for communications by a first AP. In some examples, the scheduling manager 1420 may receive a multi-AP physical protocol data unit (MAP PPDU) transmission to schedule coordinated communications with a AP.

The coordinated communications manager 1425 may initiate coordinated communications with the second AP and over the subset of resources of the transmission opportunity based on the scheduling indicator. For example, the coordinated communications manager 1425 may communicate with the AP based on the MAP PPDU transmission.

Transmitter 1430 may transmit signals generated by other components of the device. In some examples, the transmitter 1430 may be collocated with a receiver 1410 in a transceiver module. For example, the transmitter 1430 may be an example of aspects of the transceiver 1620 described with reference to FIG. 16. The transmitter 1430 may utilize a single antenna or a set of antennas.

Figure 15:
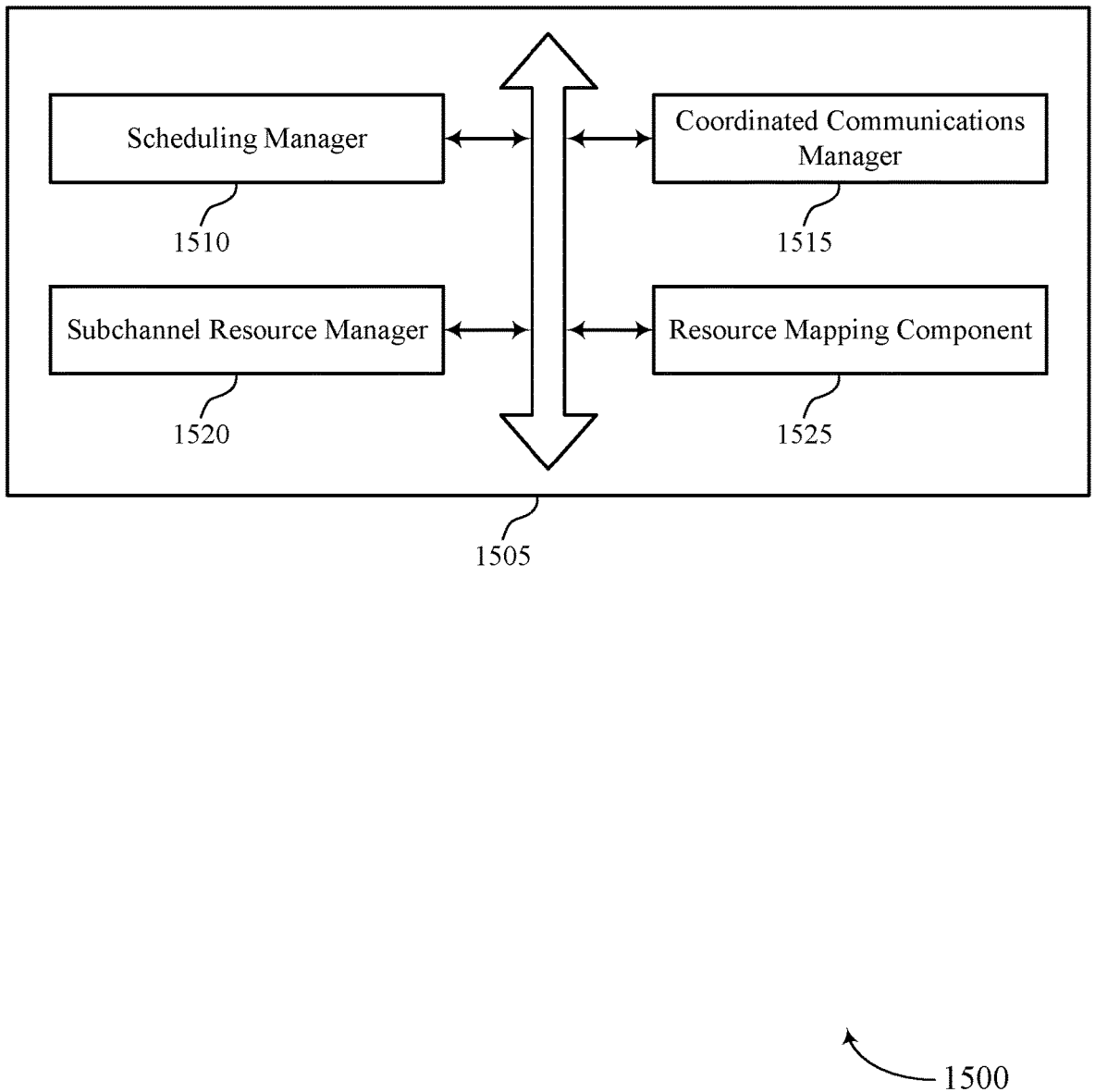
FIG. 15 shows a block diagram of a communications manager that supports multi-access point scheduling in wireless local area networks in accordance with aspects of the present disclosure.

FIG. 15 shows a block diagram 1500 of a communications manager 1505 that supports multi-access point scheduling in wireless local area networks in accordance with aspects of the present disclosure. The communications manager 1505 may be an example of aspects of a communications manager 1415, a communications manager 1515, or a communications manager 1710 described herein. The communications manager 1505 may include a scheduling manager 1510, a coordinated communications manager 1515, a subchannel resource manager 1520, and a resource mapping component 1525. Each of these modules may communicate, directly or indirectly, with one another (e.g., via one or more buses).

The scheduling manager 1510 may receive, during a first portion of a transmission opportunity and from an AP, a scheduling indicator configured to schedule a set of resources of a transmission opportunity for coordinated communications, the transmission opportunity reserved for communications by a first AP. In some examples, the scheduling manager 1510 may receive a multi-AP physical protocol data unit (MAP PPDU) transmission to schedule coordinated communications with a AP. In some examples, the scheduling manager 1510 may receive the scheduling indicator in a single user physical protocol data unit (SU PPDU) format. In some cases, the scheduling indicator includes an AP identifier for the second AP in a station identifier (STAID) field.

The coordinated communications manager 1515 may initiate coordinated communications with the second AP and over the subset of resources of the transmission opportunity based on the scheduling indicator. In some examples, the coordinated communications manager 1515 may communicate with the AP based on the MAP PPDU transmission.

In some examples, the coordinated communications manager 1515 may receive the coordinated communications with the second AP in a multi-AP physical protocol data unit (MAP PPDU) format or in a high efficiency trigger-based physical protocol data unit (HE TB PPDU) format.

The subchannel resource manager 1520 may receive, in a scheduling indicator preamble, an AP identifier for the second AP and a corresponding subchannel indication. In some examples, the subchannel resource manager 1520 may monitor the corresponding subchannel for a scheduling indicator payload based on the scheduling indicator preamble. In some cases, the scheduling indicator further includes an AP identifier for the third AP and a corresponding subchannel indication for the at least a second station associated with the third AP to monitor for a scheduling indicator payload. In some cases, the channel includes a primary channel for the first AP.

The resource mapping component 1525 may map resources with different APs. In some cases, the coordinated communications with the second AP includes a mapping of an AP identifier for the second AP to corresponding resources of the second portion of the transmission opportunity for at least the second AP, where the mapping is configured to be located in a new field of a high efficiency trigger-based physical protocol data unit (HE TB PPDU).

Figure 16:
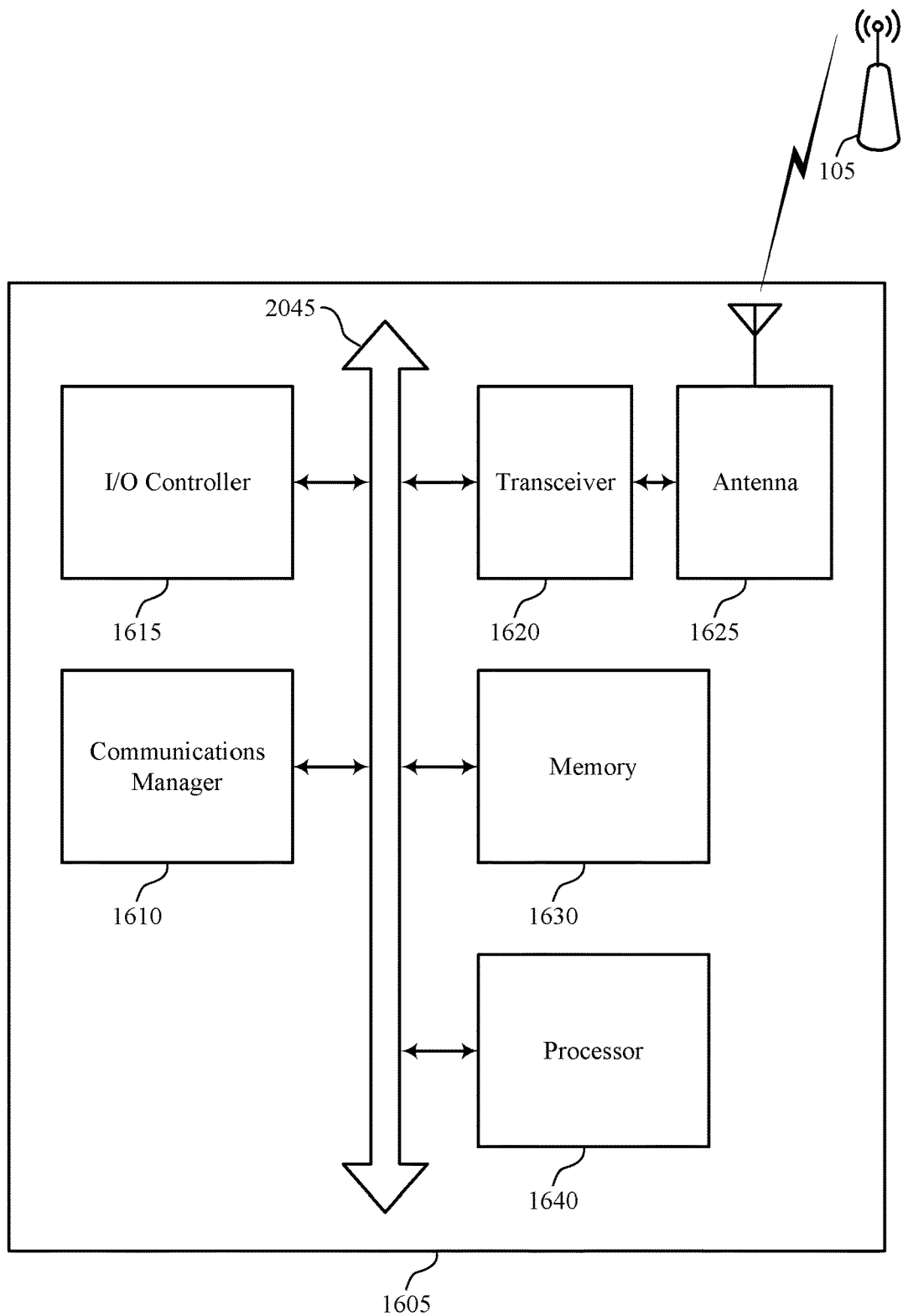
FIG. 16 shows a diagram of a system including a device that supports multi-access point scheduling in wireless local area networks in accordance with aspects of the present disclosure.

FIG. 16 shows a diagram of a system 1600 including a device 1605 that supports multi-access point scheduling in wireless local area networks in accordance with aspects of the present disclosure. The device 1605 may be an example of or include the components of device 1405, device 1505, or a STA as described herein. The device 1605 may include components for bi-directional voice and data communications including components for transmitting and receiving communications, including a communications manager 1610, an I/O controller 1615, a transceiver 1620, an antenna 1625, memory 1630, and a processor 1640. These components may be in electronic communication via one or more buses (e.g., bus 1645).

The communications manager 1610 may receive, during a first portion of a transmission opportunity and from an AP, a scheduling indicator configured to schedule a set of resources of a transmission opportunity for coordinated communications, the transmission opportunity reserved for communications by a first AP and initiate coordinated communications with the second AP and over the subset of resources of the transmission opportunity based on the scheduling indicator.

In some cases, the communications manager 1610 may also receive a multi-AP physical protocol data unit (MAP PPDU) transmission to schedule coordinated communications with a AP and communicate with the AP based on the MAP PPDU transmission.

I/O controller 1615 may manage input and output signals for device 1605. I/O controller 1615 may also manage peripherals not integrated into device 1605. In some cases, I/O controller 1615 may represent a physical connection or port to an external peripheral. In some cases, I/O controller 1615 may utilize an operating system such as iOS®, ANDROID®, MS-DOS®, MS-WINDOWS®, OS/2®, UNIX®, LINUX®, or another known operating system. In other cases, I/O controller 1615 may represent or interact with a modem, a keyboard, a mouse, a touchscreen, or a similar device. In some cases, I/O controller 1615 may be implemented as part of a processor. In some cases, a user may interact with device 1605 via I/O controller 1615 or via hardware components controlled by I/O controller 1615.

Transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

Memory 1630 may include RAM and ROM. The memory 1630 may store computer-readable, computer-executable software 1635 including instructions that, when executed, cause the processor to perform various functions described herein. In some cases, the memory 1630 may contain, among other things, a BIOS which may control basic hardware or software operation such as the interaction with peripheral components or devices.

Processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1640 may be configured to operate a memory array using a memory controller. In other cases, a memory controller may be integrated into processor 1640. Processor 1640 may be configured to execute computer-readable instructions stored in a memory to perform various functions (e.g., functions or tasks supporting multi-access point scheduling in wireless local area networks).

Figure 17:
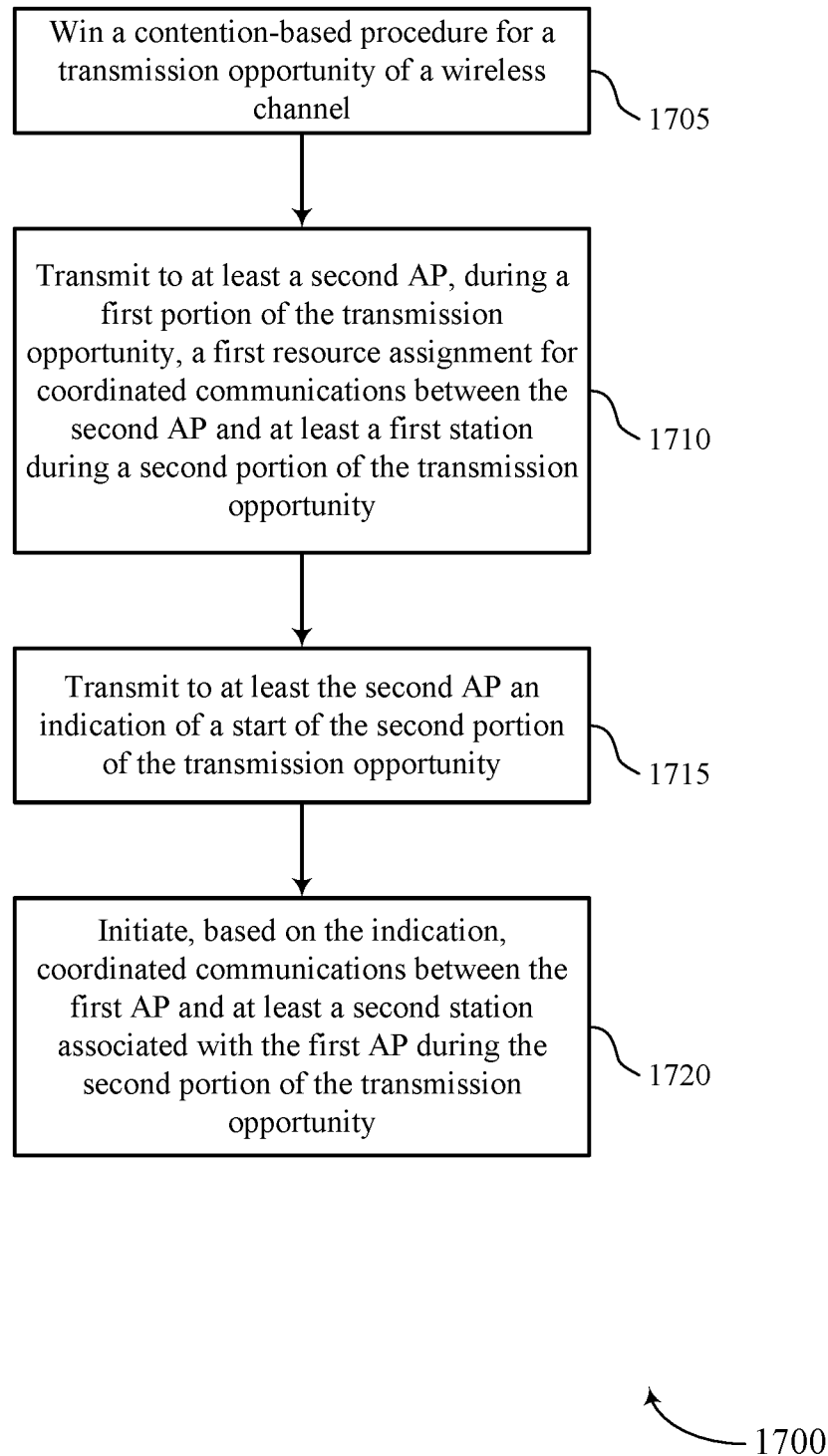
FIGS. 17 through 26 show flowcharts illustrating methods that support multi-access point scheduling in wireless local area networks in accordance with aspects of the present disclosure.

FIG. 17 shows a flowchart illustrating a method 1700 that supports multi-access point scheduling in wireless local area networks in accordance with aspects of the present disclosure. The operations of method 1700 may be implemented by a AP or its components as described herein. For example, the operations of method 1700 may be performed by a communications manager as described with reference to FIGS. 9 through 12. In some examples, a AP may execute a set of instructions to control the functional elements of the AP to perform the functions described below. Additionally, or alternatively, a AP may perform aspects of the functions described below using special-purpose hardware.

At 1705, the AP may win a contention-based procedure for a transmission opportunity of a wireless channel. The operations of 1705 may be performed according to the methods described herein. In some examples, aspects of the operations of 1705 may be performed by a channel contention manager as described with reference to FIGS. 9 through 12.

At 1710, the AP may transmit to at least a second AP, during a first portion of the transmission opportunity, a first resource assignment for coordinated communications between the second AP and at least a first station during a second portion of the transmission opportunity. The operations of 1710 may be performed according to the methods described herein. In some examples, aspects of the operations of 1710 may be performed by a resource assignment manager as described with reference to FIGS. 9 through 12.

At 1715, the AP may transmit to at least the second AP an indication of a start of the second portion of the transmission opportunity. The operations of 1715 may be performed according to the methods described herein. In some examples, aspects of the operations of 1715 may be performed by a multi-AP transmission manager as described with reference to FIGS. 9 through 12.

At 1720, the AP may initiate, based on the indication, coordinated communications between the first AP and at least a second station associated with the first AP during the second portion of the transmission opportunity. The operations of 1720 may be performed according to the methods described herein. In some examples, aspects of the operations of 1720 may be performed by a coordinated communications manager as described with reference to FIGS. 9 through 12.

Figure 18:
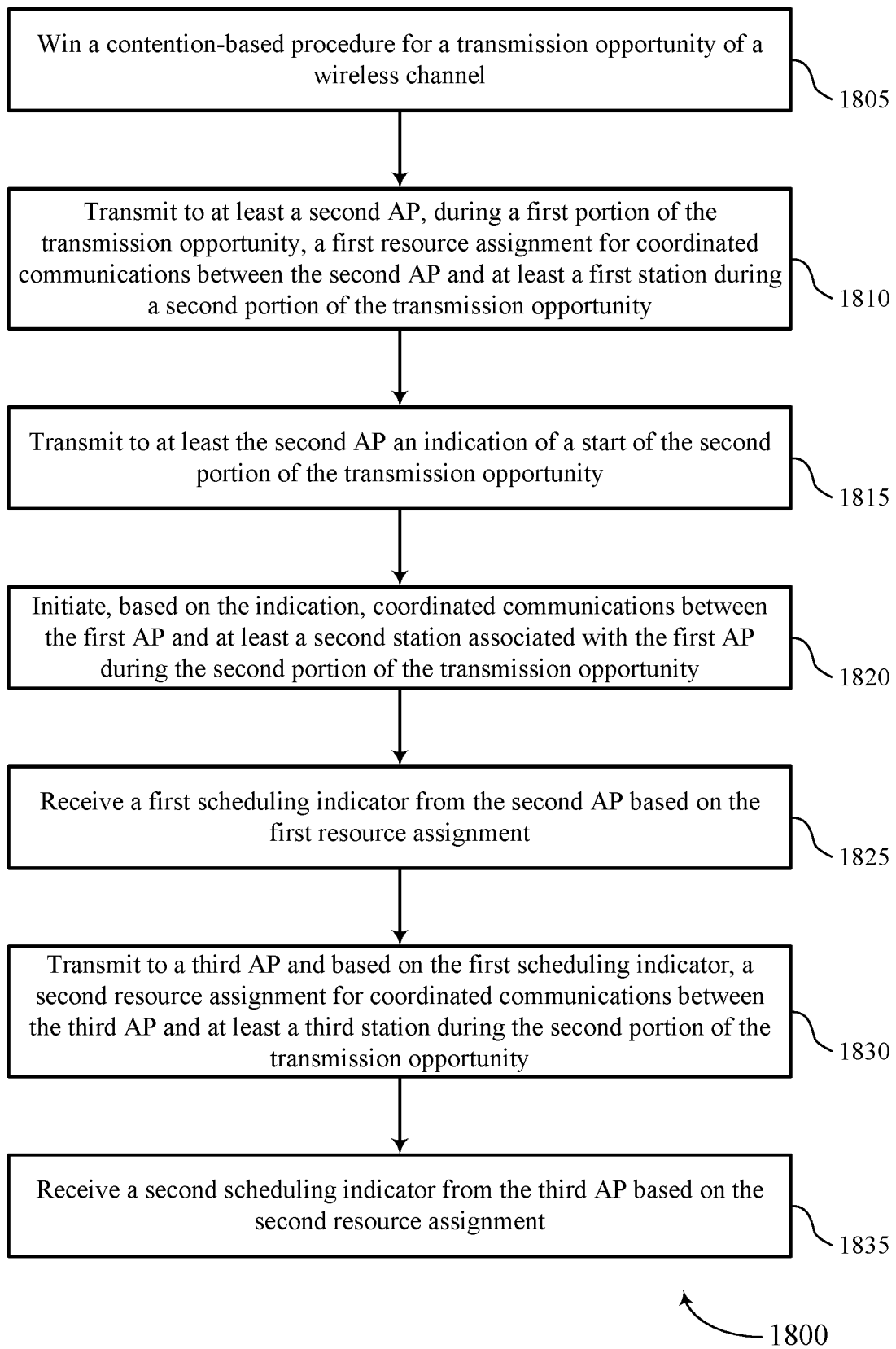

FIG. 18 shows a flowchart illustrating a method 1800 that supports multi-access point scheduling in wireless local area networks in accordance with aspects of the present disclosure. The operations of method 1800 may be implemented by a AP or its components as described herein. For example, the operations of method 1800 may be performed by a communications manager as described with reference to FIGS. 9 through 12. In some examples, a AP may execute a set of instructions to control the functional elements of the AP to perform the functions described below. Additionally, or alternatively, a AP may perform aspects of the functions described below using special-purpose hardware.

At 1805, the AP may win a contention-based procedure for a transmission opportunity of a wireless channel. The operations of 1805 may be performed according to the methods described herein. In some examples, aspects of the operations of 1805 may be performed by a channel contention manager as described with reference to FIGS. 9 through 12.

At 1810, the AP may transmit to at least a second AP, during a first portion of the transmission opportunity, a first resource assignment for coordinated communications between the second AP and at least a first station during a second portion of the transmission opportunity. The operations of 1810 may be performed according to the methods described herein. In some examples, aspects of the operations of 1810 may be performed by a resource assignment manager as described with reference to FIGS. 9 through 12.

At 1815, the AP may transmit to at least the second AP an indication of a start of the second portion of the transmission opportunity. The operations of 1815 may be performed according to the methods described herein. In some examples, aspects of the operations of 1815 may be performed by a multi-AP transmission manager as described with reference to FIGS. 9 through 12.

At 1820, the AP may initiate, based on the indication, coordinated communications between the first AP and at least a second station associated with the first AP during the second portion of the transmission opportunity. The operations of 1820 may be performed according to the methods described herein. In some examples, aspects of the operations of 1820 may be performed by a coordinated communications manager as described with reference to FIGS. 9 through 12.

At 1825, the AP may receive a first scheduling indicator from the second AP based on the first resource assignment. The operations of 1825 may be performed according to the methods described herein. In some examples, aspects of the operations of 1825 may be performed by a multi-AP transmission manager as described with reference to FIGS. 9 through 12.

At 1830, the AP may transmit to a third AP and based on the first scheduling indicator, a second resource assignment for coordinated communications between the third AP and at least a third station during the second portion of the transmission opportunity. The operations of 1830 may be performed according to the methods described herein. In some examples, aspects of the operations of 1830 may be performed by a resource assignment manager as described with reference to FIGS. 9 through 12.

At 1835, the AP may receive a second scheduling indicator from the third AP based on the second resource assignment. The operations of 1835 may be performed according to the methods described herein. In some examples, aspects of the operations of 1835 may be performed by a multi-AP transmission manager as described with reference to FIGS. 9 through 12.

Figure 19:
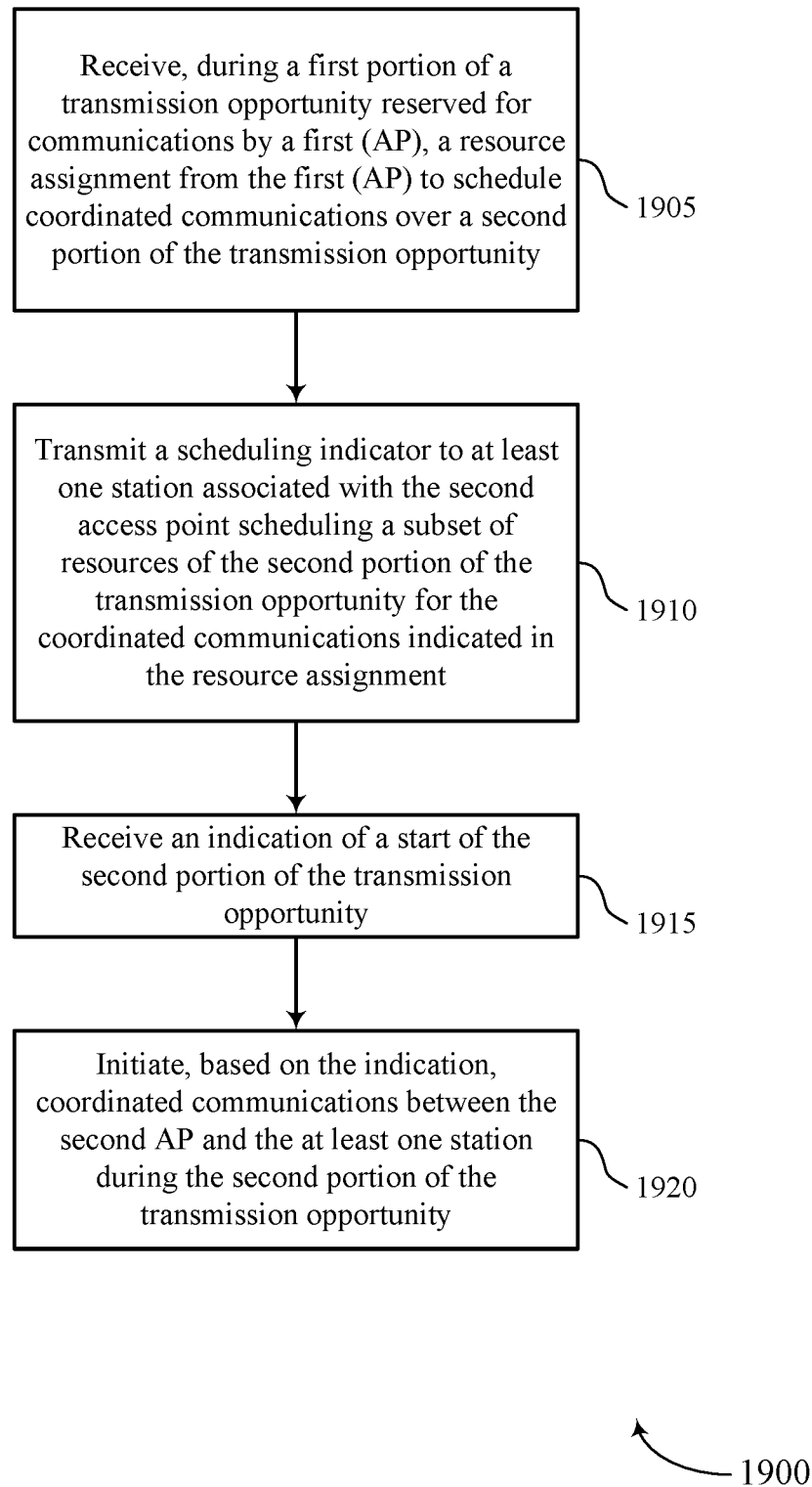

FIG. 19 shows a flowchart illustrating a method 1900 that supports multi-access point scheduling in wireless local area networks in accordance with aspects of the present disclosure. The operations of method 1900 may be implemented by a AP or its components as described herein. For example, the operations of method 1900 may be performed by a communications manager as described with reference to FIGS. 9 through 12. In some examples, a AP may execute a set of instructions to control the functional elements of the AP to perform the functions described below. Additionally, or alternatively, a AP may perform aspects of the functions described below using special-purpose hardware.

At 1905, the AP may receive, during a first portion of a transmission opportunity reserved for communications by a first AP, a resource assignment from the first AP to schedule coordinated communications over a second portion of the transmission opportunity. The operations of 1905 may be performed according to the methods described herein. In some examples, aspects of the operations of 1905 may be performed by a resource assignment manager as described with reference to FIGS. 9 through 12.

At 1910, the AP may transmit a scheduling indicator to at least one station associated with the second access point scheduling a subset of resources of the second portion of the transmission opportunity for the coordinated communications indicated in the resource assignment. The operations of 1910 may be performed according to the methods described herein. In some examples, aspects of the operations of 1910 may be performed by a scheduling manager as described with reference to FIGS. 9 through 12.

At 1915, the AP may receive an indication of a start of the second portion of the transmission opportunity. The operations of 1915 may be performed according to the methods described herein. In some examples, aspects of the operations of 1915 may be performed by a multi-AP transmission manager as described with reference to FIGS. 9 through 12.

At 1920, the AP may initiate, based on the indication, coordinated communications between the second AP and the at least one station during the second portion of the transmission opportunity. The operations of 1920 may be performed according to the methods described herein. In some examples, aspects of the operations of 1920 may be performed by a coordinated communications manager as described with reference to FIGS. 9 through 12.

Figure 20:
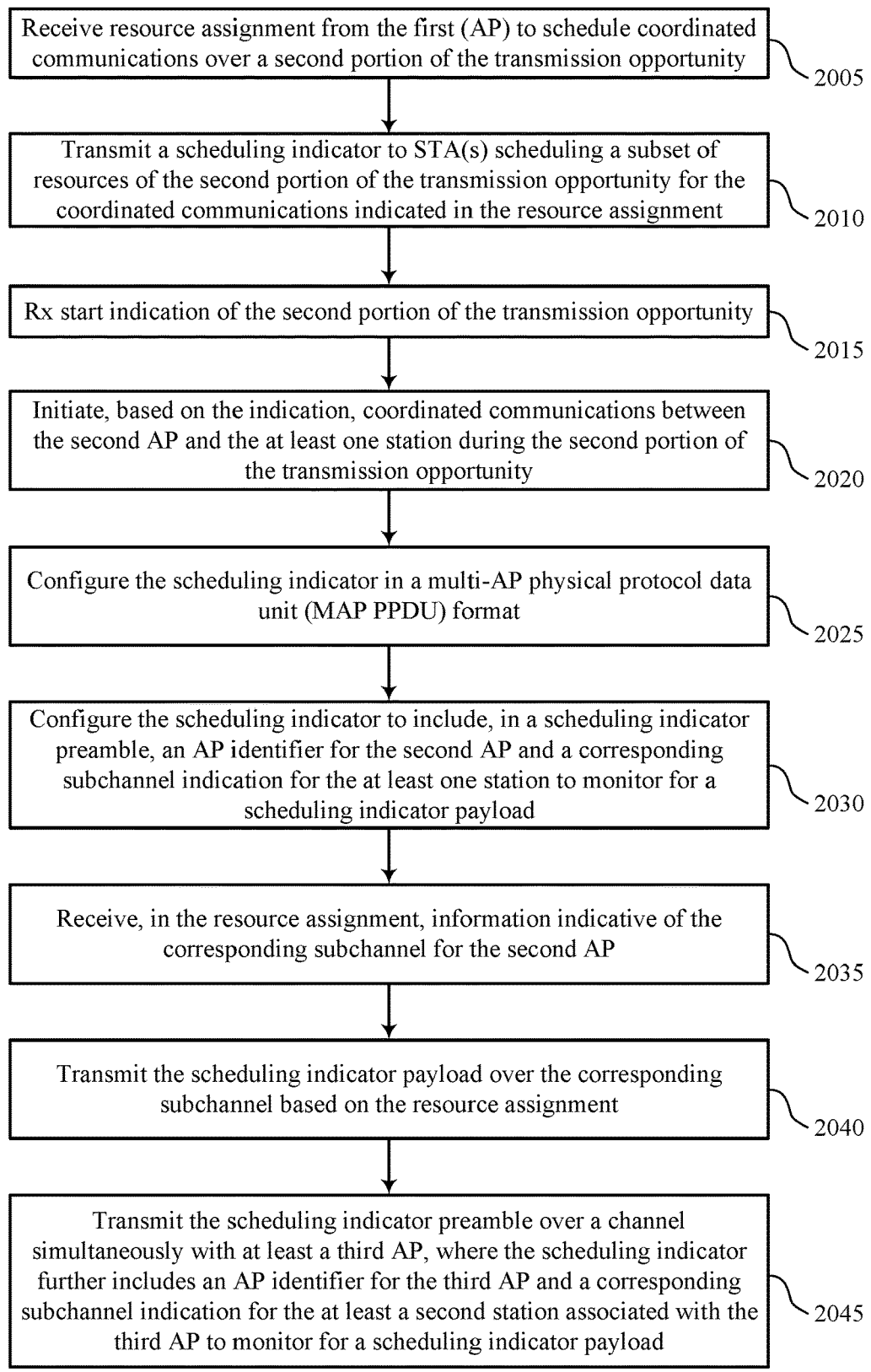

FIG. 20 shows a flowchart illustrating a method 2000 that supports multi-access point scheduling in wireless local area networks in accordance with aspects of the present disclosure. The operations of method 2000 may be implemented by a AP or its components as described herein. For example, the operations of method 2000 may be performed by a communications manager as described with reference to FIGS. 9 through 12. In some examples, a AP may execute a set of instructions to control the functional elements of the AP to perform the functions described below. Additionally, or alternatively, a AP may perform aspects of the functions described below using special-purpose hardware.

At 2005, the AP may receive, during a first portion of a transmission opportunity reserved for communications by a first AP, a resource assignment from the first AP to schedule coordinated communications over a second portion of the transmission opportunity. The operations of 2005 may be performed according to the methods described herein. In some examples, aspects of the operations of 2005 may be performed by a resource assignment manager as described with reference to FIGS. 9 through 12.

At 2010, the AP may transmit a scheduling indicator to at least one station associated with the second access point scheduling a subset of resources of the second portion of the transmission opportunity for the coordinated communications indicated in the resource assignment. The operations of 2010 may be performed according to the methods described herein. In some examples, aspects of the operations of 2010 may be performed by a scheduling manager as described with reference to FIGS. 9 through 12.

At 2015, the AP may receive an indication of a start of the second portion of the transmission opportunity. The operations of 2015 may be performed according to the methods described herein. In some examples, aspects of the operations of 2015 may be performed by a multi-AP transmission manager as described with reference to FIGS. 9 through 12.

At 2020, the AP may initiate, based on the indication, coordinated communications between the second AP and the at least one station during the second portion of the transmission opportunity. The operations of 2020 may be performed according to the methods described herein. In some examples, aspects of the operations of 2020 may be performed by a coordinated communications manager as described with reference to FIGS. 9 through 12.

At 2025, the AP may configure the scheduling indicator in a multi-AP physical protocol data unit (MAP PPDU) format. The operations of 2025 may be performed according to the methods described herein. In some examples, aspects of the operations of 2025 may be performed by a scheduling manager as described with reference to FIGS. 9 through 12.

At 2030, the AP may configure the scheduling indicator to include, in a scheduling indicator preamble, an AP identifier for the second AP and a corresponding subchannel indication for the at least one station to monitor for a scheduling indicator payload. The operations of 2030 may be performed according to the methods described herein. In some examples, aspects of the operations of 2030 may be performed by a scheduling manager as described with reference to FIGS. 9 through 12.

At 2035, the AP may receive, in the resource assignment, information indicative of the corresponding subchannel for the second AP. The operations of 2035 may be performed according to the methods described herein. In some examples, aspects of the operations of 2035 may be performed by a subchannel resource manager as described with reference to FIGS. 9 through 12.

At 2040, the AP may transmit the scheduling indicator payload over the corresponding subchannel based on the resource assignment. The operations of 2040 may be performed according to the methods described herein. In some examples, aspects of the operations of 2040 may be performed by a subchannel resource manager as described with reference to FIGS. 9 through 12.

At 2045, the AP may transmit the scheduling indicator preamble over a channel simultaneously with at least a third AP, where the scheduling indicator further includes an AP identifier for the third AP and a corresponding subchannel indication for the at least a second station associated with the third AP to monitor for a scheduling indicator payload. The operations of 2045 may be performed according to the methods described herein. In some examples, aspects of the operations of 2045 may be performed by a subchannel resource manager as described with reference to FIGS. 9 through 12.

Figure 21:
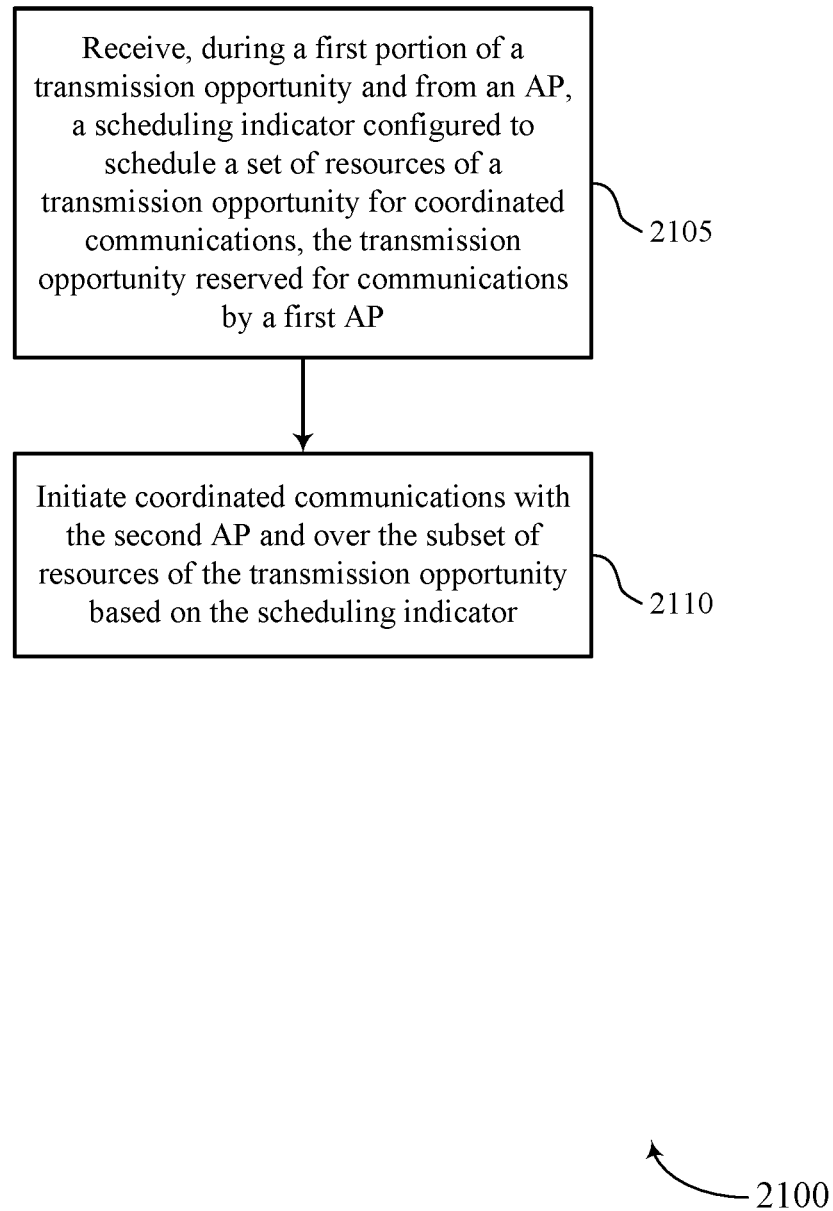

FIG. 21 shows a flowchart illustrating a method 2100 that supports multi-access point scheduling in wireless local area networks in accordance with aspects of the present disclosure. The operations of method 2100 may be implemented by a STA or its components as described herein. For example, the operations of method 2100 may be performed by a communications manager as described with reference to FIGS. 13 through 16. In some examples, a STA may execute a set of instructions to control the functional elements of the STA to perform the functions described below. Additionally, or alternatively, a STA may perform aspects of the functions described below using special-purpose hardware.

At 2105, the STA may receive, during a first portion of a transmission opportunity and from an AP, a scheduling indicator configured to schedule a set of resources of a transmission opportunity for coordinated communications, the transmission opportunity reserved for communications by a first AP. The operations of 2105 may be performed according to the methods described herein. In some examples, aspects of the operations of 2105 may be performed by a scheduling manager as described with reference to FIGS. 13 through 16.

At 2110, the STA may initiate coordinated communications with the second AP and over the subset of resources of the transmission opportunity based on the scheduling indicator. The operations of 2110 may be performed according to the methods described herein. In some examples, aspects of the operations of 2110 may be performed by a coordinated communications manager as described with reference to FIGS. 13 through 16.

Figure 22:
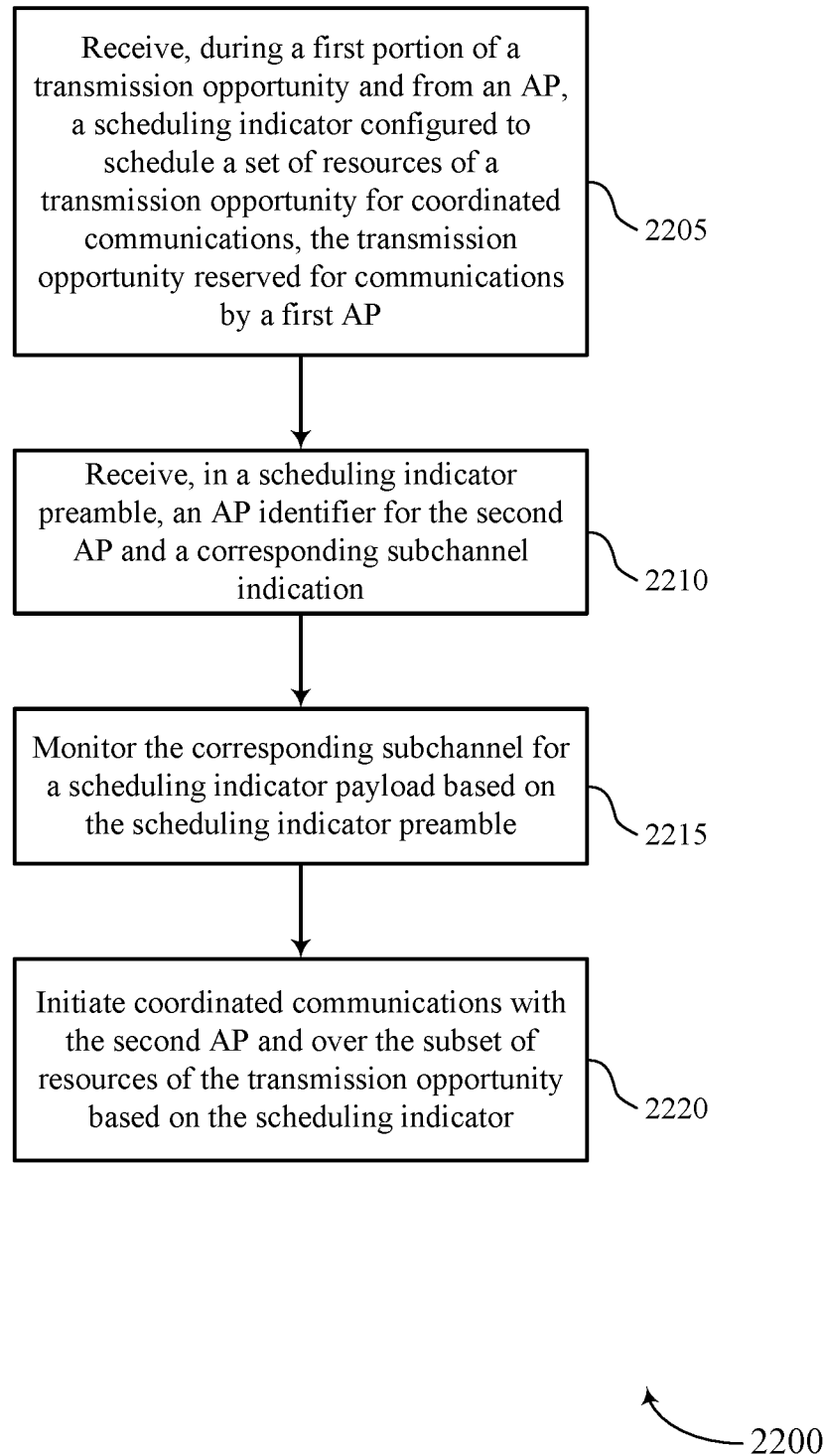

FIG. 22 shows a flowchart illustrating a method 2200 that supports multi-access point scheduling in wireless local area networks in accordance with aspects of the present disclosure. The operations of method 2200 may be implemented by a STA or its components as described herein. For example, the operations of method 2200 may be performed by a communications manager as described with reference to FIGS. 13 through 16. In some examples, a STA may execute a set of instructions to control the functional elements of the STA to perform the functions described below. Additionally, or alternatively, a STA may perform aspects of the functions described below using special-purpose hardware.

At 2205, the STA may receive, during a first portion of a transmission opportunity and from an AP, a scheduling indicator configured to schedule a set of resources of a transmission opportunity for coordinated communications, the transmission opportunity reserved for communications by a first AP. The operations of 2205 may be performed according to the methods described herein. In some examples, aspects of the operations of 2205 may be performed by a scheduling manager as described with reference to FIGS. 13 through 16.

At 2210, the STA may receive, in a scheduling indicator preamble, an AP identifier for the second AP and a corresponding subchannel indication. The operations of 2210 may be performed according to the methods described herein. In some examples, aspects of the operations of 2210 may be performed by a subchannel resource manager as described with reference to FIGS. 13 through 16.

At 2215, the STA may monitor the corresponding subchannel for a scheduling indicator payload based on the scheduling indicator preamble. The operations of 2215 may be performed according to the methods described herein. In some examples, aspects of the operations of 2215 may be performed by a subchannel resource manager as described with reference to FIGS. 13 through 16.

At 2220, the STA may initiate coordinated communications with the second AP and over the subset of resources of the transmission opportunity based on the scheduling indicator. The operations of 2220 may be performed according to the methods described herein. In some examples, aspects of the operations of 2220 may be performed by a coordinated communications manager as described with reference to FIGS. 13 through 16.

Figure 23:
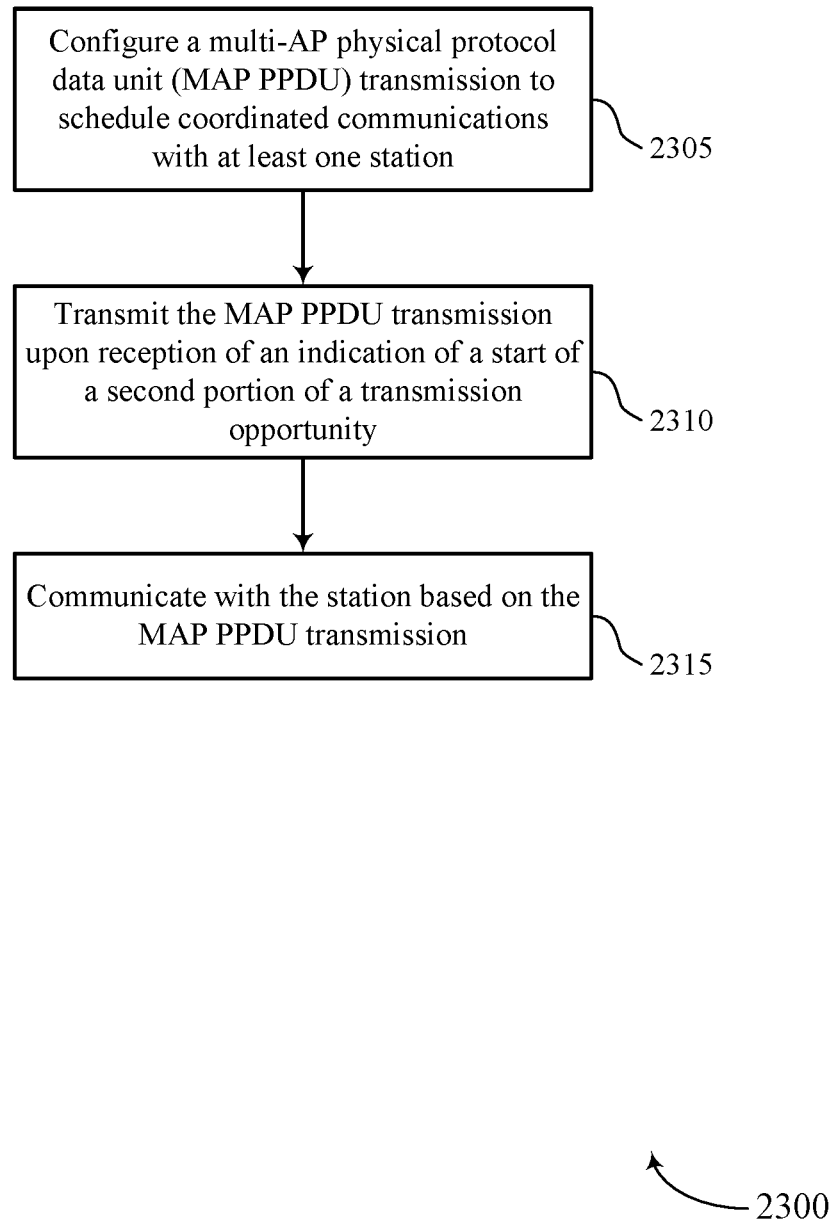

FIG. 23 shows a flowchart illustrating a method 2300 that supports multi-access point scheduling in wireless local area networks in accordance with aspects of the present disclosure. The operations of method 2300 may be implemented by a AP or its components as described herein. For example, the operations of method 2300 may be performed by a communications manager as described with reference to FIGS. 9 through 12. In some examples, a AP may execute a set of instructions to control the functional elements of the AP to perform the functions described below. Additionally, or alternatively, a AP may perform aspects of the functions described below using special-purpose hardware.

At 2305, the AP may configure a multi-AP physical protocol data unit (MAP PPDU) transmission to schedule coordinated communications with at least one station. The operations of 2305 may be performed according to the methods described herein. In some examples, aspects of the operations of 2305 may be performed by a scheduling manager as described with reference to FIGS. 9 through 12.

At 2310, the AP may transmit the MAP PPDU transmission upon reception of an indication of a start of a second portion of a transmission opportunity. The operations of 2310 may be performed according to the methods described herein. In some examples, aspects of the operations of 2310 may be performed by a coordinated communications manager as described with reference to FIGS. 9 through 12.

At 2315, the AP may communicate with the station based on the MAP PPDU transmission. The operations of 2315 may be performed according to the methods described herein. In some examples, aspects of the operations of 2315 may be performed by a coordinated communications manager as described with reference to FIGS. 9 through 12.

Figure 24:
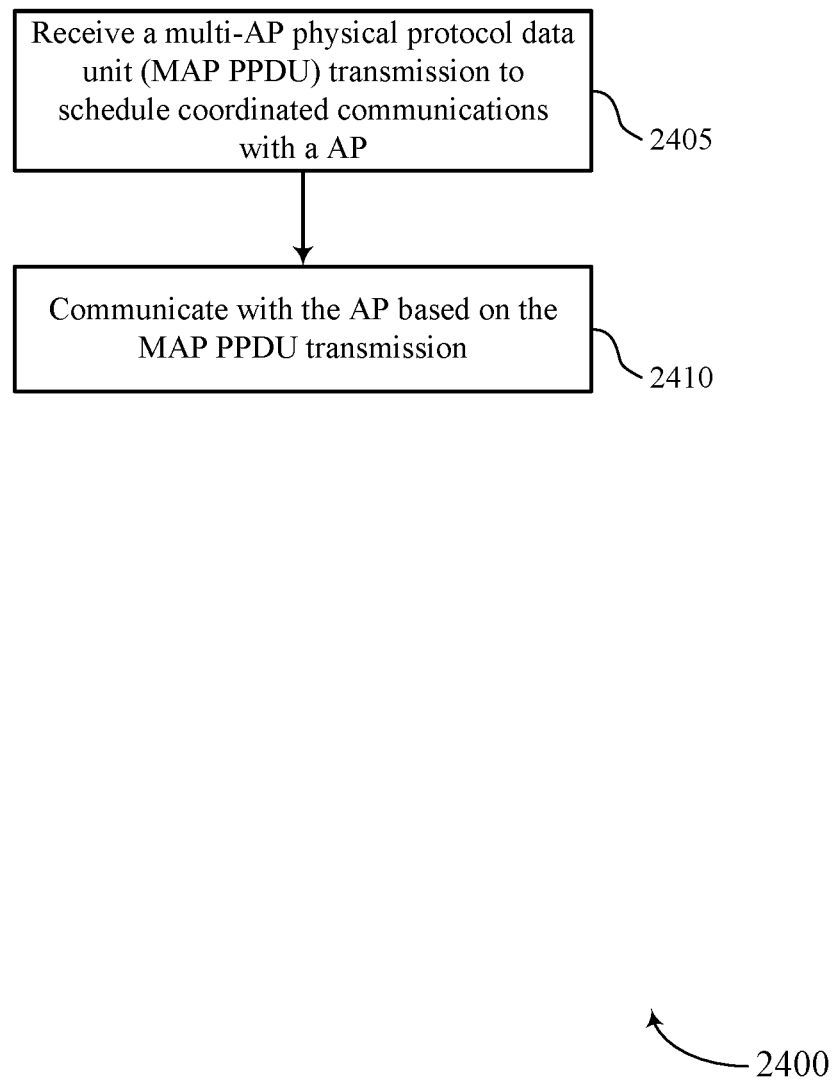

FIG. 24 shows a flowchart illustrating a method 2400 that supports multi-access point scheduling in wireless local area networks in accordance with aspects of the present disclosure. The operations of method 2400 may be implemented by a STA or its components as described herein. For example, the operations of method 2400 may be performed by a communications manager as described with reference to FIGS. 13 through 16. In some examples, a STA may execute a set of instructions to control the functional elements of the STA to perform the functions described below. Additionally, or alternatively, a STA may perform aspects of the functions described below using special-purpose hardware.

At 2405, the STA may receive a multi-AP physical protocol data unit (MAP PPDU) transmission to schedule coordinated communications with a AP. The operations of 2405 may be performed according to the methods described herein. In some examples, aspects of the operations of 2405 may be performed by a scheduling manager as described with reference to FIGS. 13 through 16.

At 2410, the STA may communicate with the AP based on the MAP PPDU transmission. The operations of 2410 may be performed according to the methods described herein. In some examples, aspects of the operations of 2410 may be performed by a coordinated communications manager as described with reference to FIGS. 13 through 16.

Figure 25:
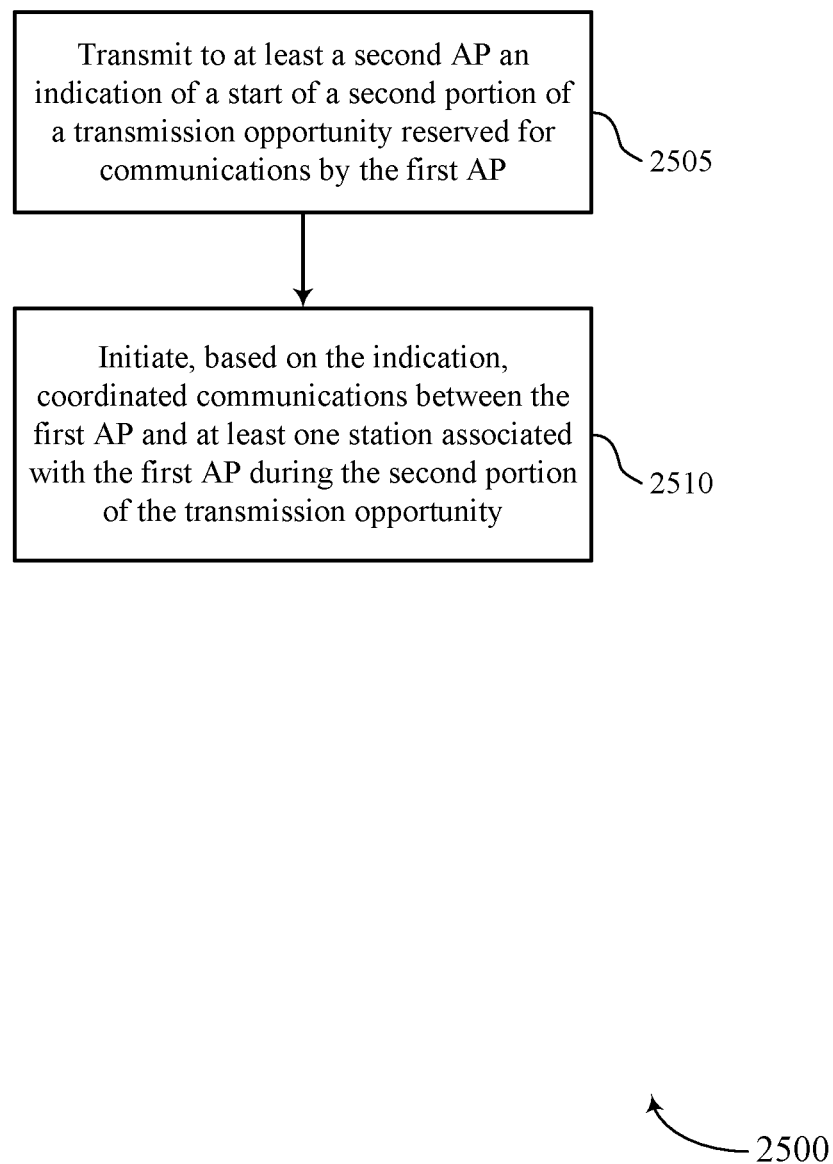

FIG. 25 shows a flowchart illustrating a method 2500 that supports multi-access point scheduling in wireless local area networks in accordance with aspects of the present disclosure. The operations of method 2500 may be implemented by a AP or its components as described herein. For example, the operations of method 2500 may be performed by a communications manager as described with reference to FIGS. 9 through 12. In some examples, a AP may execute a set of instructions to control the functional elements of the AP to perform the functions described below. Additionally, or alternatively, a AP may perform aspects of the functions described below using special-purpose hardware.

At 2505, the AP may transmit to at least a second AP an indication of a start of a second portion of a transmission opportunity reserved for communications by the first AP. The operations of 2505 may be performed according to the methods described herein. In some examples, aspects of the operations of 2505 may be performed by a resource assignment manager as described with reference to FIGS. 9 through 12.

At 2510, the AP may initiate, based on the indication, coordinated communications between the first AP and at least one station associated with the first AP during the second portion of the transmission opportunity. The operations of 2510 may be performed according to the methods described herein. In some examples, aspects of the operations of 2510 may be performed by a coordinated communications manager as described with reference to FIGS. 9 through 12.

Figure 26:
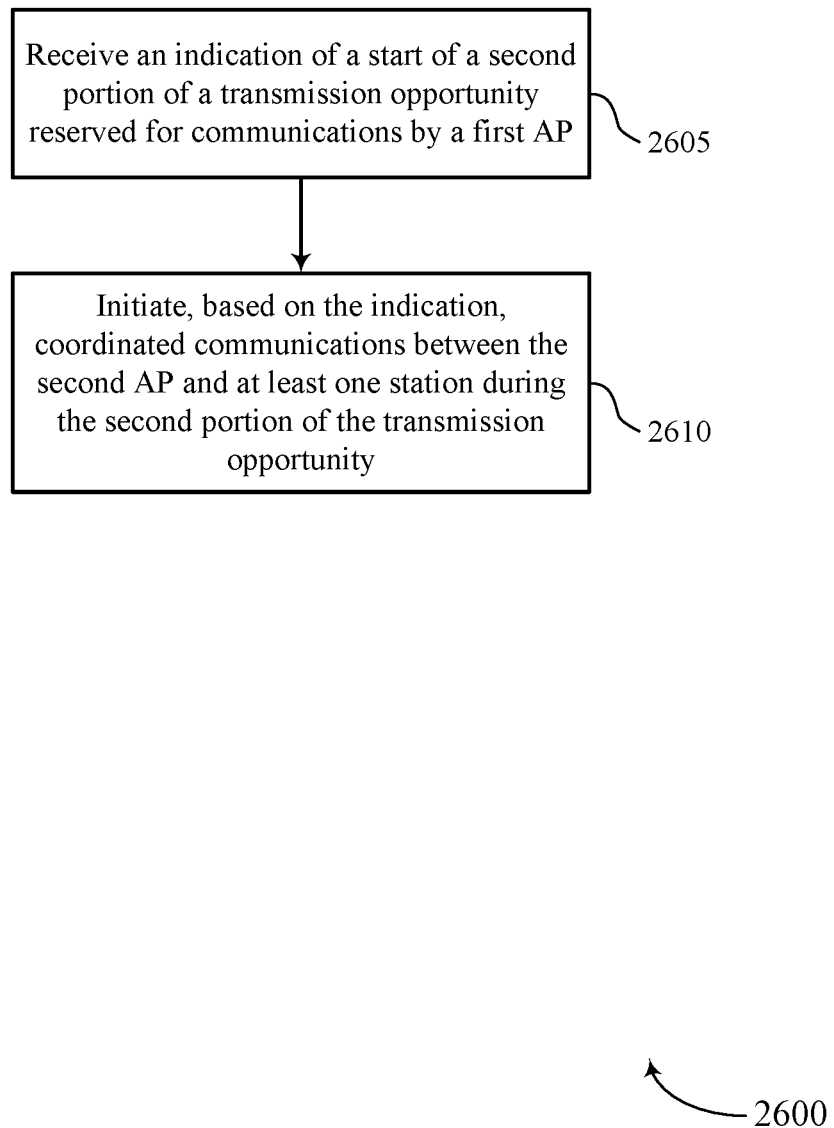

FIG. 26 shows a flowchart illustrating a method 2600 that supports multi-access point scheduling in wireless local area networks in accordance with aspects of the present disclosure. The operations of method 2600 may be implemented by a AP or its components as described herein. For example, the operations of method 2600 may be performed by a communications manager as described with reference to FIGS. 9 through 12. In some examples, a AP may execute a set of instructions to control the functional elements of the AP to perform the functions described below. Additionally, or alternatively, a AP may perform aspects of the functions described below using special-purpose hardware.

At 2605, the AP may receive an indication of a start of a second portion of a transmission opportunity reserved for communications by a first AP. The operations of 2605 may be performed according to the methods described herein. In some examples, aspects of the operations of 2605 may be performed by a resource assignment manager as described with reference to FIGS. 9 through 12.

At 2610, the AP may initiate, based on the indication, coordinated communications between the second AP and at least one station during the second portion of the transmission opportunity. The operations of 2610 may be performed according to the methods described herein. In some examples, aspects of the operations of 2610 may be performed by a coordinated communications manager as described with reference to FIGS. 9 through 12.

Figure 27:
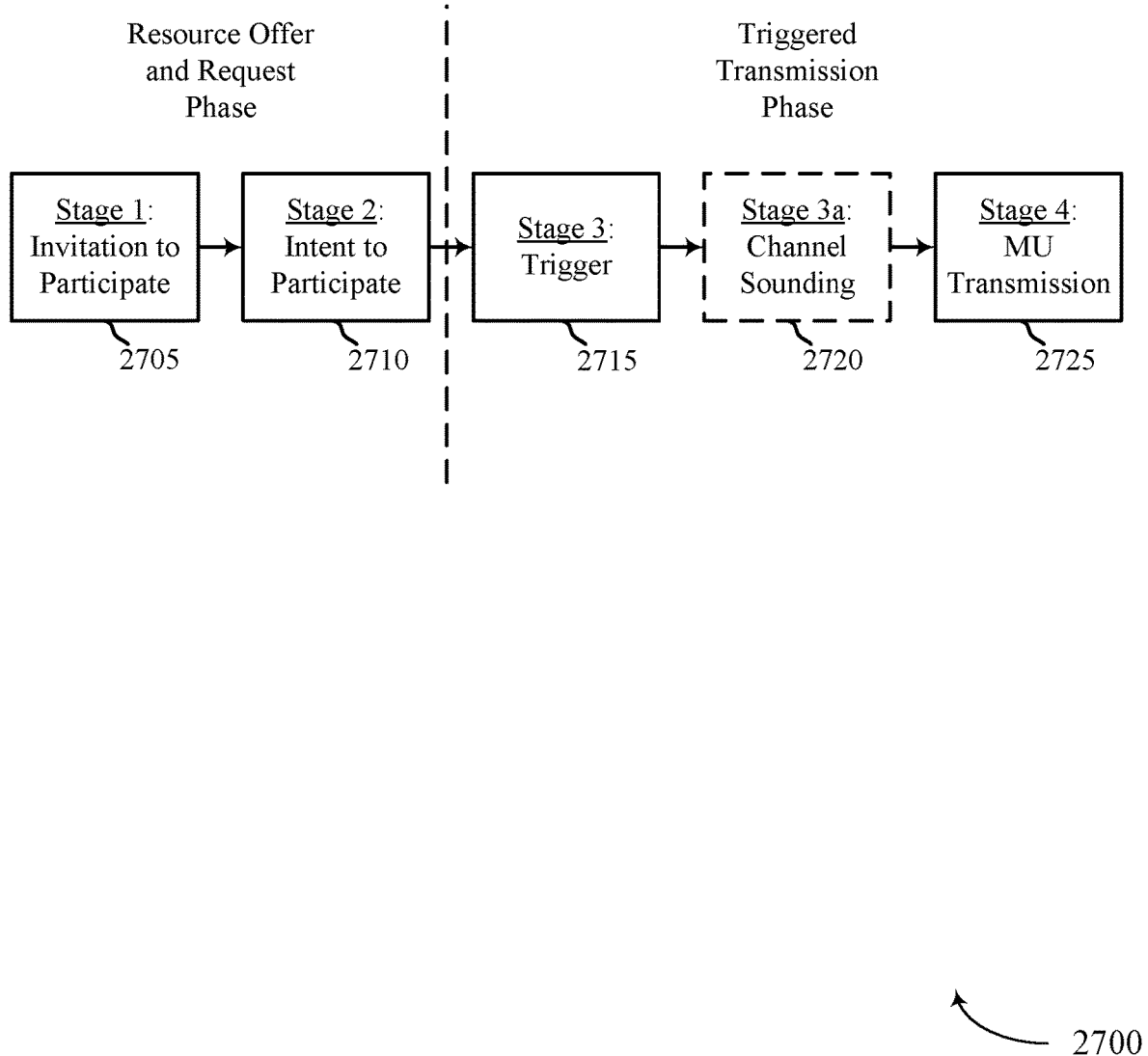
FIG. 27 illustrates an example of a MU transmission scheme that supports protocols for multi-AP coordinated MU transmissions in accordance with aspects of the present disclosure.

FIG. 27 illustrates an example of a MU transmission scheme FIG. 200 that supports protocols for multi-AP coordinated MU transmissions in accordance with aspects of the present disclosure. In some examples, MU transmission scheme FIG. 200 may implement aspects of WLAN 100. One or more aspects of the MU transmission scheme 2700 may be implemented by a wireless station and/or an AP, which may be examples of the corresponding devices described herein.

Aspects of the MU transmission scheme 2700 may be implemented in a wireless network, such as a Wi-Fi network implementing the one or more 802.11 family of standards, e.g., 802.11ax, 802.11ac, or some other Wi-Fi standard. Aspects of the MU transmission scheme 2700 may be implement by a set of AP(s) participating in a MU transmission. The AP(s) may belong to the same BSS and/or may belong to different BSSs. In some aspects, the AP that is coordinating the MU transmission may be considered a master AP (or first AP) and other AP(s) participating in the MU transmission may be considered slave AP(s) (or second AP(s) or neighboring AP(s)).

In some aspects, wireless networks may be configured to support MU transmissions. Broadly, the MU transmissions may include uplink and/or downlink transmissions between AP(s) and their associated wireless stations. Conventionally, the master AP obtains access to the channel for a TxOP in which there are unused or available resources. In response to the master AP determining that resources are available, the master AP autonomously allocates resources to neighboring AP(s) and transmits the resource allocation in the first frame of the TxOP. The neighboring AP(s) receive the resource allocation in the first frame and use the allocated resources to participate in the MU transmission to the extent that they are able with the allocated resources. However, conventional techniques do not provide a mechanism that allows the master AP to dynamically allocate resources to the neighboring AP(s). Instead, the master AP uses other processes/information to decide which resources are allocated to which neighboring AP. This conventional approach is unreliable as the information relied on by the master AP may be stale, e.g., may be based on outdated information that does not currently reflect the resource needs of the neighboring AP(s). However, MU transmission scheme 2700 illustrates an example method to address this, and other, shortcomings of such conventional techniques.

Broadly, the MU transmission scheme 2700 may be divided into a resource offer and request phase (e.g., a first portion of the TxOP) and a triggered transmission phase (e.g., a second portion of the TxOP). The resource offer and request phase may generally include a first stage 2705 (e.g., stage 1) and a second stage 2710 (e.g., stage 2) and the triggered transmission phase may include a third stage (e.g., stage 3) and a fourth stage 2725 (e.g., stage 4), with an optional stage 2720 (e.g., stage 3a).

Broadly, stage 1 may include a first AP (e.g., a master AP) transmitting or otherwise providing an indication of an request or invitation to participate in a MU transmission to one or more second AP(s) (e.g., one or more slave or neighboring AP(s)). In some aspects, stage 1 may include the first AP transmitting, to a second AP and during the first portion of the TxOP, a request to participate in a MU transmission during a second portion of the TxOP. That is, the stages of the resource offer and request phase may include the master AP preparing to transmit on a channel during a TxOP and realizing that there is a lack of efficient usage of frequency/time/spatial resources during the TxOP. To improve resource utilization, the master AP may send out an invitation to neighboring AP(s) (AP(s) associated with the same BSS as the master AP and/or associated with different BSSs) to participate in the MU transmission.

In some aspects, stage 1 may include the master AP offering time/frequency/spatial resources in the upcoming coordinated the MU transmission to neighboring AP(s). This may be a broadcast message to the neighboring AP(s) that may indicate information such as the TxOP duration, an amount of available bandwidth, a number of available spatial dimensions, and the like. In some aspects, this may include the master AP indicating how the neighboring AP(s) should transmit during stage 2. For example, the request or invitation to participate may carry or otherwise convey an indication of the channel on which the neighboring AP is to transmit its stage 2 transmission and/or the transmission schedule (e.g., such as MU-MIMO, OFDMA, scheduled, polled, and the like). In some aspects, the request or invitation to participate may carry or convey an indication of whether the neighboring AP(s) should transmit to their respective wireless station(s) after completion of their intent to participate message (e.g., the stage 2 transmission). This may support power control functions. In some aspects, the request or invitation to participate may carry or convey an indication of a maximum amount of interference the master AP can tolerate, which may be usable by the neighboring AP(s) in setting their respective power control levels. In some aspects, the neighboring AP(s) may use the transmission of the request or invitation to participate to perform/update their time and/or carrier frequency synchronization with the master AP.

In some aspects, the request or invitation to participate may carry or otherwise convey a variety of information usable by the neighboring AP(s) for a variety of purposes. Examples include, but are not limited to the duration of the TxOP, one or more timing parameters of the TxOP (e.g., start time, an end time, etc.), the available bandwidth for the MU transmission, one or more spatial dimension(s) for the MU transmission, a configuration for the neighboring AP(s) to use to transmit the indication of the intent to participate (e.g., one or more resources), a scheduling for the neighboring AP(s) to transmit the indication of intent to participate, a transmission direction for the MU transmission (e.g., uplink and/or downlink indication), and an available interference level for the master AP, an identifier for one or more of the neighboring AP(s), an identifier associated with a group of neighboring AP(s) participating in the MU transmission, a transmit power of the master AP, and the like. Other configurations details may also be included or otherwise conveyed in the request or invitation to participate message.

Broadly, stage 2 may include one or more neighboring AP(s) (e.g., slave AP(s) or second AP(s)) responding to the request or invitation to participate with an indication of an intent to participate that additionally carries or otherwise conveys an indication of a resource request for the corresponding neighbor AP. That is, stage 2 may include the neighboring AP(s) that wish to participate in the MU transmission responding with an intent to participate message or signal to the master AP. The neighboring AP(s) that wish to participate may respond by transmitting or otherwise providing the indication of the intent to participate that requests resources for the MU transmission, with the master AP allocating resources to the neighboring AP(s) based on their respective needs. In some aspects, the intent to participate may be received from neighboring AP(s) in parallel (e.g., all of the same time), according to a transmission schedule, and/or based on a polling signal transmitted by the master AP. In some aspects, one or more of the neighboring AP(s) may configure the indication of intent to participate to additionally indicate a channel power management request for their respective wireless station(s) to measure the channel power using the trigger signal of stage 3.

In some aspects, the neighboring AP(s) may transmit the intent to participate to the master AP and to any wireless station(s) associated with the neighboring AP. In some aspects, the intent to participate may be transmitted in a single protocol data unit that may identify the wireless station(s), whether a channel power management request is to be performed by the wireless station(s), and the like. In other aspects, the neighboring AP(s) may break up the transmission into two protocol data units. For example, in a first protocol data unit the neighboring AP may transmit the intent to participate to the master AP. In a second protocol data unit, the neighboring AP may transmit the intent to participate to each of the wireless station(s) that are associated with the neighboring AP and that are participating in the MU transmission. In this example, the second protocol data unit may carry or otherwise provide an indication of the identifier for the wireless station(s) and/or a channel power measurement request for the wireless station(s) to measure channel power (e.g., receive power level) using the trigger signal of stage 3.

In some aspects, stage 2 may include each neighboring AP transmitting or otherwise providing a message to the master AP that indicates whether they plan to participate in the MU transmission and, if so, the quantity of resources they are requesting. In some aspects, the neighboring AP(s) may transmit to the wireless station(s) to indicate to them that they should measure the receive power level of the next transmission (e.g., the stage 3 trigger signal transmitted by the master AP). In some examples, the master AP may configure the request or invitation to participate message to indicate whether the neighboring AP(s) are to transmit this information to their respective wireless station(s). In some aspects, the wireless station(s) associated with the neighboring AP may measure the received power (e.g., RSSI) from the master AP to set the power control in stage 4, e.g., in the case of an uplink coordinated MU transmission.

In some aspects, stage 3 of the triggered transmission phase may include the master AP transmitting or otherwise providing an indication of a trigger signal to the participating neighboring AP(s) (e.g., the slave or second AP(s)). In some aspects, the trigger signal may carry or otherwise provide an indication of resources for each of the participating neighboring AP(s) to use during the MU transmission. For example, the master AP may determine the resource need for each neighboring AP based on the intent to participate message and allocate the unused resources within the TxOP based on the needs of the neighboring AP(s). The trigger signal may be configured to provide an indication (explicitly and/or implicitly) to each respective neighboring AP of which resources are allocated to it. In some aspects, the trigger signal may provide an indication of timing for the neighboring AP(s) to use during the MU transmission. In some aspects, the master AP may additionally configure the trigger signal to carry or otherwise convey an indication of a guard interval duration for the MU transmission, a preamble configuration for the MU transmission, a transmission direction for the MU transmission, an allowable interference level for the master AP, an indication of whether the optional channel sounding stage (e.g., stage 3a) it is to be performed, and the like.

In some aspects, stage 3 may include the master AP assigning channels to the neighboring AP(s). In the example where two neighboring AP(s) are assigned the same channel at the same time, they may perform a coordinated beamforming to avoid interference, collision, and the like. In some aspects, the master AP may indicate or otherwise specify the structure of the MU transmission in stage 4, e.g., to ensure orthogonality. In some aspects, this may include the master AP indicating the time for the start of the stage 4 transmission, a guard interval duration, a number of training fields (e.g., an STF, LTFs, and the like). In some aspects, the master AP may configure the trigger signal to carry or otherwise convey an indication of whether the coordinated MU transmission in stage 4 is uplink or downlink. In the downlink scenario, the master AP and the neighboring AP(s) may generally provide downlink transmissions to their respective wireless station(s). In the uplink scenario, the master AP and the neighboring AP(s) may generally receive uplink transmissions from the respective wireless station(s). In some examples, the coordinated MU transmission may be a combination of downlink and uplink communications, e.g., some AP(s) may be performing downlink transmissions while other AP(s) are receiving uplink transmissions. In some aspects, the trigger signal may be configured to indicate a maximum amount of interference that the master AP can tolerate. This information may be usable by the neighboring AP(s) in setting their respective power control levels. In some aspects, the master AP may configure the trigger signal to indicate the presence of the optional channel sounding stage (e.g., stage 3a). This may be performed when the master AP schedules the neighboring AP(s) for channel sounding. In some aspects, the neighboring AP(s) may use this transmission (e.g., the trigger signal) to perform/update their respective time and/or carrier frequency synchronizations with the master AP.

In some aspects, the triggered transmission phase may include an optional stage 3a where channel sounding is performed. In some aspects, this may include the master AP sending out synchronization frames to allow the neighboring AP(s) to synchronize and/or the master AP/neighboring AP(s) to collect feedback, if needed, using explicit and/or implicit feedback mechanisms. In some aspects, this may include the master AP configuring the trigger signal to indicate that channel sounding is to be performed between stage 3 and stage 4. The master AP may perform the channel sounding between itself and its associated wireless station(s) during stage 3a while the neighboring AP(s) perform channel sounding between their self and their respective associated wireless station(s). In some aspects, optional stage 3a may include, when needed, the master AP and neighboring AP(s) performing channel sounding per a schedule assigned by the master AP. In some aspects, the master AP may set or otherwise configure the start and stop time for this phase, e.g., such as in the stage 3 trigger transmission. When not needed, master AP may set the duration for the optional stage 3a to a zero value.

In some aspects, the triggered transmission phase may include stage 4 in which the MU transmission is performed. In some aspects, stage 4 may include the master AP, in conjunction with the one or more neighboring AP(s) during the second portion of the TxOP, participating in the MU transmission. That is, stage 4 may include the master AP performing downlink transmissions to its associated wireless station(s) while the participating neighboring AP(s) perform downlink transmissions to their respective associated wireless station(s). In another example, stage 4 may include the master AP receiving uplink transmissions from its associated wireless station(s) while the participating neighboring AP(s) receive uplink transmissions from their respective associated wireless station(s). In some aspects, stage 4 may include a mix of downlink and uplink transmissions during the transmission opportunities, e.g., one or more AP(s) may be performing downlink transmissions while one or more other AP(s) may be receiving uplink transmissions during the TxOP.

In some aspects, the master AP may transmit or otherwise provide an indication of a control channel assignment to its associated wireless station(s) that are participating in the MU transmission. Generally, the control channel assignment may assign a control channel to each wireless station to use to determine the resource allocation for the MU transmission between the master AP and the wireless station. Similarly, the one or more neighboring AP(s) may also transmit control channel assignment messages to each of its own associated wireless station(s) that are participating in the MU transmission. Generally, the wireless station(s) may use the control channel assignment to receive, in the beginning of a data transmission portion of the MU transmission of stage 4, the resource allocation for each station to use for the MU transmission. In some aspects, the message or signal carrying or otherwise providing the indication of the control channel assignment may be transmitted in the same or a different physical layer protocol data unit than the data transmission of the MU transmission. In one non-limiting example, the control channel assignment message may be transmitted in a preamble of the trigger signal of stage 4, e.g., transmitted by each participating AP to begin an uplink MU transmission from their respective wireless stations (which may also be referred to as a per-AP trigger signal). In another non-limiting example, the control channel assignment message may be transmitted in a preamble of the data transmission. Accordingly, the master AP and neighboring AP(s) may participate in the MU transmission according to the control channel assignment.

Figure 28:
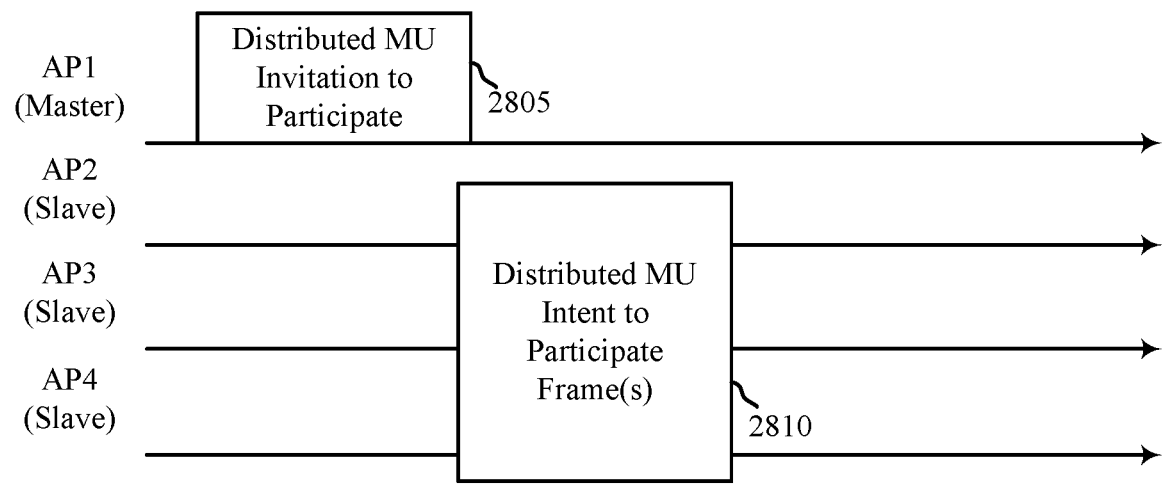
FIG. 28 illustrates an example of a MU transmission scheme that supports protocols for multi-AP coordinated MU transmissions in accordance with aspects of the present disclosure.

FIG. 28 illustrates an example of a MU transmission scheme 2800 that supports protocols for multi-AP coordinated MU transmissions in accordance with aspects of the present disclosure. In some examples, MU transmission scheme 2800 may implement aspects of WLAN 100 and/or MU transmissions scheme 2700. Aspects of the MU transmission scheme 2800 may be implemented by an AP and/or a wireless station, which may be examples of the corresponding devices described herein. Generally, the MU transmission scheme 2800 illustrates an example of a resource offer and request phase in accordance with aspects of the described techniques. Aspects of the MU transmission scheme 2800 may be associated with downlink and/or uplink transmissions during the MU transmission.

Generally, the resource offer and request phase may include the first stage 2805 (e.g., stage 1) and the second stage 2810 (e.g., stage 2). Broadly, stage 1 includes a distributed MU transmission invitation to participate transmitted by a master AP (e.g., a first AP). Generally, the master AP may obtain or otherwise secure access to a channel during a TxOP and determine that extra resources are available for the MU transmission during the TxOP. For example, the master AP may determine that the resources associated with the TxOP (e.g., time, frequency, spatial, and the like) are more than the master AP needs to perform its transmissions during the TxOP. Accordingly, in stage 1 the master AP may transmit or otherwise provide an indication of an invitation or request to participate in the MU transmission to one or more neighboring AP(s) (e.g., second or slave AP(s)). Generally, the invitation or request to participate may be provided in a first portion of the TxOP (e.g., the resource offer and request phase) and generally offers resources to the neighboring AP(s).

In some aspects, the contents of the distributed MU invitation to participate frame may serve to initiate or otherwise get the process started for the MU transmission and align symbols from various neighboring AP(s) (e.g., provide a rough alignment between the master AP and the neighboring AP(s)). In some aspects, the invitation to participate frame or message may carry or otherwise provide an indication of a variety of parameters, configurations, and the like. In some aspects, the invitation to participate frame may carry an identifier of AP(s) (e.g., a BSSID) that are being invited to participate in the MU transmission. In some aspects, the invitation to participate frame may carry a group identifier for a group of AP(s) (e.g., an identifier associated with the AP(s) that will be participating in the MU transmission). In some aspects, the invitation to participate frame may carry an indication of the resources available for the neighboring AP(s) (e.g., time, frequency, and/or spatial resources). In some aspects, the invitation to participate frame may carry an indication of the duration of actual transmissions (such as a duration for which the resources are available), e.g., the TxOP duration. In some aspects, the invitation to participate frame may carry a resource allocation on a per-AP basis for subsequent frames (e.g., the intent to participate frame and/or a control channel assignment frame). In some aspects, the invitation to participate frame may carry an indication of the transmit power of the transmitting AP (e.g., the master AP) and/or a tolerable interference/RSSI level for OBSS transmissions (which may be combined into a single entity as well). In some aspects, the invitation to participate frame may carry an indication of the number of long training fields (LTF) symbols for the MU transmission. All AP(s) participating in the MU transmission may follow the indication of the number of symbols for downlink and/or relay this information to their respective wireless station(s) in their trigger signals for uplink. In some aspects, the invitation to participate frame may carry an indication of a midamble periodicity. In some aspects, the invitation to participate frame may carry an indication of a guard interval duration/LTF type (e.g., 1×, 2×, or 4×) being used during the MU transmission. Again, all AP(s) participating in the MU transmission may follow the indication for downlink and/or relay this information to the respective wireless station(s) in their trigger signals for uplink.

Broadly, stage 2 includes intent to participate frame(s) from the neighboring AP(s) that signals their intent to participate in the MU transmission. For example, the neighboring AP(s) may reply to the invitation or request to participate with a request for resources in the intent to participate frame(s). In the example MU transmission scheme 2800, AP 2, AP 3, and AP 4 transmit or otherwise provide the indication of the intent to participate to the master AP, with each indication of intent to participate signaling a request for resources by the respective neighboring AP. In some aspects, the intent to participate frames from the neighboring AP(s) may be transmitted or otherwise provided according to a variety of manners.

In some aspects, only the master AP is a target of the intent to participate frame. In some aspects, the intent to participate frames from each of the neighboring AP(s) may be provided one AP at a time (e.g., according to a scheduled transmission, based on the neighboring AP being polled by the master AP, and the like). In some aspects, uplink multiple user multiple input/multiple output (MU-MIMO) and/or uplink orthogonal frequency division multiple access (OFDMA) may be used to send the intent to participate frames to the master AP. In this example, the resource allocation for transmission of the intent to participate frames may be provided in the invitation or request to participate frame from the master AP. In some aspects, the intent to participate frame may carry or otherwise convey an indication of the resources being requested by the neighboring AP(s) (e.g., slave AP(s)). The resource request may be explicit and/or implicit, e.g., requested indirectly through other parameters such as queue lengths, priority, and the like.

Figure 29:
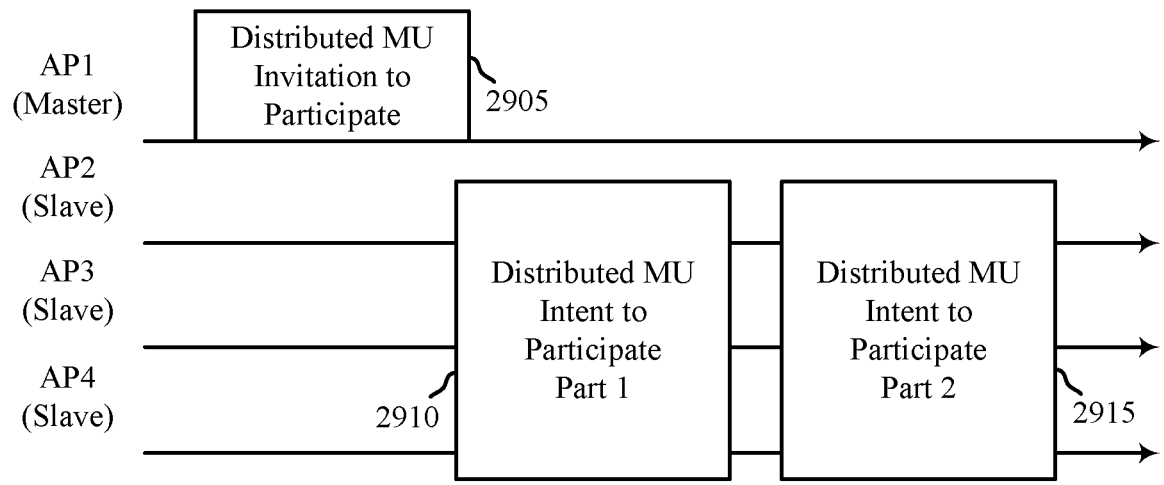
FIG. 29 illustrates an example of a MU transmission scheme that supports protocols for multi-AP coordinated MU transmissions in accordance with aspects of the present disclosure.

FIG. 29 illustrates an example of a MU transmission scheme 2900 that supports protocols for multi-AP coordinated MU transmissions in accordance with aspects of the present disclosure. In some examples, MU transmission scheme 2900 may implement aspects of WLAN 100 and/or MU transmissions schemes 2700 and/or 2800. Aspects of the MU transmission scheme 2900 may be implemented by an AP and/or a wireless station, which may be examples of the corresponding devices described herein. Generally, the MU transmission scheme 2900 illustrates an example of a resource offer and request phase in accordance with aspects of the described techniques. Aspects of the MU transmission scheme 2900 may be associated with downlink and/or uplink transmissions during the MU transmission.

Generally, the resource offer and request phase may include the first stage 2905 (e.g., stage 1) and a second stage (e.g., stage II), but with the second stage being broken up into separate frames. Broadly, stage 1 includes a distributed MU transmission invitation to participate transmitted by a master AP (e.g., a first AP). Generally, the master AP may obtain or otherwise secure access to a channel during a TxOP and determine that extra resources are available for the MU transmission during the TxOP. For example, the master AP may determine that the resources associated with the TxOP (e.g., time, frequency, spatial resources) are more than the master AP needs to perform its transmissions during the TxOP. Accordingly, in stage 1 the master AP may transmit or otherwise provide an indication of an invitation or request to participate in the MU transmission to one or more neighboring AP(s) (e.g., second or slave AP(s)). Generally, the invitation or request to participate may be provided in a first portion of the TxOP (e.g., the resource offer in request phase) and generally offers resources to the neighboring AP(s).

Broadly, stage 2 includes two intent to participate frame(s) from the neighboring AP(s) that signals their intent to participate in the MU transmission. For example, the first frame 2910 may include the neighboring AP(s) replying to the invitation or request to participate with a request for resources in the intent to participate first frame 2910. That is, the first frame 2910 generally carries or otherwise provides an indication of the request for resources by AP 2, AP 3, and AP 4 to the master AP. The second frame 2915 may be targeted to the wireless station(s) associated with the transmitting AP and generally primes the wireless station(s) for the MU transmission.

That is, MU transmission scheme 2900 generally breaks stage 2 of the described techniques into 2 parts (2 frames) where both the master AP and wireless station(s) are targets that are signaled using separate protocol data units. The first part (e.g., the first frame 2910 or first protocol data unit) may be transmitted or otherwise provided from the neighboring AP(s) to the master AP. The first frame 2910 may be transmitted otherwise provided sequentially and/or as a regular trigger based (TB) protocol data unit to convey the resource request (e.g., uplink OFDMA and/or uplink MU- MIMO). Generally, the first frame 2910 carries or otherwise provides the indication of the resource request from the neighboring AP(s) to the master AP.

Generally, the second part (e.g., the second frame 2915) may generally be transmitted or otherwise provided to wireless stations (e.g., wireless station(s) associated with the respective neighboring AP that are participating in the MU transmission). In some aspects, the second frame 2915 may be transmitted redundantly. For example, the second frame 2915 may be transmitted in every 20 MHz channel, where the information is duplicated within each 20 MHz channel. In some aspects, every AP (the master AP as well as each participating neighboring AP) may transmit the second frame 2915 in every 20 MHz channel. Broadly, the second frame 2915 primes the wireless station(s) for measuring channel power of a group configured trigger signal and moving to their respective channels. In some aspects, the second frame 2915 may be transmitted when the MU transmission involves uplink transmissions from the wireless stations. In some aspects, the second frame 2915 may carry or otherwise convey an indication of the list of the slave wireless stations participating in the MU transmission (e.g., an identifier for each wireless station and/or a group identifier associated with the wireless stations).

Figure 30:
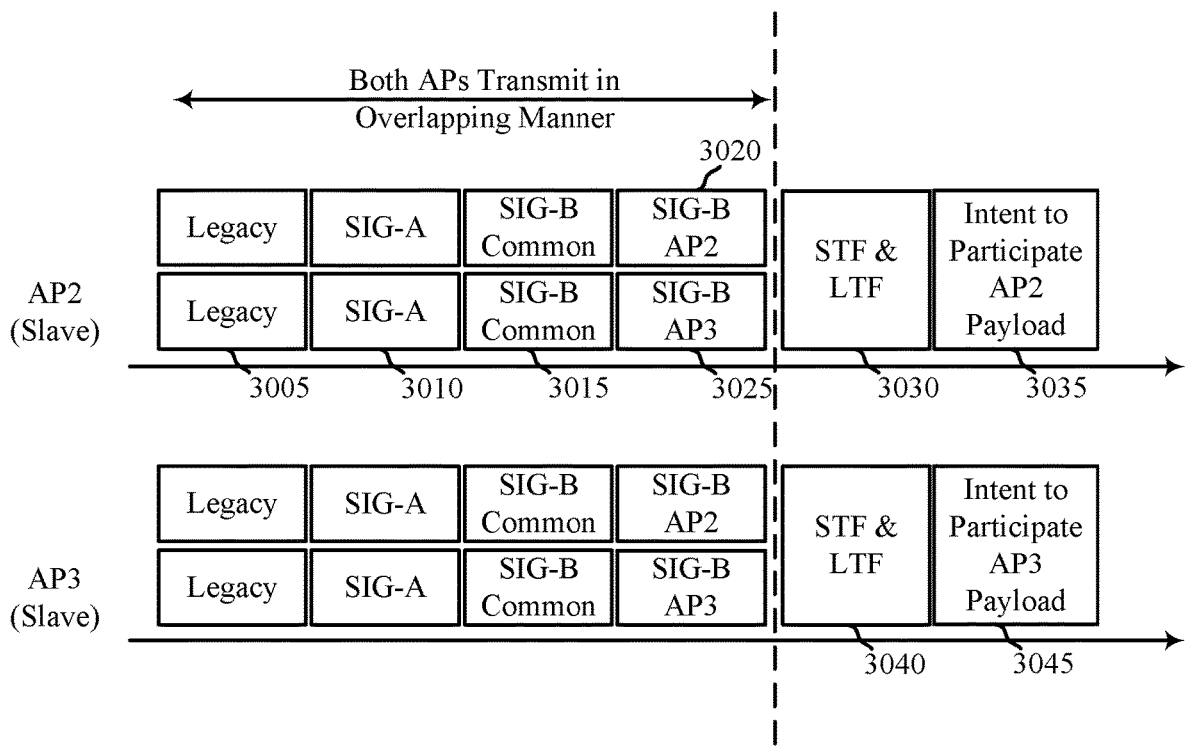
FIG. 30 illustrates an example of a MU transmission scheme that supports protocols for multi-AP coordinated MU transmissions in accordance with aspects of the present disclosure.

FIG. 30 illustrates an example of a MU transmission scheme 3000 that supports protocols for multi-AP coordinated MU transmissions in accordance with aspects of the present disclosure. In some examples, MU transmission scheme 3000 may implement aspects of WLAN 100 and/or MU transmissions schemes 2700, 2800, and/or 2900. Aspects of the MU transmission scheme 3000 may be implemented by an AP and/or a wireless station, which may be examples of the corresponding devices described herein. Generally, the MU transmission scheme 3000 illustrates an example of a stage 2 transmission in the resource offer and request phase in accordance with aspects of the described techniques. Aspects of the MU transmission scheme 3000 may be associated with downlink and/or uplink transmissions during the MU transmission. More specifically, MU transmission scheme 3000 illustrates an example format for an intent to participate transmission from one or more neighboring AP(s) to a master AP in response to an invitation or request to participate in a MU transmission.

As discussed, one option for transmission of the intent to participate (e.g., the intent to participate transmission) may include the one or more of the neighboring AP(s) transmitting the intent to participate in parallel, where each of the neighboring AP(s) may transmit a unique intent to participate indication and/or may transmit a similar intent to participate indication. One benefit of this is that it down selects the wireless stations to achieve power savings and primes the wireless station(s) for listening to a subsequent frame from the master AP for power control. Another option for transmission of the intent to participate may include the one or more neighboring AP(s) transmitting the intent to participate one neighboring AP at a time (e.g., according to a schedule or based on a polling signal from the master AP). For example, an OFDMA signal may be sent to the master AP and the wireless stations, with the resource allocation for transmission of the intent to participate being provided in the invitation or request to participate frame. In this instance, the preamble of the frame may be configured to indicate or otherwise inform the wireless station(s) about the resource allocation for this frame.

As discussed, the resource offer and request phase may include the first stage (e.g., stage 1) that includes a and master AP transmitting or otherwise providing a request or invitation to participate in the MU transmission and a second stage (e.g., stage II) where the neighboring AP(s) provide the indication of the intent to participate to the master AP. MU transmission scheme 3000 illustrates one example configuration in which the intent to participate indication is transmitted from the neighboring AP(s), such as from AP 2 and AP 3, in parallel.

Broadly, MU transmission scheme 3000 illustrates an example where the master AP allocates 40 MHz each to two neighboring AP(s) (AP 2 and AP 3) for transmitting the intent to participate frame. Aspects of the MU transmission scheme 3000 are similar to a downlink MU-PPDU (being transmitted by multiple AP(s)) with the payload sent in an OFDMA fashion, and indicates to recipients a payload location in frequency. In particular, each of AP 2 and AP 3 may transmit on each 20 MHz channel. Generally, the information in each of the frames up to the SIG-B common frame 3015 is the same across each 20 MHz channel from each of AP 2 and AP 3, such as in a broadcast transmission. Next, each of AP 2 and AP 3 (on each 20 MHz channel) may transmit a SIG-B frame 3020 for AP 2 and a SIG-B frame 3025 for AP 3. That is, instead of a per-user (e.g., wireless station) SIG-B field, the MU transmission scheme 3000 includes a per-AP SIG-B frame for each of AP 2 and AP 3. In some aspects, the SIG-B frame 3020 for AP 2 may carry or otherwise convey an indication of an identifier for AP 2, which may be recognizable by wireless station(s) associated with AP 2. Similarly, the SIG-B frame 3025 for AP 3 may carry or otherwise convey an indication of an identifier for AP 3, which may be recognizable by wireless station(s) associated with AP 3.

Following the per-AP SIG frames, AP 2 may transmit a STF and LTF 3030 followed by an intent to participate payload 3035 for AP 2. Similarly, AP 3 may transmit (on its respective 40 MHz channel) a STF and LTF 3040 followed by an intent to participate payload 3045 for AP 3. As discussed, the contents of each intent to participate payload may include a list (e.g., identifiers) of the wireless station(s) associated with the respective neighboring AP and/or an indication of the resources being requested by the neighboring AP.

Figure 31A:
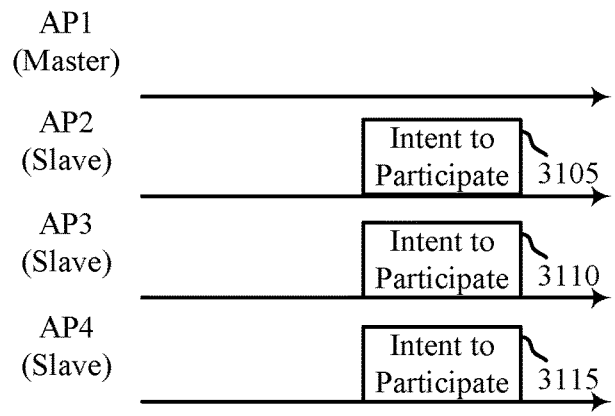
FIGS. 31A-31C illustrate examples of a MU transmission scheme that supports protocols for multi-AP coordinated MU transmissions in accordance with aspects of the present disclosure.
Figure 31B:
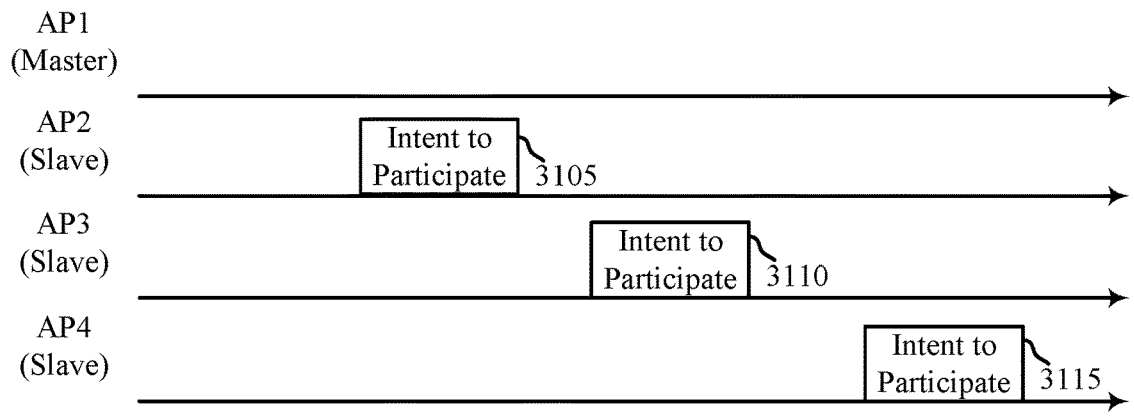
Figure 31C:
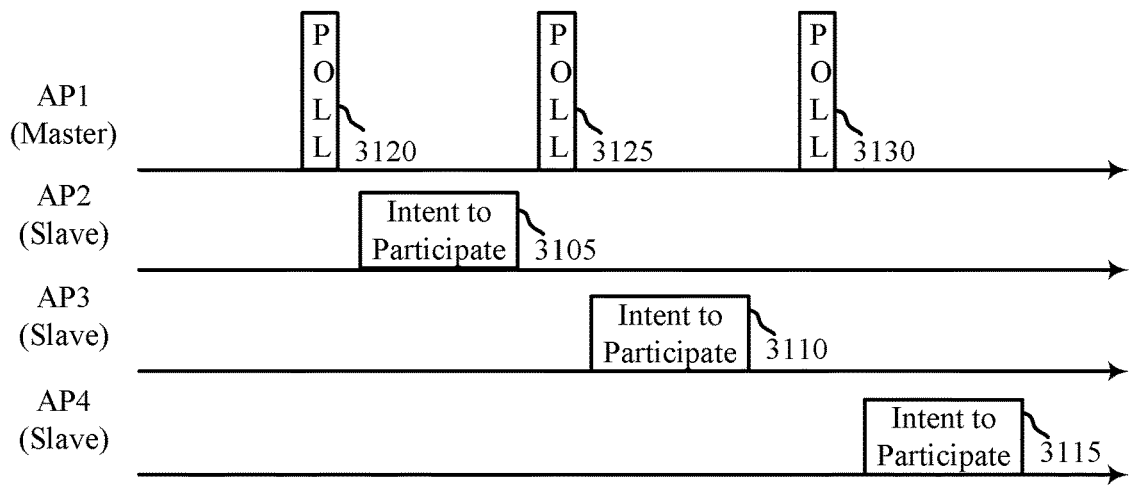

FIGS. 31A-31C illustrate examples of a MU transmission scheme 3100 that supports protocols for multi-AP coordinated MU transmissions in accordance with aspects of the present disclosure. In some examples, MU transmission scheme 3100 may implement aspects of WLAN 100 and/or MU transmissions schemes 2700, 2800, 2900, and/or 3000. Aspects of the MU transmission scheme 3100 may be implemented by an AP and/or a wireless station, which may be examples of the corresponding devices described herein. Generally, the MU transmission scheme 3100 illustrates various examples of scheduling approaches for a stage 2 transmission in the resource offer and request phase in accordance with aspects of the described techniques. Aspects of the MU transmission scheme 3100 may be associated with downlink and/or uplink transmissions during the MU transmission.

As discussed, the described MU transmission schemes may include transmission of an intent to participate from one or more neighboring AP(s) (such as AP 2, AP 3, and AP 4) to a master AP (such as AP 1). Generally, each of the scheduling approaches illustrated in MU transmission scheme 3100 may be implemented in response to the neighboring AP(s) (or slave AP(s)) receiving the invitation or request to participate in the MU transmission from the master AP. Referring first to FIG. 31A, in one example the intent to participate transmissions may be provided from the neighboring AP(s) in parallel. For example, AP 2 may transmit its intent to participate message 3105 in conjunction with AP 3 transmitting its intent to participate message 3110 and AP 4 transmitting its intent to participate message 3115. Aspects of the simultaneous transmission may be achieved using various techniques to distinguish the respective intent to participate message by the master AP. Example techniques to distinguish the respective intent to participate message include, but are not limited to, frequency diversity, spatial domain diversity, code division diversity, and/or any other orthogonal technique. In some aspects, the simultaneous or parallel transmission may utilize either MU-MIMO and/or OFDMA techniques to distinguish the intent to participate messages from the respective neighboring AP(s).

Referring next to FIG. 31B, the intent to participate transmissions may be provided from the neighboring AP(s) according to a scheduled transmission. As discussed, the invitation or request to participate message transmitted by the master AP may provide an indication of one or more resources and/or configuration for the neighboring AP(s) to respond with their respective intent to participate messages. In the example illustrated in FIG. 31B, the indication provided in the request or invitation to participate may schedule each of the neighboring AP(s) to transmit their respective intent to participate message at a different time (e.g., may utilize time diversity to help distinguish between the respective intent to participate messages). Accordingly, AP 2 may transmit its intent to participate message 3105 during a first time period, AP 3 may transmit its intent to participate message 3110 during a second time period, an AP 3 may transmit its intent to participate message 3115 during an third time period.

Referring next to FIG. 31C, the intent to participate transmissions may be provided from the neighboring AP(s) according to a polled transmission. For example, the master AP may configure the invitation or request to participate message to indicate that the polling transmission scheme will be utilized by the neighboring AP(s) and, in some examples, provide various configuration information for the polling transmissions (e.g., such as an order, timing, and the like). Accordingly, the master AP may transmit a polling signal 3120 that signals AP 2 to transmit its intent to participate message 3105. The master AP may transmit a polling signal 3125 the signals AP 3 transmit its intent to participate message 3110. And finally, the master AP may transmit a polling signal 3130 that signals AP 4 to transmit its intent to participate message 3115. In some aspects, the polling signal 3120 may be implicit for AP 2.

Figure 32:
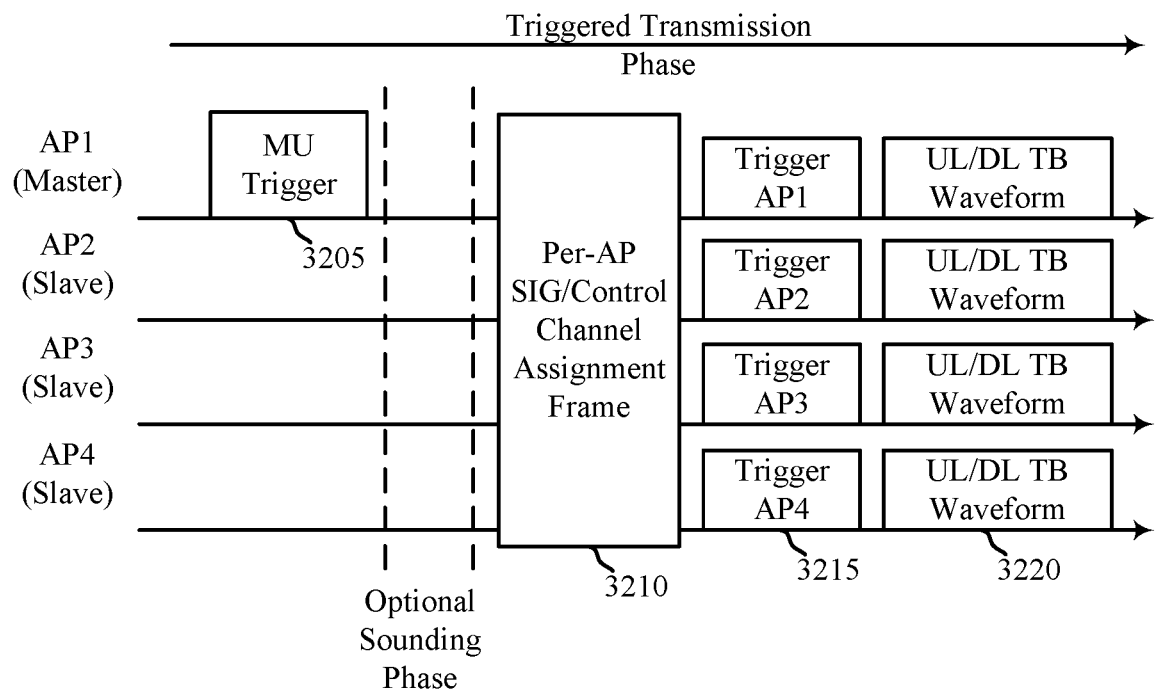
FIG. 32 illustrates an example of a MU transmission scheme that supports protocols for multi-AP coordinated MU transmissions in accordance with aspects of the present disclosure.

FIG. 32 illustrates an example of a MU transmission scheme 3200 that supports protocols for multi-AP coordinated MU transmissions in accordance with aspects of the present disclosure. In some examples, MU transmission scheme 3200 may implement aspects of WLAN 100 and/or MU transmissions schemes 2700, 2800, 2900, 3000, and/or 3100. Aspects of the MU transmission scheme 3200 may be implemented by an AP and/or a wireless station, which may be examples of the corresponding devices described herein. Generally, the MU transmission scheme 3200 illustrates an example configuration for the triggered MU transmission phase in accordance with aspects of the described techniques. Aspects of the MU transmission scheme 3200 may be associated with downlink and/or uplink transmissions during the MU transmission.

Broadly, MU transmission scheme 3200 illustrates a high-level canonical block configuration for the triggered MU transmission phase that is applicable to downlink and/or uplink transmissions during the MU transmission. The features illustrated with respect to the MU transmission scheme 3200 may be performed following the resource offer and request phase, as is discussed above. Generally, the MU transmission scheme 3200 begins by the master AP transmitting a trigger signal 3205 to one or more neighboring AP(s) that carries or otherwise provides an indication of a set of resources for each neighboring AP to use during the MU transmission. That is, the master AP may send the final resource allocations in the distributed MU group in the configuration frame which acts as a trigger from the perspective of the neighboring AP(s). In some aspects, the trigger signal 3205 may be transmitted during an initial period of the second portion of the TxOP. In some aspects, the trigger signal 3205 may additionally be transmitted in a no data packet announcement (NDPA) frame of the optional sound phase. In some aspects, the trigger signal 3205 may ensure cross-AP synchronization and symbol alignment for the MU transmission.

In some aspects, the trigger signal 3205 may carry or convey an indication of a variety of parameters. For example, the trigger signal 3205 may carry or convey an indication of the final resource allocation for the neighboring AP(s) (e.g., AP 2, AP 3, and AP 4). In some aspects, the trigger signal 3205 may carry or convey an indication of an identifier for the neighboring AP(s) (e.g., BSSID). In some aspects, the trigger signal 3205 may carry or convey an indication of a group ID that is associated with the neighboring AP(s) and the master AP (e.g., the AP(s) participating in the MU transmission). In some aspects, the trigger signal 3205 may carry or convey an indication of the duration of the actual transmissions (e.g., a duration or period of the TxOP). In some aspects, the trigger signal 3205 may carry or convey an indication of the transmit power of the master AP, a tolerable or allowable interference level that the master AP may support, and RSSI level for cross-BSS transmissions, and the like. In some aspects, such variables may be combined into a single entity (e.g., a single field or bitmap). In some aspects, the trigger signal 3205 may carry or convey an indication of a number of high efficiency (HE)-LTF symbols and HE-SIG-B symbols for the TxOP. All AP(s) participating in the MU transmission may follow this indication for the downlink and/or relay this information to their respective wireless station(s) in their per-AP trigger frame 3215 for uplink. In some aspects, the trigger signal 3205 may carry or convey an indication of the trigger frame lengths. In some aspects, the trigger signal 3205 may carry or convey an indication of a midamble periodicity. In some aspects, the trigger signal 3205 may carry or convey an indication of a guard interval duration and/or an LTF type being used. Again, each AP participating the MU transmission may follow this information for the downlink and/or relay this information to their respective wireless station(s) for the uplink.

In some aspects, the trigger signal 3205 may be followed by an optional sounding phase. In some aspects, this may include sequential sounding where one NDP per-AP use the sounding one AP at a time. This may leverage various sounding sequences, but with certain tweaks (e.g., the NDPA may address even OBSS wireless stations). In some aspects, this may include joint sounding using one NDP to sound transmit to all the AP(s). This may result in some reduction in overhead. The NDPs may be time multiplexed, code multiplex (e.g., P matrix) and/or frequency multiplexed among the transmit chains of all AP(s). In some aspects, this may include implicit sounding, e.g., using separate uplink NDPs per wireless station or a joint uplink NDP from all wireless stations.

The optional sounding phase may be followed by a per-AP SIG/control channel assignment frame 3210. In some aspects, the per-AP SIG/control channel assignment frame 3210 may provide an indication of a channel allocation for the downlink case and/or uplink case. In one option, this may be signaled in a separate frame (as is shown), combined with the trigger signal 3205, and/or may be a part of the actual downlink transmission.

Although the per-AP SIG/control channel assignment frame 3210 is illustrated in FIG. 32 as being sent in a single frame, in some aspects this may be divided into separate frames for each AP. This may facilitate moving the wireless stations of their respective AP to switch channels for the MU transmission. Broadly, each frame may carry or convey an indication of the multiple of the 20 MHz channels of the wireless station(s) corresponding to the sending AP (e.g., based on the BSSID) that the wireless station(s) are to monitor. In some aspects, this may be a repeat of the per-AP resource allocation indicated in the trigger signal 3205. The separate per-AP SIG/control channel assignment frame 3210 may be separated into multiple frames using varying techniques. For example, OFDMA techniques may be utilized for the per-AP SIG/control channel assignment frame 3210. For example, the resource allocation for the frame may be carried or otherwise conveyed in one or more of the frames that precede the per-AP SIG/control channel assignment frame 3210, the invitation to participate frame for the master AP and/or the trigger signal 3205 from the master AP. Another example may include identical content being signaled in each band (e.g., each 20 MHz channel), with each AP sending the control channel information for all of the AP(s) participating in the MU transmission on all of the channels. For example, this may be duplicated across each 10 MHz channel, 20 MHz channel, 40 MHz channel, and the like. While this option may slightly increase overhead, and may also provide for easier configuration.

This may be followed by per-AP trigger frames 3215 from each AP. Generally, each per-AP trigger frame 3215 may be transmitted by the all of the AP(s) that have detailed per-wireless station resource allocations. In some aspects, the per-AP trigger frame 3215 may be utilized in an uplink transmission scenario, rather than a downlink transmission scenario.

This may be followed by the downlink or uplink TB waveform 3220, e.g., the actual data transmission portion of the MU transmission. For the downlink case, the detailed per-wireless station resource allocations may happen in the actual downlink or uplink TB waveform 3220. In some aspects, the location of the per-AP trigger frame 3215 and/or the downlink or uplink TB waveform 3220 in the frequency domain may be signaled in the control channel assignment frame (e.g., the per-AP SIG/control channel assignment frame 3210).

Figure 33:
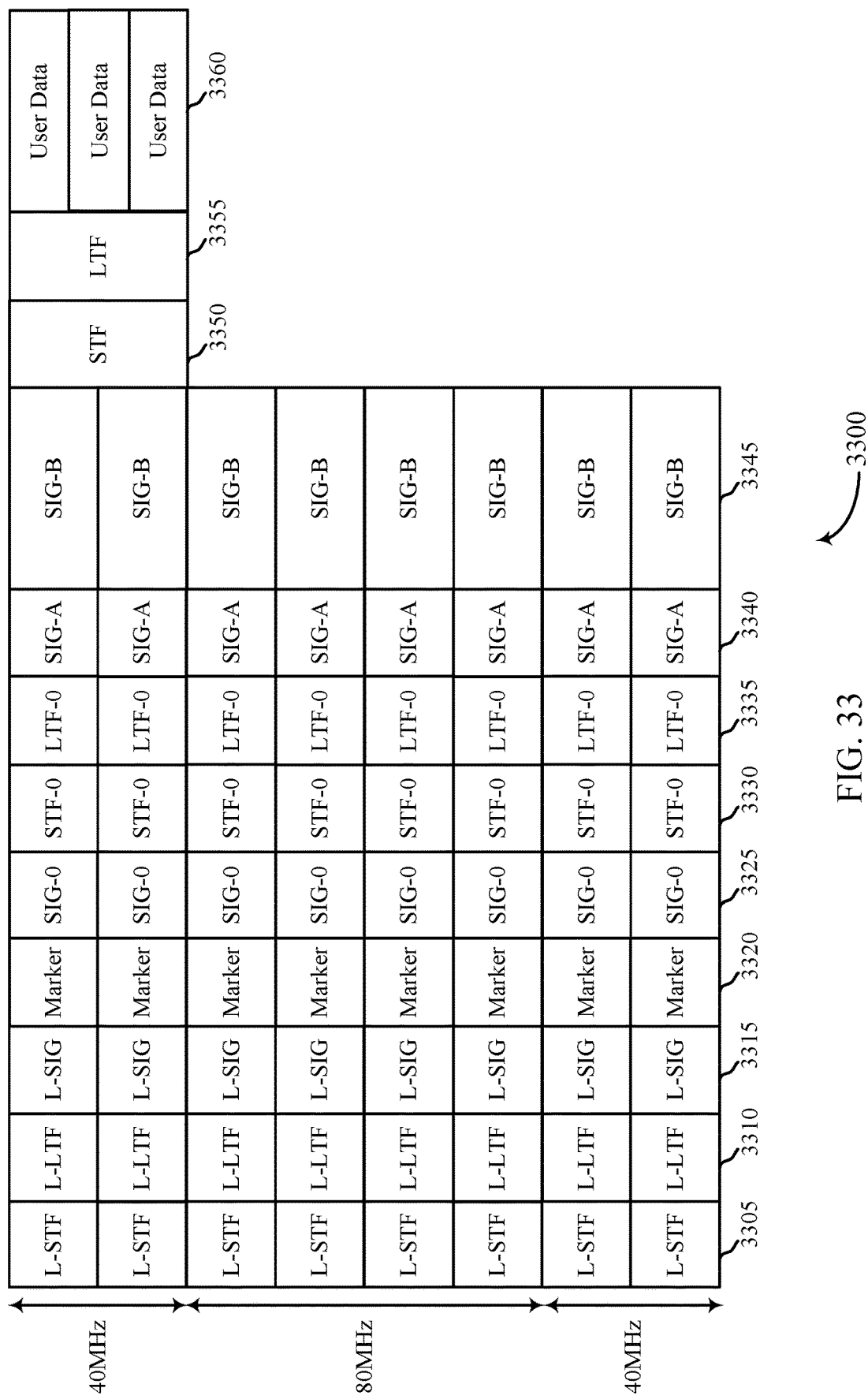
FIG. 33 illustrates an example of a MU transmission scheme that supports protocols for multi-AP coordinated MU transmissions in accordance with aspects of the present disclosure.

FIG. 33 illustrates an example of a MU transmission scheme 3300 that supports protocols for multi-AP coordinated MU transmissions in accordance with aspects of the present disclosure. In some examples, MU transmission scheme 3300 may implement aspects of WLAN 100 and/or MU transmissions schemes 2700, 2800, 2900, 3000, 3100, and/or 3200. Aspects of the MU transmission scheme 3300 may be implemented by an AP and/or a wireless station, which may be examples of the corresponding devices described herein. Generally, the MU transmission scheme 3300 illustrates an example configuration for stage 4 of the triggered MU transmission phase in accordance with aspects of the described techniques. Aspects of the MU transmission scheme 3300 may be associated with downlink and/or uplink transmissions during the MU transmission.

Broadly, MU transmission scheme 3300 illustrates an example where the per-AP SIG/control channel assignment frame (such as the per-AP SIG/control channel assignment frame 710 of FIG. 7) is carried in the downlink transmission itself. That is, the MU transmission scheme 3300 illustrates an example protocol data unit format with the control channel allocation happening within the protocol data unit. Generally this may begin with each AP participating in the MU transmission transmitting or otherwise providing an L-STF field 3305, and L-LTF field 3310, an L-SIG field 3315, a marker field 3320, a SIG-0 field 3325, an STF-0 field 3330, an LTF-0 field 3335, a SIG-A field 3340, and a SIG-B field 3345. In some aspects, the L-STF field 3305, and L-LTF field 3310, an L-SIG field 3315, a marker field 3320, a SIG-0 field 3325, an STF-0 field 3330, and the LTF-0 field 3335 may be transmitted in the duplicated manner, such as in every 20 MHz channel associated with the TxOP. That is, every AP participating in the MU transmission may transmit the same information in these fields on every 20 MHz channel. In some aspects, the EHT indication may be carried or conveyed in the marker field 3320. In some aspects, the SIG-0 field 3325 may carry or convey a particular AP(s) SIG-A/B information. For example, in one option the SIG-0 field 3325 may carry or convey both data and the control channel location. In another option, the SIG-0 field 3325 may only carry or convey the control channel location. One benefit of this option may be that there is no coupling between the control channel location and the data bandwidths in a pre-SIG portion of the preamble. In some examples, the SIG-0 field 3325 may use a group identifier to convey allocations (e.g., an AP group identifier to convey the indication of the location of the control channels).

In some aspects the SIG-0 field 3325, the STF-0 field 3330, and the LTF-0 field 3335 may be considered as a pre-SIG section that conveys or indicates the location of the control channels and provides a channel estimation opportunity for all the channels before the wireless stations tunes to the relevant SIG-A/B channels. In some aspects the SIG-A field 3340 may be duplicated only in every AP(s) allocated bandwidth. Some aspects, the SIG-B field 3345 may carry or convey the per-wireless station allocation and may have different content in some or all of the 20 MHz channels. In other aspects, the SIG-B field 3345 may be duplicated in an alternating fashion amongst the 20 MHz channels.

In some aspects, each AP may transmit an STF field 3350 followed by an LTF field 3355 and user data 3360 to complete the MU transmission. It is to be understood that each user data 3360 field may be associated with different users (e.g., different wireless stations) and/or with the same user.

In some aspects, the L-STF field 3305, L-LTF field 3310, L-SIG field 3315, marker field 3320, SIG-0 field 3325, STF-0 field 3330, LTF-0 field 3335, SIG-A field 3340, and SIG-B field 3345 may be considered the preamble for the stage 4 transmission of the MU transmission. In some aspects, MU transmission scheme 3300 may also be used for a wideband transmission from a single AP. For example, this configuration may allow the AP to handle wireless stations with different bandwidth capabilities, as it offers a way to park groups of wireless stations to different "20 MHz-multiple" channels, e.g., in a 320 MHz protocol data unit, this configuration provides a mechanism to move a certain group of wireless stations which are 80 MHz capable to a certain "20 MHz-multiple" channel. In some aspects, this may also enable the SIG structure to depart from the 802.11ax amendment's [1 2 1 2] frequency repetition structure of SIG-B for wider bandwidths, thereby allowing for more parallelization and therefore lowering overhead.

Figure 34:
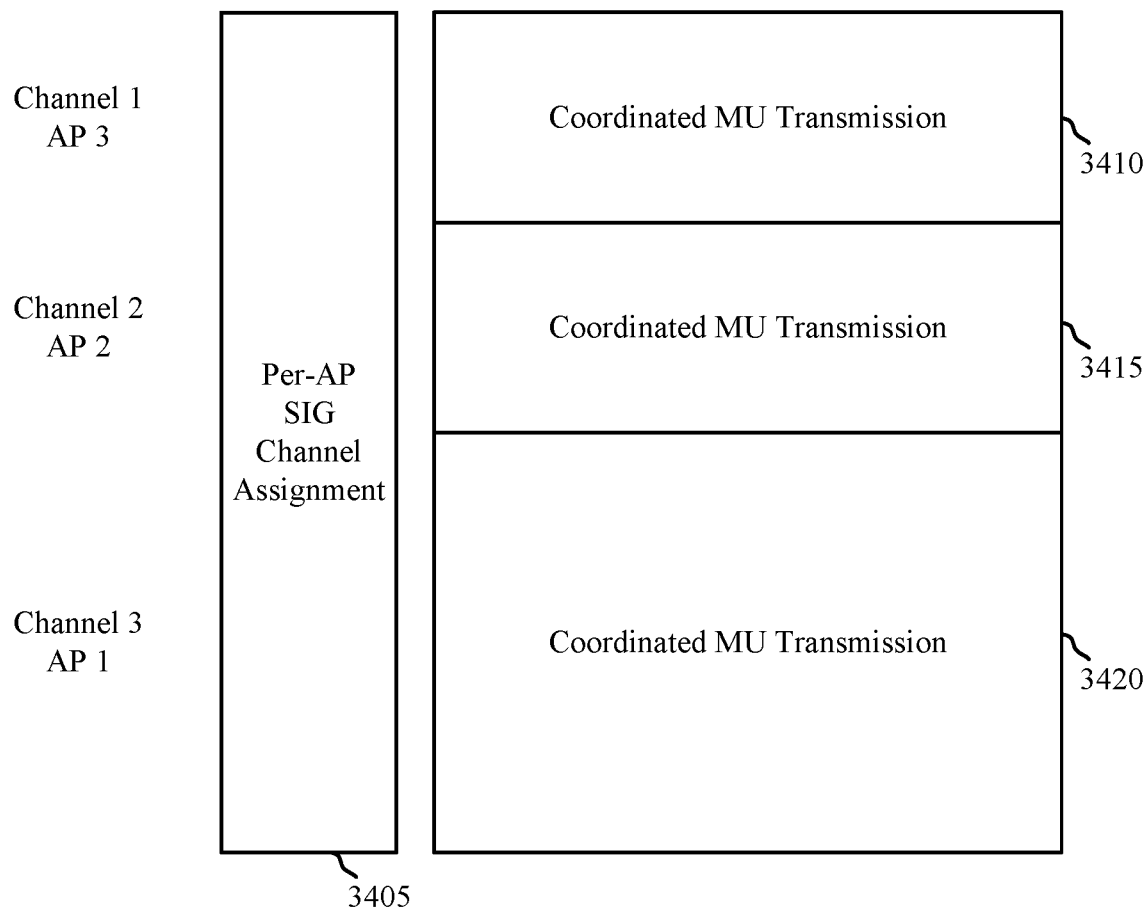
FIG. 34 illustrates an example of a MU transmission scheme that supports protocols for multi-AP coordinated MU transmissions in accordance with aspects of the present disclosure.

FIG. 34 illustrates an example of a MU transmission scheme 3400 that supports protocols for multi-AP coordinated MU transmissions in accordance with aspects of the present disclosure. In some examples, MU transmission scheme 3400 may implement aspects of WLAN 100 and/or MU transmissions schemes 2700, 2800, 2900, 3000, 3100, 3200, and/or 3300. Aspects of the MU transmission scheme 3400 may be implemented by an AP and/or a wireless station, which may be examples of the corresponding devices described herein. Generally, the MU transmission scheme 3400 illustrates an example configuration for the triggered MU transmission phase in accordance with aspects of the described techniques. Aspects of the MU transmission scheme 3400 may be associated with downlink and/or uplink transmissions during the MU transmission.

In some aspects, MU transmission scheme 3400 illustrates one example configuration for a triggered MU transmission phase. This may include a stage 4 transmission where all AP(s) that participate in the MU transmission are performing the MU transmission during the second portion (e.g., the triggered transmission phase) of the TxOP. Generally, in beginning of this stage all of the participating AP(s) may jointly indicate to all of the wireless stations the channel to which to receive their respective SIG fields. This is illustrated in FIG. 34 as the per-AP SIG channel assignment 3405, which may also be referred to as each AP participating in the MU transmission performs the MU transmission to the respective wireless stations, or vice versa. In some aspects, there may be an optional gap in time after the per-AP SIG channel assignment 3405 to allow time for bandwidth-limited wireless stations to retune to the correct channel.

After the optional gap in time, the participating AP(s) may make any necessary resource unit assignments to their respective wireless stations. In some aspects, these resource assignments may be specific to a channel for each participating AP (e.g., the master AP (AP 1) and the slave AP(s) (AP 2 and AP 3)). This may generally be a part of the coordinated MU transmission 3410, 3415, and 3420 from the perspective of the participating AP(s). In the example where the coordinated a MU transmission is downlink, all participating AP(s) transmit on their data on their assigned channels and according to their specified protocol data unit structure. In the example where the coordinated a MU transmission is uplink, all participating wireless stations transmit on their assignment channel ports/resource unit according to their assignments. Accordingly, the coordinated a MU transmission 3410, 3415, and 3420 are the actual data transmissions performed during the MU transmission.

Thus, MU transmission scheme 3400 begins with the per-AP SIG channel assignment 3405 in which all the AP(s) transmit their respective SIG channel assignments. In some aspects, these assignments were made in stage 3 (e.g., in the trigger signal) by the master AP, but not all of the wireless stations may receive that message. Accordingly, all of the participating AP(s) transmit the per-AP SIG channel assignment 3405 in order for all of their respective wireless stations to receive this information to determine which channel to receive their SIG fields (along with the prior STFs and LTFs). After the optional time gap the transmission begins with the STF, LTFs, and SIG field. This enables the AP(s) to communicate the resource unit assignments to the respective wireless stations.

Figure 35:
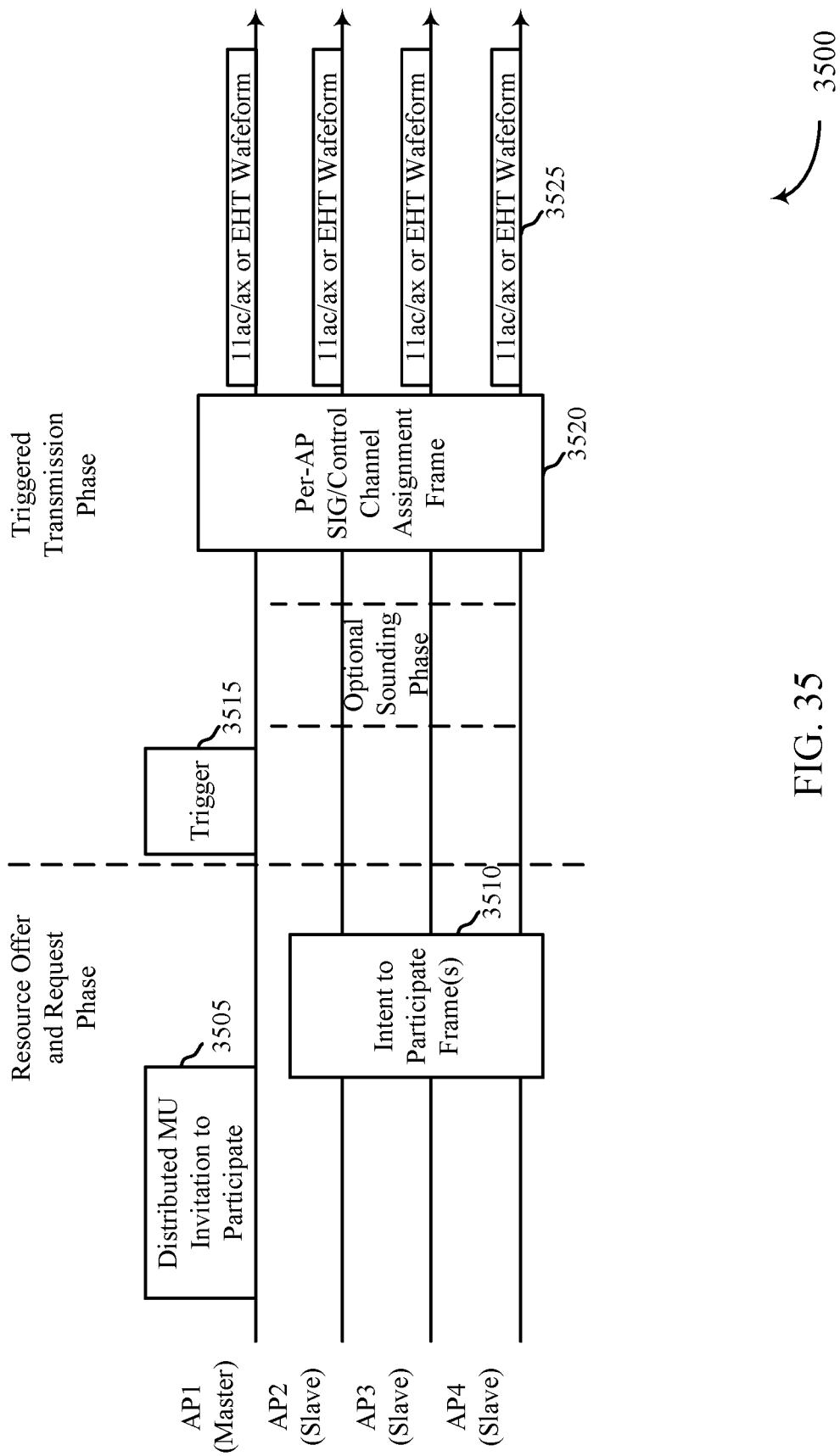
FIG. 35 illustrates an example of a MU transmission scheme that supports protocols for multi-AP coordinated MU transmissions in accordance with aspects of the present disclosure.

FIG. 35 illustrates an example of a MU transmission scheme 3500 that supports protocols for multi-AP coordinated MU transmissions in accordance with aspects of the present disclosure. In some examples, MU transmission scheme 3500 may implement aspects of WLAN 100 and/or MU transmissions schemes 2700, 2800, 2900, 3000, 3100, 3200, 3300, and/or 3400. Aspects of the MU transmission scheme 3500 may be implemented by an AP and/or a wireless station, which may be examples of the corresponding devices described herein. Generally, the MU transmission scheme 3500 illustrates an example downlink configuration for the MU transmission scheme in accordance with aspects of the described techniques.

In some aspects, MU transmission scheme 3500 generally illustrates an example downlink configuration where a master AP (e.g., a first AP or AP 1) and one or more slave AP(s) (e.g., one or more neighboring or second AP(s), such as AP 2, AP 3, and AP 4) participate in a downlink MU transmission to their respective wireless station(s). Generally, MU transmission scheme 3500 may divided into a first portion of the TxOP that includes a resource offer and request phase and a second portion of the TxOP that includes a triggered transmission phase. The first portion of the TxOP typically includes a stage 1 where the master AP transmits an invitation or request to participate 3505 in the MU transmission during the second portion (e.g., the triggered transmission phase) of the TxOP. Generally, the invitation or request to participate 3505 is transmitted to one or more neighboring AP(s) as an offer or invitation for the neighboring AP(s) to participate in the MU transmission. Neighboring AP(s) that receive the invitation or request to participate 3505 may determine whether or not they have data to communicate during the TxOP. If not, the neighboring AP(s) may simply ignore or disregard the request or invitation to participate 3505. If so, the first portion of the TxOP may proceed to stage 2 where the neighboring AP(s) (which also may be referred to as slave AP(s)) transmit an indication of an intent to participate 3510 in the MU transmission. In some aspects, the intent to participate 3510 may carry or otherwise convey an indication of a request for resources for the respective neighboring AP(s). For example, the intent to participate 3510 may carry or indicate an explicit request for resources (e.g., such as a request for specific time/frequency/spatial resources) and/or an implicit request for resources (e.g., such as an indication of a queue size).

MU transmission scheme 3500 may proceed to the trigger transmission phase (e.g., the second portion of the TxOP) where the master AP transmits a trigger signal 3515 to the neighboring AP(s) that carries or otherwise conveys an indication of a set of resources for each of the neighboring AP(s) to use for the MU transmission. In some aspects, this may be considered the final per-AP resource allocation. In some aspects, this information may additionally be provided in an NDPA of an optional sounding phase that follows the trigger signal 3515. In some aspects, transmission of the trigger signal 3515 may be referred to as stage 3 and the optional sounding phase may be referred to as stage 3a.

MU transmission scheme 3500 may proceed next to the MU transmission, which may include a per-AP SIG/control channel assignment frame 3520 and the data transmission 3525. That is, the example configuration illustrated in MU transmission scheme 3500 includes a control channel assignment frame (e.g., the per-AP SIG/control channel assignment frame 3520) that is separate from the data transmission 3525. In the downlink example, the data transmission 3525 may include an 802.11ac waveform, an 802.11ax waveform, an HE waveform, and the like. In some aspects, the location of the data transmission 3525 in frequency may be signaled in the control channel assignment (e.g., the per-AP SIG/control channel assignment frame 3520). Although illustrated as being separate, in some aspects the per-AP SIG/control channel assignment frame 3520 may be combined with the downlink waveform (e.g., the data transmission 3525 or pre-SIG).

Figure 36:
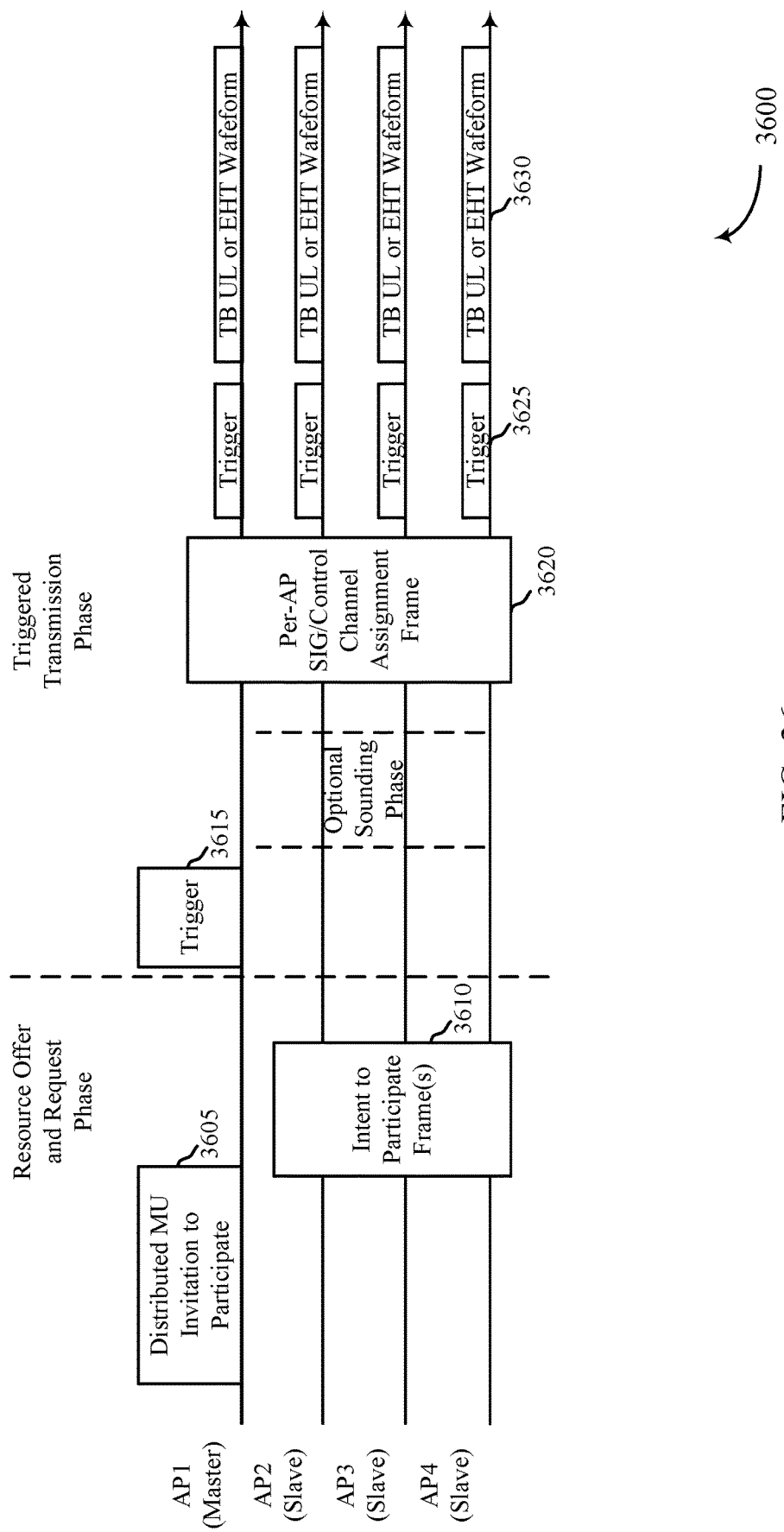
FIG. 36 illustrates an example of a MU transmission scheme that supports protocols for multi-AP coordinated MU transmissions in accordance with aspects of the present disclosure.

FIG. 36 illustrates an example of a MU transmission scheme 3600 that supports protocols for multi-AP coordinated MU transmissions in accordance with aspects of the present disclosure. In some examples, MU transmission scheme 3600 may implement aspects of WLAN 100 and/or MU transmissions schemes 2700, 2800, 2900, 3000, 3100, 3200, 3300, 3400, and/or 3500. Aspects of the MU transmission scheme 3600 may be implemented by an AP and/or a wireless station, which may be examples of the corresponding devices described herein. Generally, the MU transmission scheme 3600 illustrates an example uplink configuration for the MU transmission scheme in accordance with aspects of the described techniques.

In some aspects, MU transmission scheme 3600 generally illustrates an example uplink configuration where a master AP (e.g., a first AP or AP 1) and one or more slave AP(s) (e.g., one or more neighboring or second AP(s), such as AP 2, AP 3, and AP 4) participate in an uplink MU transmission from their respective wireless stations. Generally, MU transmission scheme 3600 may divided into a first portion of the TxOP that includes a resource offer and request phase and a second portion of the TxOP that includes a triggered transmission phase. The first portion of the TxOP typically includes a stage 1 where the master AP transmits an invitation or request to participate 3605 in the MU transmission during the second portion (e.g., a triggered transmission phase) of the TxOP. Generally, the invitation or request to participate 3605 is transmitted to one or more neighboring AP(s) as an offer or invitation for the neighboring AP(s) to participate in the MU transmission. Neighboring AP(s) that receive the invitation or request to participate 3605 may determine whether or not they have data to communicate from their respective wireless stations during the TxOP. If not, the neighboring AP(s) may simply ignore or disregard the request or invitation to participate 3605. If so, the first portion of the TxOP may proceed to stage 2 where the neighboring AP(s) (which also may be referred to as slave AP(s)) transmit an indication of an intent to participate 3610 in the MU transmission. In some aspects, the intent to participate 3610 may carry or otherwise convey an indication of a request for resources for the respective neighboring AP. For example, the intent to participate 3610 may carry or indicate an explicit request for resources (e.g., such as a request for specific time/frequency/spatial resources) and/or an implicit request for resources (e.g., such as an indication of a queue size).

In a downlink scenario, the intent to participate 3610 is generally targeted to the master AP. However, in an uplink scenario the intent to participate 3610 may be targeted to the master AP and one or more of the associated wireless stations that are associated with the neighboring AP. This may enable down selecting the wireless stations that need to monitor the RSSI of the trigger signal 3615. As discussed previously, in some examples the intent to participate 3610 may be provided in a single protocol data unit or may be set separated into a first and second protocol data unit by the neighboring AP(s).

MU transmission scheme 3600 may proceed to the trigger transmission phase (e.g., the second portion of the TxOP) where the master AP transmits a trigger signal 3615 to the neighboring AP(s) that carries or otherwise conveys an indication of a set of resources for each of the neighboring AP(s) to use for the MU transmission. In some aspects, this may be considered the final per-AP resource allocation. In some aspects, this information may additionally be provided in an NDPA of an optional sounding phase that follows the trigger signal 3615. In some aspects, transmission of the trigger signal 3615 may be referred to as stage 3 and the optional sounding phase may be referred to as stage 3a.

MU transmission scheme 3600 may proceed next to the MU transmission, which may include a per-AP SIG/control channel assignment frame 3620, a per-AP trigger 3625, and the data transmission 3630. That is, the example configuration illustrated in MU transmission scheme 3600 includes a control channel assignment frame (e.g., the per-AP SIG/control channel assignment frame 3620) that is separate from the per-AP trigger 3625 and the data transmission 3630. In some aspects, the per-AP SIG/control channel assignment frame 3620 and the per-AP trigger 3625 may be combined. In some aspects, the location in frequency of the per-AP trigger 3625 may be signaled or otherwise conveyed in the per-AP SIG/control channel assignment frame 3620. In some aspects, the location of the per-AP trigger 3625 frames (in frequency) may be carried or otherwise conveyed in the separate frame indicating the control channel information is transmitted before the per-AP trigger 3625 (e.g., such as the per-AP SIG/control channel assignment frame 3620) and/or as a preamble in the per-AP trigger 3625. In some aspects, the wireless station control channel assignment may be provided in the preamble of the trigger signal 3615 and/or the per-AP trigger 3625. Accordingly, the per-AP trigger 3625 allows for a detailed per-wireless station allocation to be provided by the respective AP. In the uplink example, the data transmission 3630 may include a 802.11ac waveform, an 802.11ax waveform, a HE waveform, and the like. In some aspects, the location of the data transmission 3630 in frequency may be signaled in the control channel assignment (e.g., the per-AP SIG/control channel assignment frame 3620).

Figure 37:
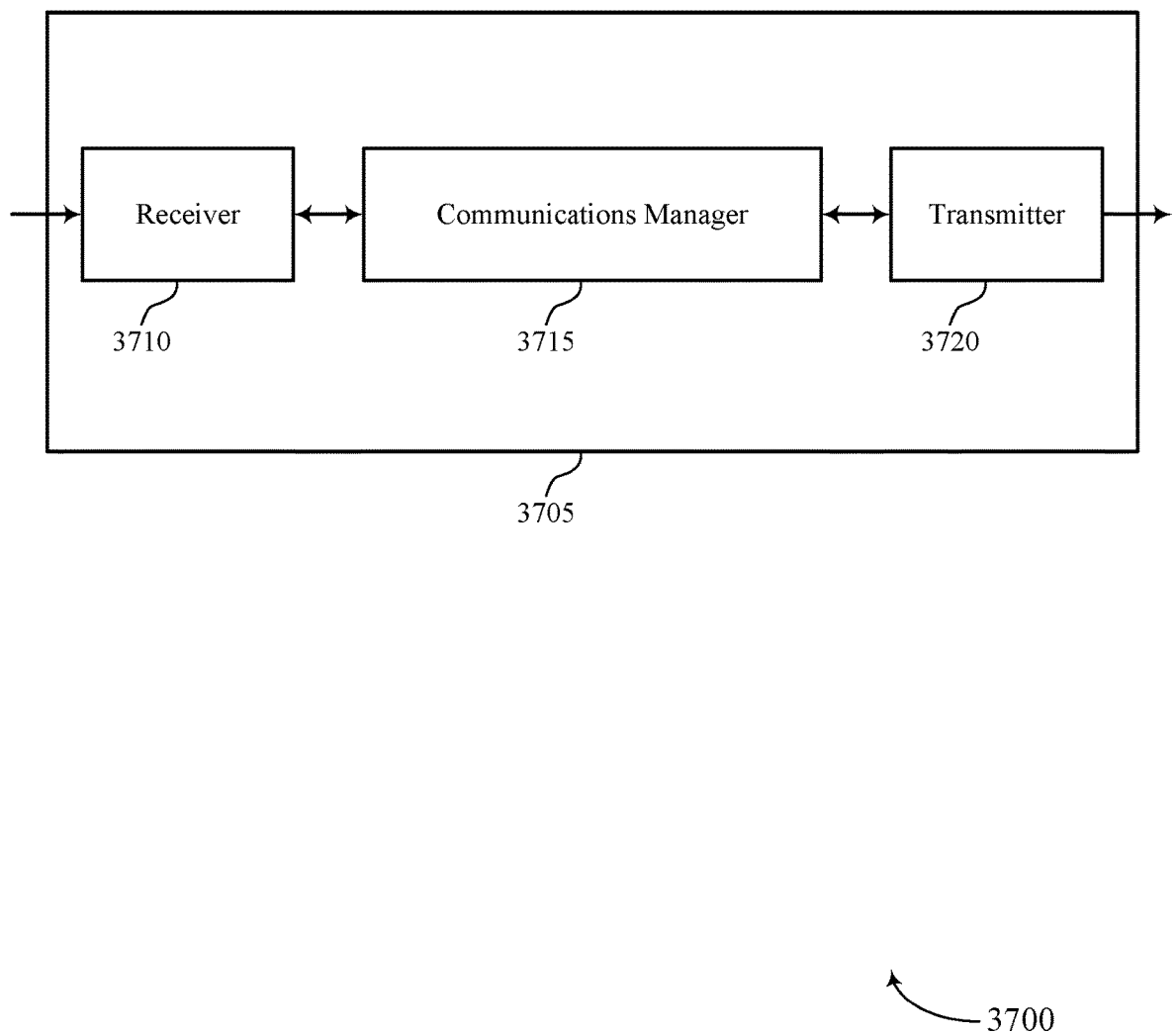
FIGS. 37 and 38 show block diagrams of devices that support protocols for multi-AP coordinated MU transmissions in accordance with aspects of the present disclosure.

FIG. 37 shows a block diagram 3700 of a device 3705 that supports protocols for multi-AP coordinated MU transmissions in accordance with aspects of the present disclosure. The device 3705 may be an example or implement aspects of device 905, device 1005, device 1205, or an AP as described herein. The device 3705 may include a receiver 3710, a communications manager 3715, and a transmitter 3720. The device 3705 may also include a processor. Each of these components may be in communication with one another (e.g., via one or more buses). In some aspects, each of these components may, collectively or in any combination, be considered a wireless modem, or a subset of a wireless modem. In some aspects, the wireless modem may be a component of a wireless chip or chipset.

The receiver 3710 may receive information such as packets, user data, or control information associated with various information channels (e.g., control channels, data channels, and information related to protocols for multi-AP coordinated MU transmissions, etc.). Information may be passed on to other components of the device. The receiver 3710 may be an example of aspects of the transceiver 4020 described with reference to FIG. 40. The receiver 3710 may utilize a single antenna or a set of antennas.

The communications manager 3715 may transmit, to a second AP and during a first portion of a TxOP, a request to participate in a MU transmission during a second portion of the TxOP, receive, from the second AP and during the first portion of the TxOP, an indication of intent to participate in the MU transmission during the second portion of the TxOP, the indication of intent including a resource request of the second AP for participation in the MU transmission, transmit, during an initial period of the second portion of the TxOP, a trigger signal to the second AP indicating a set of one or more resources for the second AP during the MU transmission, and participate, in conjunction with the second AP and during the second portion of the TxOP, in the MU transmission. The communications manager 3715 may also receive, from a first AP and during a first portion of a TxOP, a request to participate in a MU transmission during a second portion of the TxOP, transmit, to the first AP and during the first portion of the TxOP, an indication of intent to participate in the MU transmission during the second portion of the TxOP, the indication of intent including a resource request of the second AP for participation in the MU transmission, receive, during an initial period of the second portion of the TxOP, a trigger signal from the first AP indicating a set of one or more resources for the second AP during the MU transmission, and participate, in conjunction with the first AP and during the second portion of the TxOP, in the MU transmission. The communications manager 3715 may be an example of aspects of the communications manager 4010 described herein.

The communications manager 3715, or its sub-components, may be implemented in hardware, code (e.g., software or firmware) executed by a processor, or any combination thereof. If implemented in code executed by a processor, the functions of the communications manager 3715, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 3715, or its sub-components, may be physically located at various positions, including being distributed such that portions of functions are implemented at different physical locations by one or more physical components. In some examples, the communications manager 3715, or its sub-components, may be a separate and distinct component in accordance with various aspects of the present disclosure. In some examples, the communications manager 3715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 3720 may transmit signals generated by other components of the device. In some examples, the transmitter 3720 may be collocated with a receiver 3710 in a transceiver module. For example, the transmitter 3720 may be an example of aspects of the transceiver 4020 described with reference to FIG. 40. The transmitter 3720 may utilize a single antenna or a set of antennas.

In some examples, the communications manager 3715 may be an example of a wireless modem implemented as a separate chipset or as a component of a system on chip (SoC), and the receiver 3710 and transmitter 3720 may include analog components (e.g., amplifiers, filters, phase shifters, antennas, etc.) to facilitate the receipt and transmission of wireless signals. The communications manager 3715 may obtain and decode signals received wirelessly from the receiver 3710 via a receive interface. The communications manager 3715 also may output signals for wireless transmission by the transmitter 3720 over a transmit interface.

Figure 38:
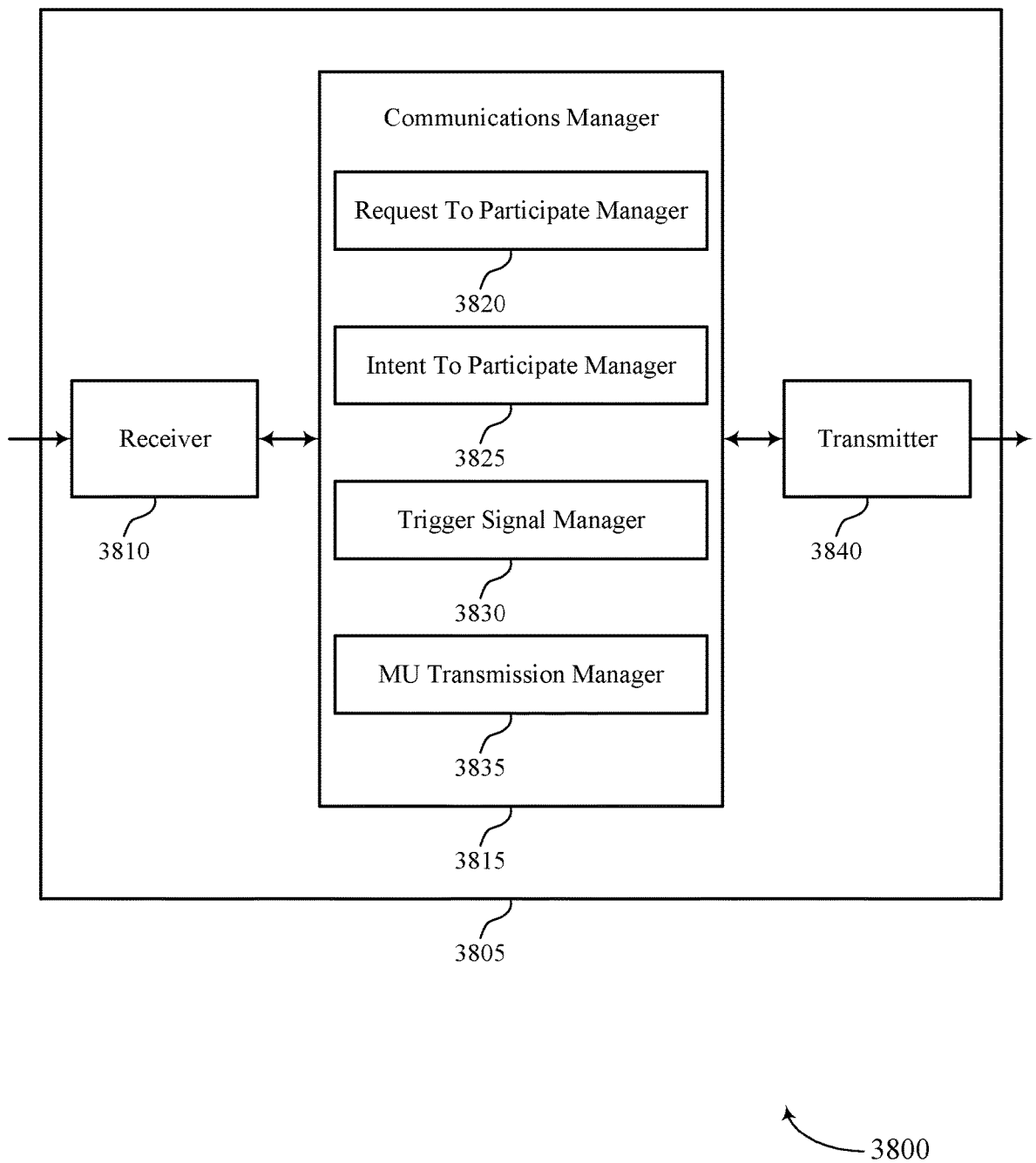

FIG. 38 shows a block diagram 3800 of a device 3805 that supports protocols for multi-AP coordinated MU transmissions in accordance with aspects of the present disclosure. The device 3805 may be an example of aspects of a device 3705 or a AP 105 as described herein. The device 3805 may include a receiver 3810, a communications manager 3815, and a transmitter 3840. The device 3805 may also include a processor. Each of these components may be in communication with one another (e.g., via one or more buses).

The receiver 3810 may receive information such as packets, user data, or control information associated with various information channels (e.g., control channels, data channels, and information related to protocols for multi-AP coordinated MU transmissions, etc.). Information may be passed on to other components of the device. The receiver 3810 may be an example of aspects of the transceiver 4020 described with reference to FIG. 40. The receiver 3810 may utilize a single antenna or a set of antennas.

The communications manager 3815 may be an example of aspects of the communications manager 3715 as described herein. The communications manager 3815 may include a request to participate manager 3820, an intent to participate manager 3825, a trigger signal manager 3830, and a MU transmission manager 3835. The communications manager 3815 may be an example of aspects of the communications manager 4010 described herein.

The request to participate manager 3820 may transmit, to a second AP and during a first portion of a TxOP, a request to participate in a MU transmission during a second portion of the TxOP.

The intent to participate manager 3825 may receive, from the second AP and during the first portion of the TxOP, an indication of intent to participate in the MU transmission during the second portion of the TxOP, the indication of intent including a resource request of the second AP for participation in the MU transmission.

The trigger signal manager 3830 may transmit, during an initial period of the second portion of the TxOP, a trigger signal to the second AP indicating a set of one or more resources for the second AP during the MU transmission.

The MU transmission manager 3835 may participate, in conjunction with the second AP and during the second portion of the TxOP, in the MU transmission.

The request to participate manager 3820 may receive, from a first AP and during a first portion of a TxOP, a request to participate in a MU transmission during a second portion of the TxOP.

The intent to participate manager 3825 may transmit, to the first AP and during the first portion of the TxOP, an indication of intent to participate in the MU transmission during the second portion of the TxOP, the indication of intent including a resource request of the second AP for participation in the MU transmission.

The trigger signal manager 3830 may receive, during an initial period of the second portion of the TxOP, a trigger signal from the first AP indicating a set of one or more resources for the second AP during the MU transmission.

The MU transmission manager 3835 may participate, in conjunction with the first AP and during the second portion of the TxOP, in the MU transmission.

The transmitter 3840 may transmit signals generated by other components of the device. In some examples, the transmitter 3840 may be collocated with a receiver 3810 in a transceiver module. For example, the transmitter 3840 may be an example of aspects of the transceiver 4020 described with reference to FIG. 40. The transmitter 3840 may utilize a single antenna or a set of antennas.

Figure 39:
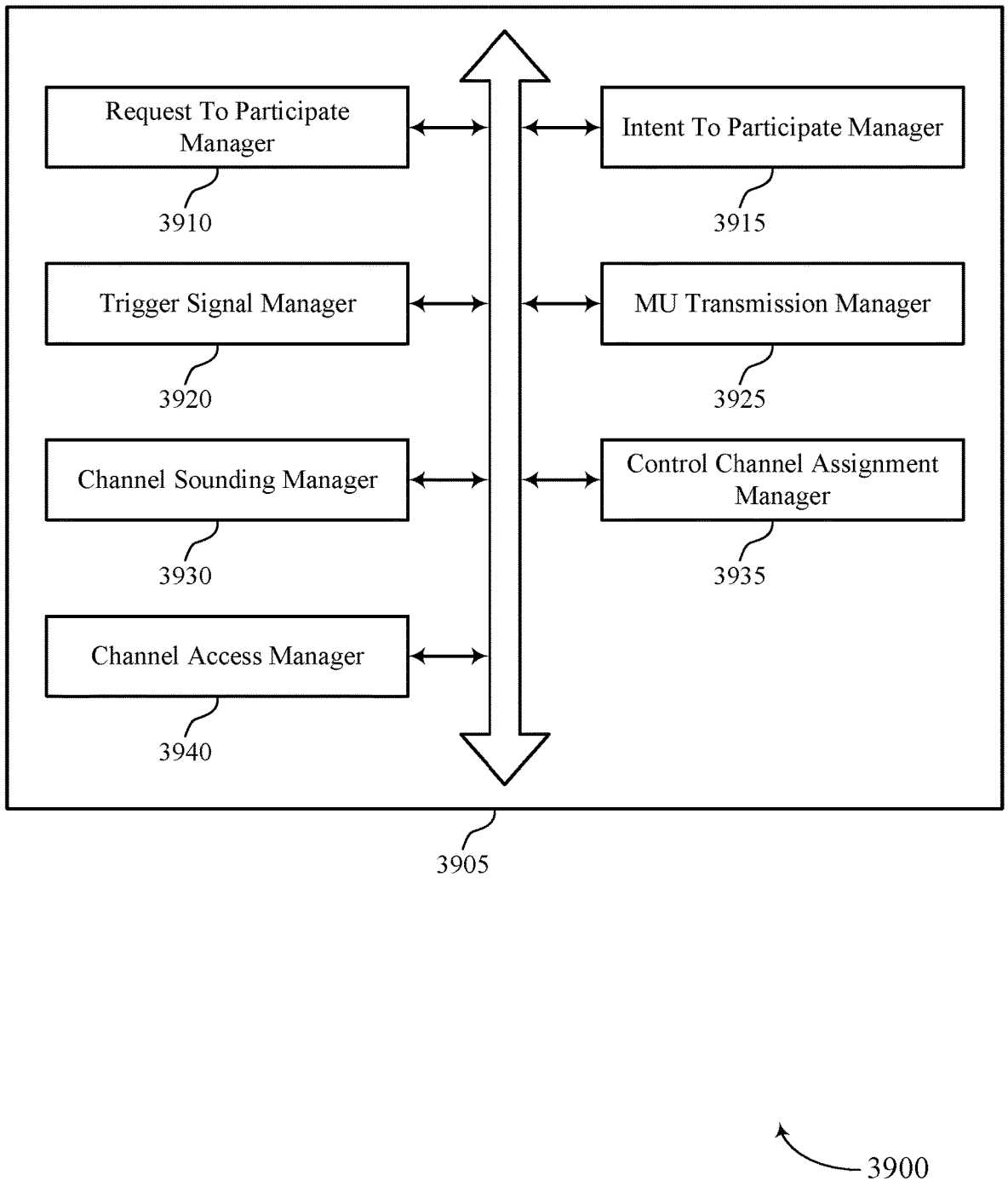
FIG. 39 shows a block diagram of a communications manager that supports protocols for multi-AP coordinated MU transmissions in accordance with aspects of the present disclosure.

FIG. 39 shows a block diagram 3900 of a communications manager 3905 that supports protocols for multi-AP coordinated MU transmissions in accordance with aspects of the present disclosure. The communications manager 3905 may be an example of aspects of a communications manager 3715, a communications manager 3815, or a communications manager 4010 described herein. The communications manager 3905 may include a request to participate manager 3910, an intent to participate manager 3915, a trigger signal manager 3920, a MU transmission manager 3925, a channel sounding manager 3930, a control channel assignment manager 3935, and a channel access manager 3940. Each of these modules may communicate, directly or indirectly, with one another (e.g., via one or more buses).

The request to participate manager 3910 may transmit, to a second AP and during a first portion of a TxOP, a request to participate in a MU transmission during a second portion of the TxOP. In some examples, the request to participate manager 3910 may receive, from a first AP and during a first portion of a TxOP, a request to participate in a MU transmission during a second portion of the TxOP.

In some cases, a duration of the TxOP, an available bandwidth for the MU transmission, an available spatial dimension for the MU transmissions, a configuration for the second AP to transmit the indication of intent, a scheduling for the second AP to transmit the indication of intent, a transmission direction for the MU transmission, an allowable interference level for the first AP, an identifier of the second AP, an identifier for a group of APs participating in the MU transmission, a transmit power of the first AP, or a combination thereof. In some cases, a duration of the TxOP, an available bandwidth for the MU transmission, an available spatial dimension for the MU transmissions, a configuration for the second AP to transmit the indication of intent, a scheduling for the second AP to transmit the indication of intent, a transmission direction for the MU transmission, an allowable interference level for the first AP, an identifier of the second AP, an identifier for a group of APs participating in the MU transmission, a transmit power of the first AP, or a combination thereof.

The intent to participate manager 3915 may receive, from the second AP and during the first portion of the TxOP, an indication of intent to participate in the MU transmission during the second portion of the TxOP, the indication of intent including a resource request of the second AP for participation in the MU transmission. In some examples, the intent to participate manager 3915 may transmit, to the first AP and during the first portion of the TxOP, an indication of intent to participate in the MU transmission during the second portion of the TxOP, the indication of intent including a resource request of the second AP for participation in the MU transmission. In some cases, a simultaneous transmission, a scheduled transmission, or a polled transmission from the second AP and one or more additional APs participating in the MU transmission.

In some cases, the indication of intent further indicates a channel power measurement request for one or more stations to measure a channel power using the trigger signal. In some cases, a time resource, a frequency resource, a spatial dimension resource, an orthogonal resource, or a combination thereof. In some cases, a simultaneous transmission, a scheduled transmission, or a polled transmission from the second AP and one or more additional APs participating in the MU transmission. In some cases, the indication of intent further indicates a station channel power measurement request for one or more stations to measure a channel receive power using the trigger signal. In some cases, a time resource, a frequency resource, a spatial dimension resource, an orthogonal resource, or a combination thereof.

The trigger signal manager 3920 may transmit, during an initial period of the second portion of the TxOP, a trigger signal to the second AP indicating a set of one or more resources for the second AP during the MU transmission. In some examples, the trigger signal manager 3920 may receive, during an initial period of the second portion of the TxOP, a trigger signal from the first AP indicating a set of one or more resources for the second AP during the MU transmission.

In some cases, a guard interval duration for the MU transmission, a preamble configuration for the MU transmission, a transmission direction for the MU transmission, an allowable interference level for the first AP, an indication of a channel sounding stage between the trigger signal and a beginning of the MU transmission, or a combination thereof. In some cases, a guard interval duration for the MU transmission, a preamble configuration for the MU transmission, a transmission direction for the MU transmission, an allowable interference level for the first AP, an indication of a channel sounding stage between the trigger signal and a beginning of the MU transmission, or a combination thereof.

The MU transmission manager 3925 may participate, in conjunction with the second AP and during the second portion of the TxOP, in the MU transmission. In some examples, the MU transmission manager 3925 may participate, in conjunction with the first AP and during the second portion of the TxOP, in the MU transmission.

The channel sounding manager 3930 may configure the trigger signal to indicate that channel sounding is to be performed between transmission of the trigger signal and a beginning of the MU transmission. In some examples, the channel sounding manager 3930 may perform a channel sounding procedure between the first AP and one or more stations associated with the first AP during the channel sounding.

In some examples, the channel sounding manager 3930 may decode the trigger signal to determine that channel sounding is to be performed between reception of the trigger signal and a beginning of the MU transmission. In some examples, the channel sounding manager 3930 may perform a channel sounding procedure between the second AP and one or more stations associated with the second AP during the channel sounding.

The control channel assignment manager 3935 may transmit a control channel assignment message to each of one or more stations associated with the first AP that are associated with the MU transmission that assigns a control channel for each station to use to determine a resource allocation for the multi-user transmission.

In some examples, the control channel assignment manager 3935 may transmit, in a beginning of a data transmission during the MU transmission, the resource allocation for each station to use for the MU transmission. In some examples, the control channel assignment manager 3935 may transmit, in a single protocol data unit, the intent to participate to the first AP and each of one or more stations associated with the second AP that are participating in the MU transmission. In some examples, the control channel assignment manager 3935 may transmit, in a first protocol data unit, the intent to participate to the first AP. In some examples, the control channel assignment manager 3935 may transmit, in a second protocol data unit, the intent to participate to each of one or more stations associated with the second AP that are participating in the MU transmission. In some examples, the control channel assignment manager 3935 may transmit a control channel assignment message to each of one or more stations associated with the second AP that are associated with the MU transmission that assigns a control channel for each station to use to determine a resource allocation for the multi-user transmission. In some examples, the control channel assignment manager 3935 may transmit, in a beginning of a data transmission during the MU transmission, the resource allocation for each station to use for the MU transmission.

In some cases, the control channel assignment message is transmitted in a different physical layer protocol data unit than the data transmission of the MU transmission. In some cases, the control channel assignment message is transmitted in a preamble of a second trigger signal (e.g., in a per-AP trigger signal) before the data transmission. In some cases, the control channel assignment message is transmitted in a preamble of the data transmission. In some cases, the single protocol data unit indicates an identifier for each of the one or more stations. In some cases, the single protocol data unit indicates a channel power measurement request for one or more stations to measure a channel power using the trigger signal. In some cases, the second protocol data unit indicates an identifier for each of the one or more stations. In some cases, the second protocol data unit indicates a channel power measurement request for one or more stations to measure a channel power using the trigger signal. In some cases, the control channel assignment message is transmitted in a preamble of the second trigger signal before the data transmission. In some cases, the control channel assignment message is transmitted in a preamble of the data transmission. In some cases, the control channel assignment message is transmitted in a different physical layer protocol data unit than the data transmission of the MU transmission.

The channel access manager 3940 may obtain access to the channel of the shared radio frequency spectrum band for the TxOP.

Figure 40:
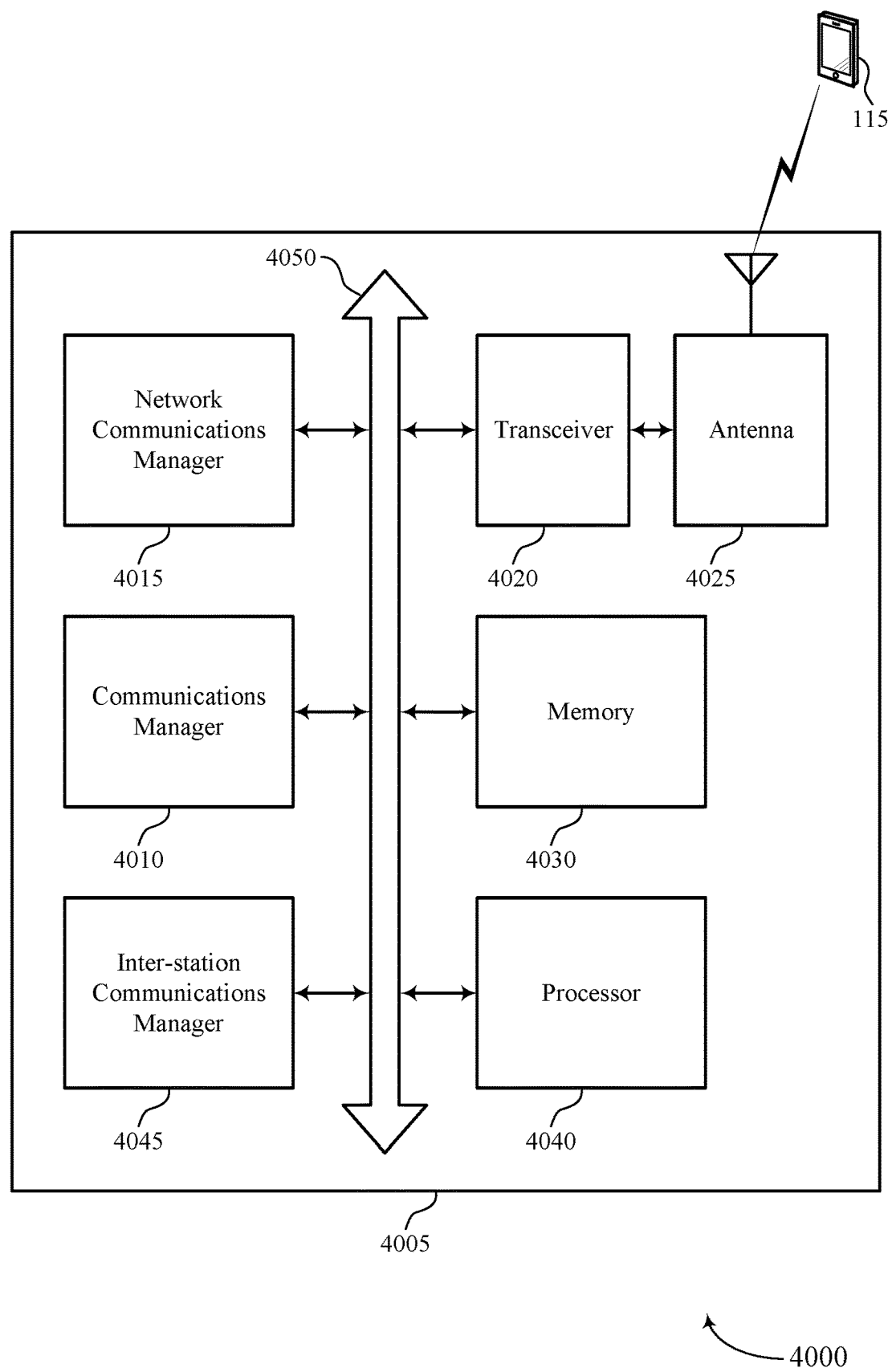
FIG. 40 shows a diagram of a system including a device that supports protocols for multi-AP coordinated MU transmissions in accordance with aspects of the present disclosure.

FIG. 40 shows a diagram of a system 4000 including a device 4005 that supports protocols for multi-AP coordinated MU transmissions in accordance with aspects of the present disclosure. The device 4005 may be an example of or include the components of device 905, device 1005, device 1205, device 3705, device 3805, or a AP as described herein. The device 4005 may include components for bi-directional voice and data communications including components for transmitting and receiving communications, including a communications manager 4010, a network communications manager 4015, a transceiver 4020, an antenna 4025, memory 4030, a processor 4040, and an inter-station communications manager 4045. These components may be in electronic communication via one or more buses (e.g., bus 4050).

The communications manager 4010 may be an example of the communications manager 915, or the communications manager 1005, or the communications manager 1210, or the communications manager 3715, or the communications manager 3815, or the communications manager 3905 described herein. The communications manager 4010 may transmit, to a second AP and during a first portion of a TxOP, a request to participate in a MU transmission during a second portion of the TxOP, receive, from the second AP and during the first portion of the TxOP, an indication of intent to participate in the MU transmission during the second portion of the TxOP, the indication of intent including a resource request of the second AP for participation in the MU transmission, transmit, during an initial period of the second portion of the TxOP, a trigger signal to the second AP indicating a set of one or more resources for the second AP during the MU transmission, and participate, in conjunction with the second AP and during the second portion of the TxOP, in the MU transmission. The communications manager 4010 may also receive, from a first AP and during a first portion of a TxOP, a request to participate in a MU transmission during a second portion of the TxOP, transmit, to the first AP and during the first portion of the TxOP, an indication of intent to participate in the MU transmission during the second portion of the TxOP, the indication of intent including a resource request of the second AP for participation in the MU transmission, receive, during an initial period of the second portion of the TxOP, a trigger signal from the first AP indicating a set of one or more resources for the second AP during the MU transmission, and participate, in conjunction with the first AP and during the second portion of the TxOP, in the MU transmission.

The network communications manager 4015 may manage communications with the core network (e.g., via one or more wired backhaul links). For example, the network communications manager 4015 may manage the transfer of data communications for client devices, such as one or more STAs 115.

The transceiver 4020 may communicate bi-directionally, via one or more antennas, wired, or wireless links as described above. For example, the transceiver 4020 may represent a wireless transceiver and may communicate bi-directionally with another wireless transceiver. The transceiver 4020 may also include a modem to modulate the packets and provide the modulated packets to the antennas for transmission, and to demodulate packets received from the antennas.

In some cases, the wireless device may include a single antenna 4025. However, in some cases the device may have more than one antenna 4025, which may be capable of concurrently transmitting or receiving multiple wireless transmissions.

The memory 4030 may include RAM and ROM. The memory 4030 may store computer-readable, computer-executable code 4035 including instructions that, when executed, cause the processor to perform various functions described herein. In some cases, the memory 4030 may contain, among other things, a BIOS which may control basic hardware or software operation such as the interaction with peripheral components or devices.

The processor 4040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 4040 may be configured to operate a memory array using a memory controller. In other cases, a memory controller may be integrated into processor 4040. The processor 4040 may be configured to execute computer-readable instructions stored in a memory to perform various functions (e.g., functions or tasks supporting protocols for multi-AP coordinated MU transmissions).

Figure 41:
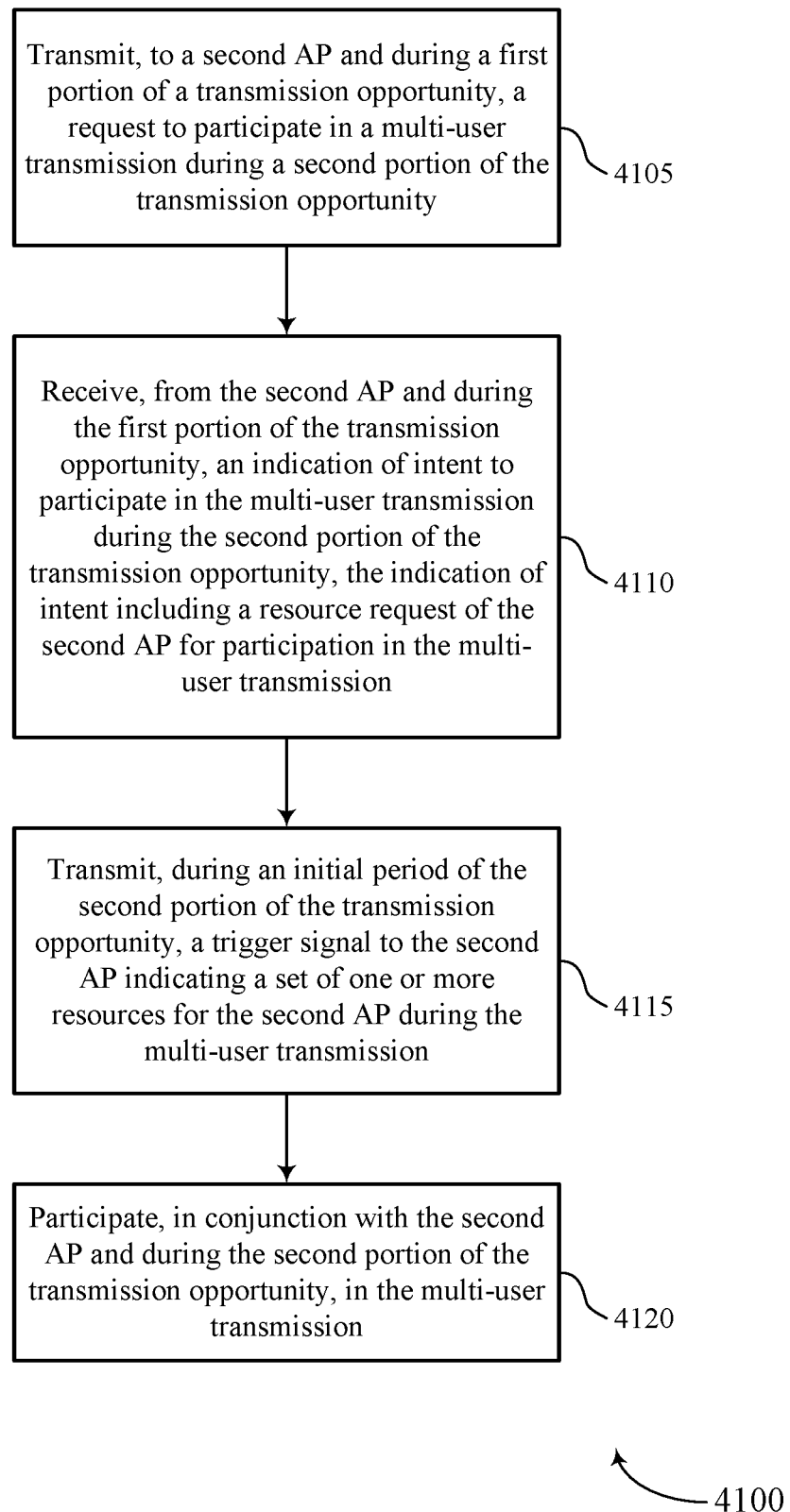
FIGS. 41 through 43 show flowcharts illustrating methods that support protocols for multi-AP coordinated MU transmissions in accordance with aspects of the present disclosure.

The inter-station communications manager 4045 may manage communications with other APs 105, and may include a controller or scheduler for controlling communications with STAs 115 in cooperation with other APs 105. For example, the inter-station communications manager 4045 may coordinate scheduling for transmissions to STAs 115 for various interference mitigation techniques such as beamforming or joint transmission.

FIG. 41 shows a flowchart illustrating a method 4100 that supports protocols for multi-AP coordinated MU transmissions in accordance with aspects of the present disclosure. The operations of method 4100 may be implemented by a AP or its components as described herein. For example, the operations of method 4100 may be performed by a communications manager as described with reference to FIGS. 37 through 40. In some examples, a AP may execute a set of instructions to control the functional elements of the AP to perform the functions described below. Additionally, or alternatively, a AP may perform aspects of the functions described below using special-purpose hardware.

At 4105, the AP may transmit, to a second AP and during a first portion of a TxOP, a request to participate in a MU transmission during a second portion of the TxOP. The operations of 4105 may be performed according to the methods described herein. In some examples, aspects of the operations of 4105 may be performed by a request to participate manager as described with reference to FIGS. 37 through 40.

At 4110, the AP may receive, from the second AP and during the first portion of the TxOP, an indication of intent to participate in the MU transmission during the second portion of the TxOP, the indication of intent including a resource request of the second AP for participation in the MU transmission. The operations of 4110 may be performed according to the methods described herein. In some examples, aspects of the operations of 4110 may be performed by an intent to participate manager as described with reference to FIGS. 37 through 40.

At 4115, the AP may transmit, during an initial period of the second portion of the TxOP, a trigger signal to the second AP indicating a set of one or more resources for the second AP during the MU transmission. The operations of 4115 may be performed according to the methods described herein. In some examples, aspects of the operations of 4115 may be performed by a trigger signal manager as described with reference to FIGS. 37 through 40.

At 4120, the AP may participate, in conjunction with the second AP and during the second portion of the TxOP, in the MU transmission. The operations of 4120 may be performed according to the methods described herein. In some examples, aspects of the operations of 4120 may be performed by a MU transmission manager as described with reference to FIGS. 37 through 40.

Figure 42:
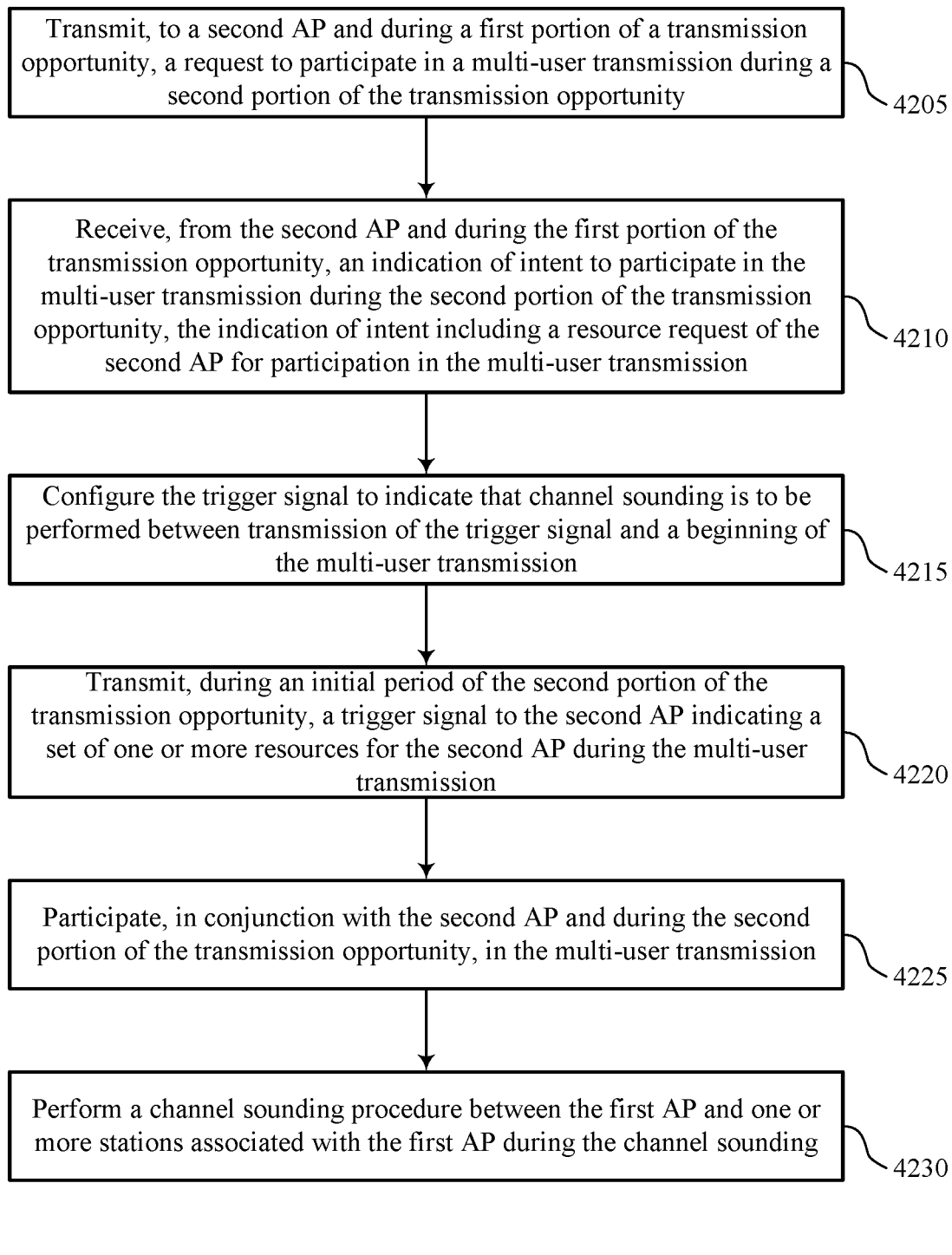

FIG. 42 shows a flowchart illustrating a method 4200 that supports protocols for multi-AP coordinated MU transmissions in accordance with aspects of the present disclosure. The operations of method 4200 may be implemented by a AP or its components as described herein. For example, the operations of method 4200 may be performed by a communications manager as described with reference to FIGS. 37 through 40. In some examples, a AP may execute a set of instructions to control the functional elements of the AP to perform the functions described below. Additionally, or alternatively, a AP may perform aspects of the functions described below using special-purpose hardware.

At 4205, the AP may transmit, to a second AP and during a first portion of a TxOP, a request to participate in a MU transmission during a second portion of the TxOP. The operations of 4205 may be performed according to the methods described herein. In some examples, aspects of the operations of 4205 may be performed by a request to participate manager as described with reference to FIGS. 37 through 40.

At 4210, the AP may receive, from the second AP and during the first portion of the TxOP, an indication of intent to participate in the MU transmission during the second portion of the TxOP, the indication of intent including a resource request of the second AP for participation in the MU transmission. The operations of 4210 may be performed according to the methods described herein. In some examples, aspects of the operations of 4210 may be performed by an intent to participate manager as described with reference to FIGS. 37 through 40.

At 4215, the AP may configure the trigger signal to indicate that channel sounding is to be performed between transmission of the trigger signal and a beginning of the MU transmission. The operations of 4215 may be performed according to the methods described herein. In some examples, aspects of the operations of 4215 may be performed by a channel sounding manager as described with reference to FIGS. 37 through 40.

At 4220, the AP may transmit, during an initial period of the second portion of the TxOP, a trigger signal to the second AP indicating a set of one or more resources for the second AP during the MU transmission. The operations of 4220 may be performed according to the methods described herein. In some examples, aspects of the operations of 4220 may be performed by a trigger signal manager as described with reference to FIGS. 37 through 40.

At 4225, the AP may participate, in conjunction with the second AP and during the second portion of the TxOP, in the MU transmission. The operations of 4225 may be performed according to the methods described herein. In some examples, aspects of the operations of 4225 may be performed by a MU transmission manager as described with reference to FIGS. 37 through 40.

At 4230, the AP may perform a channel sounding procedure between the first AP and one or more stations associated with the first AP during the channel sounding. The operations of 4230 may be performed according to the methods described herein. In some examples, aspects of the operations of 4230 may be performed by a channel sounding manager as described with reference to FIGS. 37 through 40.

Figure 43:
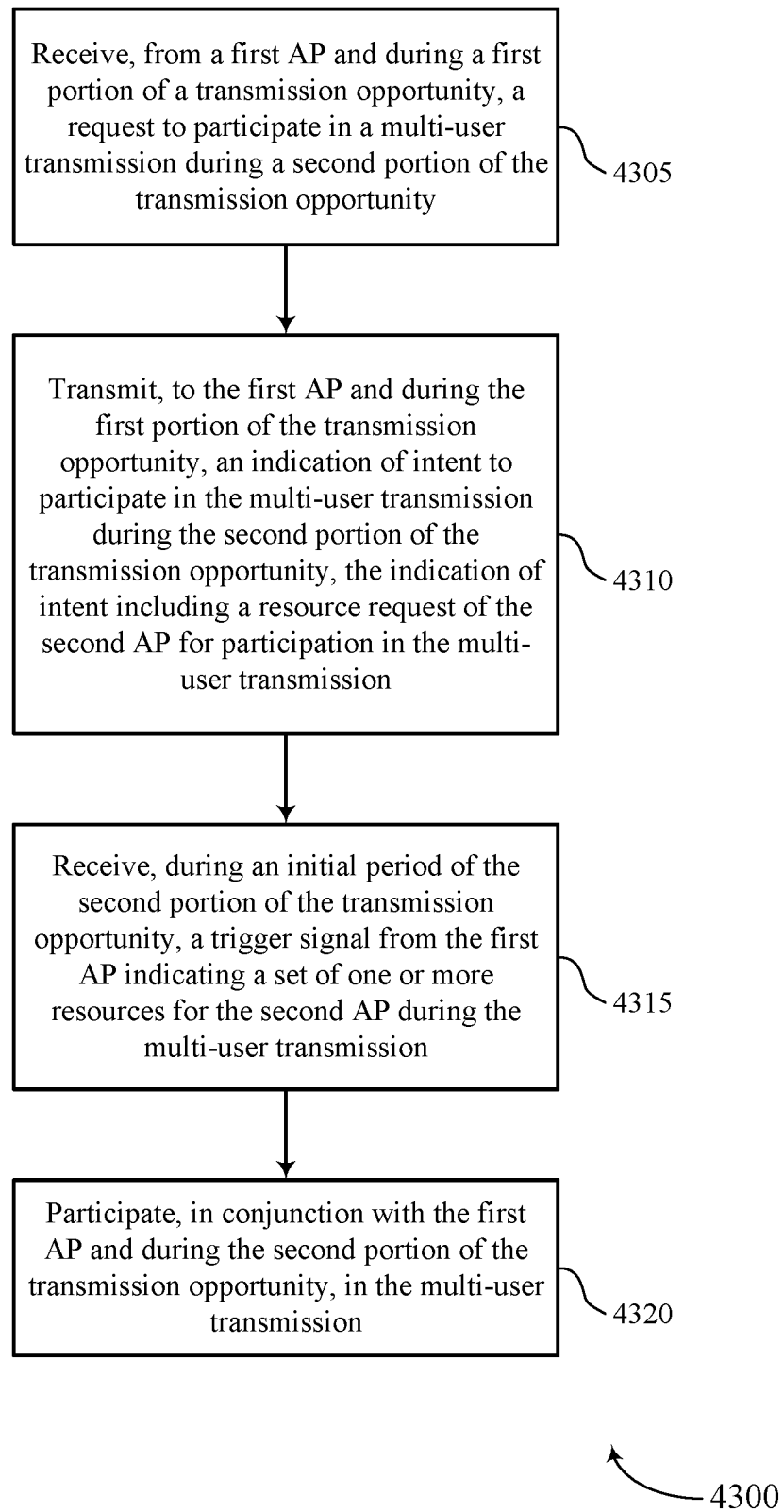

FIG. 43 shows a flowchart illustrating a method 4300 that supports protocols for multi-AP coordinated MU transmissions in accordance with aspects of the present disclosure. The operations of method 4300 may be implemented by a AP or its components as described herein. For example, the operations of method 4300 may be performed by a communications manager as described with reference to FIGS. 37 through 40. In some examples, a AP may execute a set of instructions to control the functional elements of the AP to perform the functions described below. Additionally, or alternatively, a AP may perform aspects of the functions described below using special-purpose hardware.

At 4305, the AP may receive, from a first AP and during a first portion of a TxOP, a request to participate in a MU transmission during a second portion of the TxOP. The operations of 4305 may be performed according to the methods described herein. In some examples, aspects of the operations of 4305 may be performed by a request to participate manager as described with reference to FIGS. 37 through 40.

At 4310, the AP may transmit, to the first AP and during the first portion of the TxOP, an indication of intent to participate in the MU transmission during the second portion of the TxOP, the indication of intent including a resource request of the second AP for participation in the MU transmission. The operations of 4310 may be performed according to the methods described herein. In some examples, aspects of the operations of 4310 may be performed by an intent to participate manager as described with reference to FIGS. 37 through 40.

At 4315, the AP may receive, during an initial period of the second portion of the TxOP, a trigger signal from the first AP indicating a set of one or more resources for the second AP during the MU transmission. The operations of 4315 may be performed according to the methods described herein. In some examples, aspects of the operations of 4315 may be performed by a trigger signal manager as described with reference to FIGS. 37 through 40.

At 4320, the AP may participate, in conjunction with the first AP and during the second portion of the TxOP, in the MU transmission. The operations of 4320 may be performed according to the methods described herein. In some examples, aspects of the operations of 4320 may be performed by a MU transmission manager as described with reference to FIGS. 37 through 40.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A wireless station, comprising:
 a wireless modem, wherein the wireless modem is configured to:
  receive, from an access point (AP), a control channel assignment message that assigns a control channel for the wireless station to use to receive a resource allocation associated with a multi-user transmission during a transmission opportunity, wherein the control channel assignment message is received in a different physical layer protocol data unit than a data transmission of the multi-user transmission;
  receive, via the assigned control channel and before the data transmission of the multi-user transmission, the resource allocation associated with the multi-user transmission; and
  participate, using the resource allocation, in the multi-user transmission with the AP.

2. The wireless station of claim 1, wherein the control channel assignment message is received in a preamble of a per-AP trigger signal before the data transmission.

3. The wireless station of claim 1, wherein the control channel assignment message is received in a preamble of the data transmission.

4. The wireless station of claim 1, wherein, to participate in the multi-user transmission with the AP, the wireless modem is configured to:
 communicate, with the AP, one or more uplink messages, one or more downlink messages, or a combination thereof, during the multi-user transmission.

5. A non-transitory computer-readable medium storing code for wireless communications at a wireless station, the code comprising instructions executable by at least one processor to:
 receive, from an access point (AP), a control channel assignment message that assigns a control channel for the wireless station to use for a resource allocation associated with a multi-user transmission during a transmission opportunity, wherein the control channel assignment message is received in a different physical layer protocol data unit than a data transmission of the multi-user transmission;
 receive, via the assigned control channel and before the data transmission of the multi-user transmission, the resource allocation associated with the multi-user transmission; and
 participate, using the resource allocation, in the multi-user transmission with the AP.

6. The non-transitory computer-readable medium of claim 5, wherein the control channel assignment message is received in a preamble of a per-AP trigger signal before the data transmission.

7. The non-transitory computer-readable medium of claim 5, wherein the control channel assignment message is received in a preamble of the data transmission.

8. The non-transitory computer-readable medium of claim 5, wherein the instructions to participate in the multi-user transmission with the AP are executable by the at least one processor to:
 communicate, with the AP, one or more uplink messages, one or more downlink messages, or a combination thereof, during the multi-user transmission.

9. A method for wireless communications at a wireless station, comprising:
 receiving, from an access point (AP), a control channel assignment message that assigns a control channel for the wireless station to use to receive a resource allocation associated with a multi-user transmission during a transmission opportunity, wherein the control channel assignment message is received in a different physical layer protocol data unit than a data transmission of the multi-user transmission;
 receiving, via the assigned control channel and before the data transmission of the multi-user transmission, the resource allocation associated with the multi-user transmission; and
 participating, using the resource allocation, in the multi-user transmission with the AP.

10. The method of claim 9, wherein the control channel assignment message is received in a preamble of a per-AP trigger signal before the data transmission.

11. The method of claim 9, wherein the control channel assignment message is received in a preamble of the data transmission.

12. The method of claim 9, wherein participating in the multi-user transmission with the AP comprises:
 communicating, with the AP, one or more uplink messages, one or more downlink messages, or a combination thereof, during the multi-user transmission.

* * * * *